US012252908B2

(12) United States Patent
Cumbo et al.

(10) Patent No.: US 12,252,908 B2
(45) Date of Patent: Mar. 18, 2025

(54) CLOSURE LATCH ASSEMBLY

(71) Applicant: Magna Closures Inc., Newmarket (CA)

(72) Inventors: Francesco Cumbo, Newmarket (CA); Roman Cetnar, Newmarket (CA)

(73) Assignee: Magna Closures Inc., Newmarket (CA)

( * ) Notice: Subject to any disclaimer, the term of this patent is extended or adjusted under 35 U.S.C. 154(b) by 182 days.

(21) Appl. No.: 17/641,170

(22) PCT Filed: Oct. 1, 2020

(86) PCT No.: PCT/CA2020/051311

§ 371 (c)(1),
(2) Date: Mar. 8, 2022

(87) PCT Pub. No.: WO2021/062541

PCT Pub. Date: Apr. 8, 2021

(65) Prior Publication Data

US 2022/0341223 A1 Oct. 27, 2022

Related U.S. Application Data

(60) Provisional application No. 62/910,324, filed on Oct. 3, 2019.

(51) Int. Cl.

| | |
|---|---|
| ***E05B 81/06*** | (2014.01) |
| ***E05B 81/14*** | (2014.01) |
| ***E05B 81/42*** | (2014.01) |

(52) U.S. Cl.
CPC .............. *E05B 81/06* (2013.01); *E05B 81/14* (2013.01); *E05B 81/42* (2013.01)

(58) Field of Classification Search
CPC .......... E05B 81/06; E05B 81/14; E05B 81/42; E05B 81/20; E05B 79/16
USPC .......................................................... 292/201
See application file for complete search history.

(56) References Cited

U.S. PATENT DOCUMENTS

| | | | |
|---|---|---|---|
| 3,566,703 | A | 3/1971 | Van Noord |
| 4,518,180 | A | 5/1985 | Kleefeldt et al. |
| 5,474,339 | A | 12/1995 | Johnson |

(Continued)

FOREIGN PATENT DOCUMENTS

| | | | | |
|---|---|---|---|---|
| DE | 102014003737 A1 | 9/2015 | | |
| EP | 1188890 A2 * | 3/2002 | ............. | E05B 81/14 |

(Continued)

*Primary Examiner* — Eugene G Byrd
*Assistant Examiner* — James Edward Ignaczewski
(74) *Attorney, Agent, or Firm* — Dickinson Wright PLLC

(57) ABSTRACT

A closure latch assembly includes a latch module having a ratchet and a pawl, with the ratchet being moveable between a striker capture position and a striker release position and the pawl being moveable between a ratchet holding position, whereat the ratchet is maintained in the striker capture position, the a ratchet release position, whereat the ratchet is biased toward the striker release position. An actuator module including a power actuator is operably coupled to a drive gear. The drive gear has an actuation feature fixed thereto. A latch release mechanism operably couples the actuation feature to the pawl, wherein rotation of the drive gear via energization of the power actuator causes the latch release mechanism to move the pawl between the ratchet holding position and the ratchet release position.

20 Claims, 38 Drawing Sheets

(56) References Cited

U.S. PATENT DOCUMENTS

| | | | | |
|---|---|---|---|---|
| 6,168,216 | B1 * | 1/2001 | Nakajima | E05B 81/16 292/216 |
| 7,467,815 | B2 | 12/2008 | Larsen et al. | |
| 8,522,583 | B2 | 9/2013 | Cumbo et al. | |
| 8,596,694 | B2 | 12/2013 | Taurasi et al. | |
| 9,194,163 | B2 | 11/2015 | Margheritti et al. | |
| 9,512,651 | B2 | 12/2016 | Taurasi et al. | |
| 10,094,147 | B2 | 10/2018 | Lujan et al. | |
| 10,337,227 | B2 | 7/2019 | Stoof et al. | |
| 10,352,070 | B2 | 7/2019 | Margheritti et al. | |
| 10,626,638 | B2 | 4/2020 | Ishiguro et al. | |
| 2004/0174022 | A1 * | 9/2004 | Inoue | E05B 81/16 292/216 |
| 2005/0205361 | A1 | 9/2005 | Fisher | |
| 2006/0202485 | A1 * | 9/2006 | Yamamoto | E05B 81/14 292/201 |
| 2007/0046035 | A1 * | 3/2007 | Tolley | E05B 85/045 292/201 |
| 2008/0073915 | A1 * | 3/2008 | Hunt | E05B 81/06 292/201 |
| 2008/0224482 | A1 * | 9/2008 | Cumbo | E05B 81/40 292/201 |
| 2010/0127511 | A1 * | 5/2010 | Vasquez | E05B 81/34 292/201 |
| 2010/0235058 | A1 | 9/2010 | Papanikolaou et al. | |
| 2011/0074170 | A1 | 3/2011 | Tomaszewski et al. | |
| 2012/0313384 | A1 | 12/2012 | Cumbo et al. | |
| 2015/0091310 | A1 | 4/2015 | Jankowski et al. | |
| 2015/0204118 | A1 | 7/2015 | Cetnar | |
| 2016/0032626 | A1 * | 2/2016 | Margheritti | E05B 81/16 292/201 |
| 2017/0350170 | A1 | 12/2017 | Cetnar | |
| 2018/0163439 | A1 * | 6/2018 | Patane | E05B 77/36 |
| 2018/0355642 | A1 | 12/2018 | Cumbo et al. | |
| 2019/0136590 | A1 | 5/2019 | Patane et al. | |
| 2019/0161996 | A1 | 5/2019 | Taurasi et al. | |
| 2019/0242163 | A1 | 8/2019 | Cetnar et al. | |
| 2019/0249467 | A1 * | 8/2019 | Patane | E05B 81/16 |
| 2019/0264474 | A1 | 8/2019 | Ottino et al. | |
| 2019/0271179 | A1 | 9/2019 | Patane et al. | |

FOREIGN PATENT DOCUMENTS

| | | | | |
|---|---|---|---|---|
| EP | 1402139 | B1 * | 9/2007 | E05B 77/48 |
| WO | 2018169259 | A1 | 9/2018 | |

* cited by examiner

CLOSURE LATCH ASSEMBLY

CROSS-REFERENCE TO RELATED APPLICATIONS

This application is a U.S. National Stage of International Patent Application No. PCT/CA2020/051311, filed on Oct. 1, 2020, which claims the benefit of U.S. Provisional Application Ser. No. 62/910,324, filed Oct. 3, 2019, which are both incorporated herein by reference in their entirety.

FIELD

The present disclosure relates to generally to power-operated closure latch assemblies of the type used in closure systems for releasably latching a closure panel to a body portion of a motor vehicle. More particularly, the present disclosure is directed to a closure latch assembly having a standardized actuator module capable of being attached to a plurality of different latch modules and which is configured to include an ECU/actuator assembly and an ECU cover.

BACKGROUND

This section provides background information which is not necessarily prior art to the inventive concepts embodied in the present disclosure.

Continued increases in technology, driven by consumer demand for advanced comfort and convenience features, has resulted in more electronics being integrated in modern motor vehicles. To this end, electronic controllers and electronically-controlled devices are now used to control a wide variety of functions in the vehicle. For example, many modern vehicles are now equipped with a passive (i.e. "keyless") entry system to permit locking/unlocking and release of closure panels (i.e. doors, tailgates, liftgates, decklids, etc.) without the use of a traditional key-type entry system. In this regard, some popular functions now available with such passive entry systems include power lock/unlock, power cinch, and power release. Thus "powered" functions are provided by a closure latch assembly mounted to the closure panel and which is equipped with a latch module having a ratchet/pawl type of latch mechanism that is selectively actuated via actuation of at least one electric actuator. A latch control unit is electronically connected to the electric actuator for controlling actuation of the electric actuator.

Movement of the closure panel from an open position toward a closed position results in a striker (mounted to a structural portion of the vehicle) engaging and forcibly rotating the ratchet, in opposition to a biasing force normally applied to the ratchet via a ratchet biasing member, from a striker release position toward a striker capture position. Once the ratchet is located in its striker capture position, the pawl moves, due to the urging of a pawl biasing member, into a ratchet holding position whereat the pawl mechanically engages and holds the ratchet in its striker capture position, thereby latching the latch mechanism and holding the closure panel in its closed position. A latch release mechanism is commonly associated with the latch module for causing movement of the pawl from its ratchet holding position into a ratchet releasing position whereat the pawl is disengaged from the ratchet. Thereafter, the ratchet biasing member drives the ratchet back to its striker release position, thereby releasing the latch mechanism and permitting movement of the closure panel to its open position.

Closure latch assemblies providing a power release feature typically have the electric "power release" actuator configured to actuate the latch release mechanism for releasing the latch mechanism. The electric power release actuator is part of the latch module and is controlled via the latch control unit in response to a latch release signal generated by the passive entry system (i.e. via a key fob or a handle-mounted switch). In many instances, the latch control unit is part of an electronic controller unit (ECU) module. Conventionally, the ECU module has been located remotely from the closure latch assembly and is electrically connected to the electric power release actuator via a wiring harness. More recently, closure latch assemblies have been developed with the ECU module mounted directly to the latch module to provide an integrated configuration which permits elimination of the wiring harness.

Typically, the ECU module includes at least one circuit board, such as a printed circuit board (PCB), configured to supply electrical power to, and control operation of, the power actuator based on the control circuits and electrical components on the circuit board. In addition, the ECU module may include backup power devices (i.e. capacitors, super capacitors, backup batteries, etc.) which are also mounted to the circuit board and function to provide electrical power in the event of a loss of power from the vehicle's battery. These backup power devices are much larger, in terms of mass and size, than the other electrical components mounted to the circuit board. Since the circuit board(s), electrical components and backup power devices are sensitive to environmental damage, the ECU module typically includes a protective, fluid-tight enclosure assembly to prevent the ingress of dirt and moisture.

Another issue with conventional ECU modules, especially those mounted to a moveable closure panel, is that the electrical components and backup power devices are subjected to high deceleration forces when the closure panel reaches its end of travel (i.e. open and fully-closed) positions. These deceleration forces can be significant and can potentially cause the electrical components and/or the backup power devices to be jarred and eventually damages or detached from the circuit board. Accordingly, the enclosure assembly also is designed to absorb or otherwise dampen these deceleration forces.

While closure latch assemblies having an integrated configuration for the latch module and ECU module provide size and packaging advantages, the need to develop a specific or "dedicated" ECU module configured to mate with each latch module adds complexity and cost. To this end, it would be desirable to develop a standardized or "stand-alone" ECU module having an enclosure assembly adapted to be attached to different latch modules so as to provide interchangeable configurations. In addition to the logistical advantages of having a standardized ECU module capable of being used with different latch modules or different versions of the same latch module, the ECU module could be tested, calibrated and/or debugged independently of the latch module.

In view of the above, there is a recognized need to develop a stand-alone ECU module that is configured to protect the electrical components and backup power devices against damage from exposure to environmental elements and high deceleration forces, that is cost effective to develop and manufacture, and that can be easily adapted to a variety of different latch modules. Moreover, while current power-operated closure latch assemblies are sufficient to meet all regulatory requirements and provide the desired consumer expectations for enhanced comfort and convenience, a need exists directed toward advancing the technology and providing alternative power-operated closure latch assemblies that address and overcome at least some of the known shortcomings associated with conventional arrangements.

SUMMARY

This section provides a general summary of various aspects, features and structural embodiments provided by or associated with the inventive concepts hereinafter disclosed in accordance with the present disclosure and is not intended to be a comprehensive summation and/or limit the interpretation and scope of protection afforded by the claims.

In an aspect, this disclosure provides a closure latch assembly including a latch module and an actuator module configured to be mounted with and secured to the latch module.

In a related aspect, the actuator module is a stand-alone standardized device configured to be directly secured to a plurality of different latch modules.

In another aspect, the actuator module includes a power actuator operable for actuating a mechanism associated with the latch module to provide a "powered" function, and an ECU controlling actuation of the power actuator.

In accordance with these and other aspects, the closure latch assembly of the present disclosure includes a latch module including a mechanism operable in a first state and in a second state; an actuator module including a power actuator for shifting the mechanism from its first state into its second state, and a control unit for controlling actuation of the power actuator; and an attachment arrangement for securing the actuator module to the latch module.

The actuator module associated with the closure latch assembly of the present disclosure includes an ECU/actuator assembly and an ECU cover. The ECU/actuator assembly includes a housing plate, and the control unit is mounted to and at least partially over-molded on the housing plate. The control unit includes a printed circuit board (PCB) having at least one of an electrical connector and a backup power device, and the control unit and the power actuator are part of a common assembly. The power actuator includes a carrier plate secured to housing plate, an electric motor secured to the carrier plate and driving a drive pinion, a drive gear rotatably mounted to the carrier plate and meshed with the drive pinion, and a gear stop bumper secured to the carrier plate. The drive gear includes an actuation feature operatively connected to the mechanism within the latch module such that rotation of the drive gear from the first position to a second position via energization of the electric motor results in shifting of the mechanism from its first state into its second state.

In accordance with these and other aspects, the present disclosure is directed to a method of manufacturing an actuator module including a power actuator for shifting states of a latch module including a mechanism operable in a first state and in a second state, the power actuator including a carrier plate, an electric motor securable to the carrier plate and comprising a motor shaft driving a drive pinion, and a drive gear rotatably mounted to the carrier plate and meshed with the drive pinion, the method comprising the steps of: overmolding the carrier plate to a housing plate comprising a first side and a second side; forming a port in the housing plate for receiving the motor shaft therethrough extending from the first side to the second side; sealing the port; securing the electric motor to the carrier plate on the first side of the housing plate; positioning a control unit for controlling actuation of the power actuator on the first side of the housing plate; and connecting the control unit to the electric motor.

In accordance with these and other aspects, the actuator module of the present disclosure includes an ECU/actuator assembly, an ECU cover, and an attachment arrangement for attaching the ECU cover to the ECU/actuator assembly and for attaching the actuation module to the latch module. The ECU/actuator assembly is generally configured to include a housing plate and a control unit mounted to and at least partially overmolded on the housing plate. The control unit is generally configured to include a printed circuit board having electrical contacts and at least one backup power source mounted thereon, and a power actuator. The power actuator includes a carrier plate adapted to be secured to the housing plate, an electric motor secured to the carrier plate and having a motor shaft driving a drive pinion, a drive gear rotatably mounted to the carrier plate and in constant mesh with the drive pinion, an actuation feature extending from the drive gear and configured to interact with a latch mechanism of the latch module, and a gear stop bumper mounted to the carrier plate. The axis of rotation of the motor shaft being generally aligned in parallel with a pivotable member of the latch mechanism.

In accordance with another aspect of the disclosure, a closure latch assembly is provided, including: a latch module having a ratchet and a pawl, with the ratchet being moveable between a striker capture position and a striker release position and the pawl being moveable between a ratchet holding position, whereat the ratchet is maintained in the striker capture position, the a ratchet release position, whereat the ratchet is biased toward the striker release position. Further, an actuator module including a power actuator is operably coupled to a drive gear. The drive gear has an actuation feature fixed thereto. Further yet, a latch release mechanism operably couples the actuation feature to the pawl, wherein rotation of the drive gear via energization of the power actuator causes the latch release mechanism to move the pawl between the ratchet holding position and the ratchet release position.

In accordance with a further aspect, the latch release mechanism can include a link arm operably coupling the pawl to the actuation feature, with the power actuator being configured to rotate the drive gear in a lost motion connection with the pawl to move the pawl from the ratchet holding position to the ratchet release position.

In accordance with a further aspect, the lost motion connection can be provided between the actuation feature and the link arm.

In accordance with a further aspect, the link arm can be provided having a slot extending between a first drive end and a second drive end, and the actuation feature can be disposed in the slot for sliding movement between the first drive end and the second drive end.

In accordance with a further aspect, the actuation feature can be provided as a pin fixed to and extending laterally outwardly from the drive gear.

In accordance with a further aspect, the link arm can be pivotably coupled to the pawl.

In accordance with a further aspect, a release cable configured for manual actuation can be operably coupled to the pawl.

In accordance with a further aspect, a spring member can be attached to the release cable, and the spring member can be configured for engagement with a release member coupled to the pawl during manual actuation to move the pawl from the ratchet holding position to the ratchet releasing position.

In accordance with a further aspect, the spring member can be provided as a torsion spring.

In accordance with a further aspect, the closure latch assembly can include a release lock device configured to be selectively moved to a locked position to prevent movement of a release cable to prevent the pawl from moving to the ratchet release position and to be selectively moved to an unlocked position to allow movement of the release cable to allow the pawl to move to said ratchet release position.

In accordance with a further aspect, an electric motor can be provided to selectively move the release lock device between the locked and unlocked positions.

In accordance with a further aspect, the release lock device can be provided having a bifurcated end region forming a slot between a pair of fingers, with the release cable being sized for receipt in the slot and the fingers being positioned to block movement of a stop feature fixed to the release cable when the release lock device is in the locked position.

In accordance with a further aspect, the closure latch assembly can include a release mechanism operable via manual actuation of a release cable to open the vehicle closure panel from outside the motor vehicle.

In accordance with a further aspect, the release mechanism can be provided having an actuation pulley fixed to the release cable, with the actuation pulley being supported for rotation about a drive gear axis of the drive gear between a non-actuated position and an actuated position and having an actuation member fixed thereto, wherein the actuation member is arranged for engagement with the drive pin of the latch release mechanism to move the pawl to the ratchet release position when the actuation pulley is moved to the actuated position.

In accordance with a further aspect, the release cable fixed to the actuation pulley can be configured for direct or operable actuation by an outside key cylinder.

In accordance with a further aspect, the actuation pulley can biased by a spring member toward its non-actuated position to automatically return the actuation pulley to the non-actuated position absent an external force being applied to overcome a bias imparted by the spring member.

In accordance with yet another aspect of the disclosure, a method of manufacturing a closure latch assembly includes: supporting a ratchet in a housing for movement between a striker capture position and a striker release position; supporting a pawl in the housing for movement between a ratchet holding position, whereat the ratchet is in the striker capture position, and a ratchet releasing position, whereat the ratchet is biased toward the striker release position, and biasing the pawl toward the striker release position; disposing a drive gear having an actuation feature fixed thereto in the housing; operably coupling a power actuator to the drive gear, with the power actuator being configured to be energized to move the drive gear between a home position, whereat the pawl is in the ratchet holding position, and a fully actuated position, whereat the pawl is in the ratchet releasing position; and operably coupling the actuation feature to the pawl with a latch release mechanism such that rotation of the drive gear in response to energization of the power actuator causes the latch release mechanism to move the pawl between the ratchet holding position and the ratchet releasing position.

In accordance with yet another aspect, the method of manufacturing a closure latch assembly can include configuring the latch release mechanism to provide a lost motion connection between the actuation feature and the pawl.

In accordance with yet another aspect, the method of manufacturing a closure latch assembly can include providing the latch release mechanism including a link arm having a slot extending between a first drive end and a second drive end and providing the actuation feature including a drive pin configured for sliding movement between the first drive end and the second drive end.

In accordance with yet another aspect, the method of manufacturing a closure latch assembly can include configuring the drive pin to move from the second drive end toward the first drive end upon energization of the power actuator and causing the pawl to initiate movement from the ratchet holding position toward the ratchet releasing position upon the drive pin engaging the first drive end.

In accordance with yet another aspect, the method of manufacturing a closure latch assembly can include operably coupling a release cable to the pawl and configuring the release cable for manual actuation, whereupon the lost motion connection prevents the power actuator from being backdriven.

In accordance with yet another aspect, the method of manufacturing a closure latch assembly can include coupling the release cable to a spring member and configuring the spring member to engage a release member during manual actuation to move the pawl from the ratchet holding position to the ratchet releasing position.

In accordance with yet another aspect, the method of manufacturing a closure latch assembly can include configuring a release lock device to be selectively moved to a locked position to prevent movement of the release cable to prevent the pawl from moving to the ratchet release position and to be selectively moved to an unlocked position to allow movement of the release cable to allow the pawl to move to the ratchet release position.

In accordance with yet another aspect, the method of manufacturing a closure latch assembly can include configuring an electric motor in operable communication with the release lock device to move the release lock device between the locked and unlocked positions.

In accordance with yet another aspect, the method of manufacturing a closure latch assembly can include configuring a release mechanism for manual actuation of the release cable to open the vehicle closure panel from outside the motor vehicle.

In accordance with yet another aspect, the method of manufacturing a closure latch assembly can include providing the release mechanism having an actuation pulley fixed to the release cable and supporting the actuation pulley for rotation about a drive gear axis of the drive gear between a non-actuated position and an actuated position and providing the actuation pulley having an actuation member fixed thereto, and arranging the actuation member for engagement with the drive pin to move the pawl to the ratchet release position when the actuation pulley is moved to the actuated position.

In accordance with yet another aspect, the method of manufacturing a closure latch assembly can include configuring the release cable for actuation by an outside key cylinder.

In accordance with yet another aspect, the method of manufacturing a closure latch assembly can include configuring a reset device for manual actuation to engage the actuation feature and operably move the pawl from the ratchet releasing position to the ratchet holding position.

In accordance with yet another aspect, the method of manufacturing a closure latch assembly can include providing the reset device having an actuation feature configured to be accessible for manual actuation on a shut face of the closure panel of the motor vehicle.

In accordance with another aspect, there is disclosed a method of controlling an actuatable mechanism of a closure latch assembly including providing a power actuator configured to be energized to move an actuation feature between a home position and a fully actuated position, coupling the actuatable mechanism to the actuation feature using a lost motion connection, energizing the power actuator to move the actuator feature to an engagement position with the lost motion connection for actuating the actuatable mechanism, and energizing the power actuator to move the actuator feature to a disengagement position with lost motion connection for allowing freeplay between the actuation feature and the lost motion connection. In accordance with a related aspect, the method further includes deenergizing the power actuator when the actuator feature is in the engagement position to lock the lost motion connection against movement and prevent a deactuation of the actuable mechanism. In accordance with a related aspect, the method further includes allowing the actuation feature to move a predetermined amount prior to the engagement position with the lost motion connection. In accordance with a related aspect, the method further includes manually moving the actuatable mechanism when the actuator feature is in the disengagement position. In accordance with a related aspect, the method further includes biasing the actuatable mechanism to deactuate. In accordance with a related aspect, the method further includes supporting the actuation feature on a gear rotatable by the power actuator. In accordance with a related aspect, the method further includes supporting the actuation feature closer to the center of the gear rather than to an outer periphery of the gear. In accordance with a related aspect, the lost motion connection includes a slot provided in a lever pivotally coupled to the actuatable mechanism and the actuation feature is a pin configured to be slideably received within the slot. In accordance with a related aspect, the actuatable mechanism is a lock mechanism of the closure latch assembly. In accordance with a related aspect, the actuatable mechanism is a pawl assembly of the closure latch assembly. In accordance with a related aspect, the method further includes the actuatable mechanism is a ratchet of the closure latch assembly.

In accordance with another aspect, there is disclosed a closure latch assembly including: a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position, a power actuator operably coupled to the pawl using a lost motion connection when in an engagement position with the lost motion position and operably decoupled from the pawl when in a disengagement position, such that the lost motion connection allows the inertia of the power actuator to substantially increase before the lost motion connection transitions from the disengagement position to the engagement position.

In accordance with another aspect, there is disclosed a closure latch assembly including a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position, a power actuator operably coupled to the pawl using a lost motion connection when in an engagement position with the lost motion position and operably decoupled from the pawl when in a disengagement position, such that the power actuator increases the inertia of the components upstream the lost motion before the lost motion connection is in the engagement position, and wherein the inertia of the components downstream the lost motion connection is overcome using the inertia of the components upstream the lost motion connection after the lost motion connection is in the engagement position. In a related aspect, the power actuator does not increase the inertia of the components downstream the lost motion before the lost motion connection is in the engagement position.

In accordance with another aspect, there is provided a release lever for a latch assembly, the release lever having a unitary body, where one part of the unitary body is provided in a coiled arrangement and another part of the unitary body extends away from the coiled arrangement as an arm, the arm having an engagement feature for coupling with a release cable. In a related aspect, the unitary body is provided as a singular wire. In a related aspect, at least one of the coiled arrangement and the arm are configured with resilience to flex under loading imparted to the arm by the release cable and unflex when loading imparted to the arm by the release cable is removed. In another related aspect, the release cable includes a ferrule and the arm includes a bend in a part of the unitary body configured for preventing the ferrule from disengaged from the arm. In a related aspect, the arm is configured to engage and move a latch component in response to being moved by the release cable. In a related aspect, the latch component being moved by the arm is a pawl.

These and other aspects and areas of applicability will become apparent from the description provided herein. The description and specific examples in this summary are solely intended for purpose of illustration and are not intended to limit the scope of the present disclosure. The drawings that accompany the detailed description are described below.

BRIEF DESCRIPTION OF THE DRAWINGS

The drawings described herein are for illustrative purposes only of selected non-limiting embodiments and not all possible or anticipated implementations thereof, and are not intended to limit the scope of the present disclosure.

Corresponding reference numbers are used to indicate corresponding components throughout the several views associated with the above-identified drawings.

DETAILED DESCRIPTION OF EXAMPLE EMBODIMENTS

Figure 1:
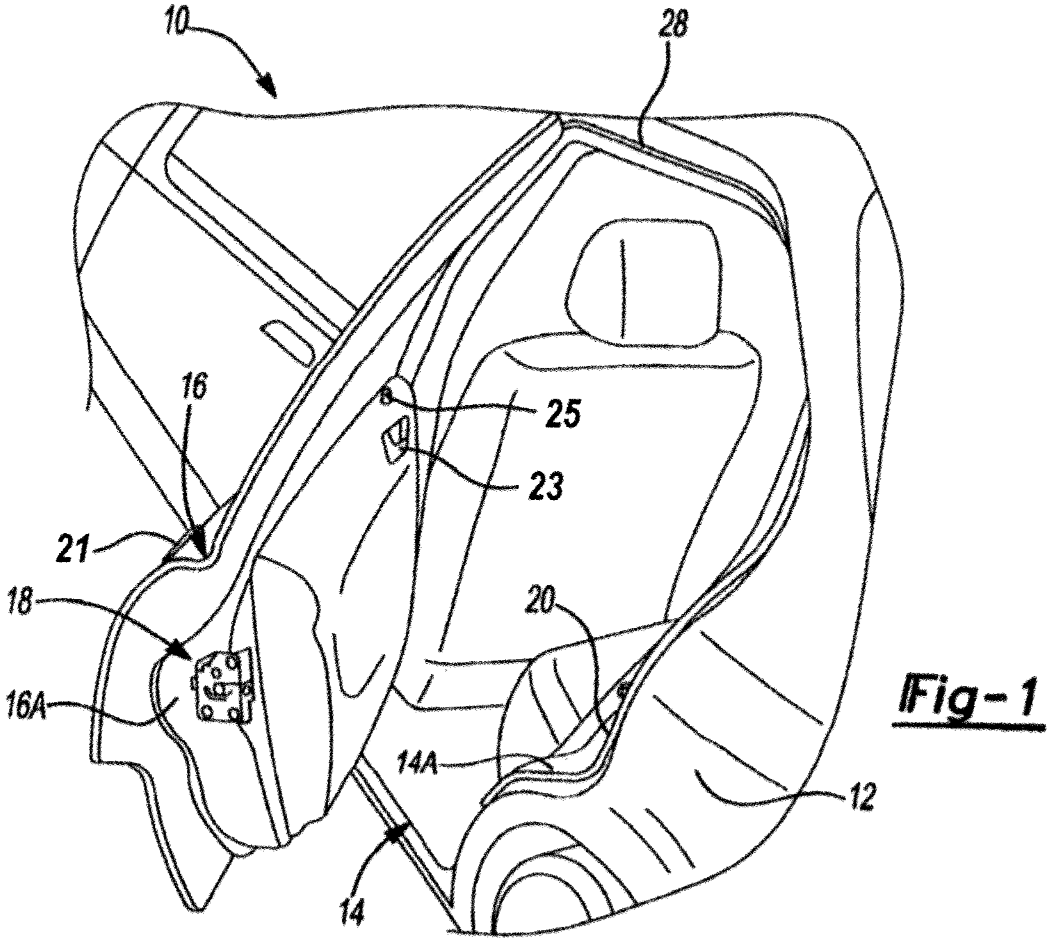
FIG. 1 is an isometric view of a motor vehicle equipped with a closure system including a closure latch assembly shown mounted to a vehicle door.
Figure 2:
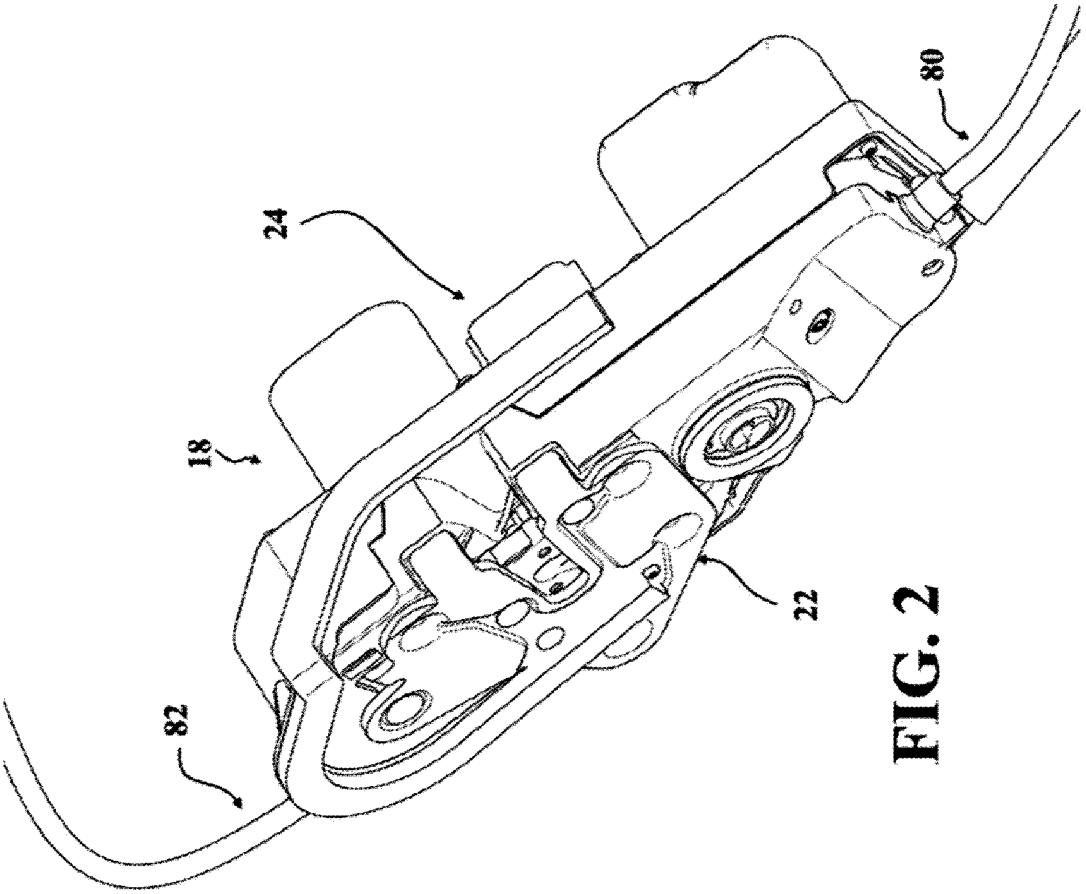
FIG. 2 is an isometric view of a closure latch assembly adapted for use in the closure system shown in FIG. 1 and which is configured to include a latch module and an actuator module constructed to embody the inventive concepts of the present disclosure.
Figure 3:
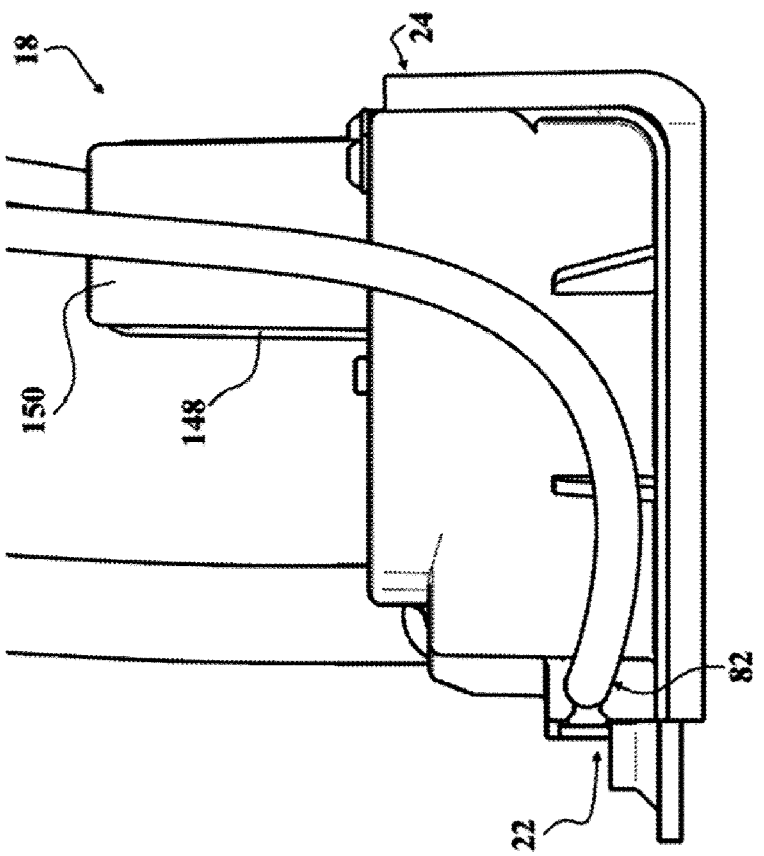
FIG. 3 is a top view of the closure latch assembly shown in FIG. 2.
Figure 4:
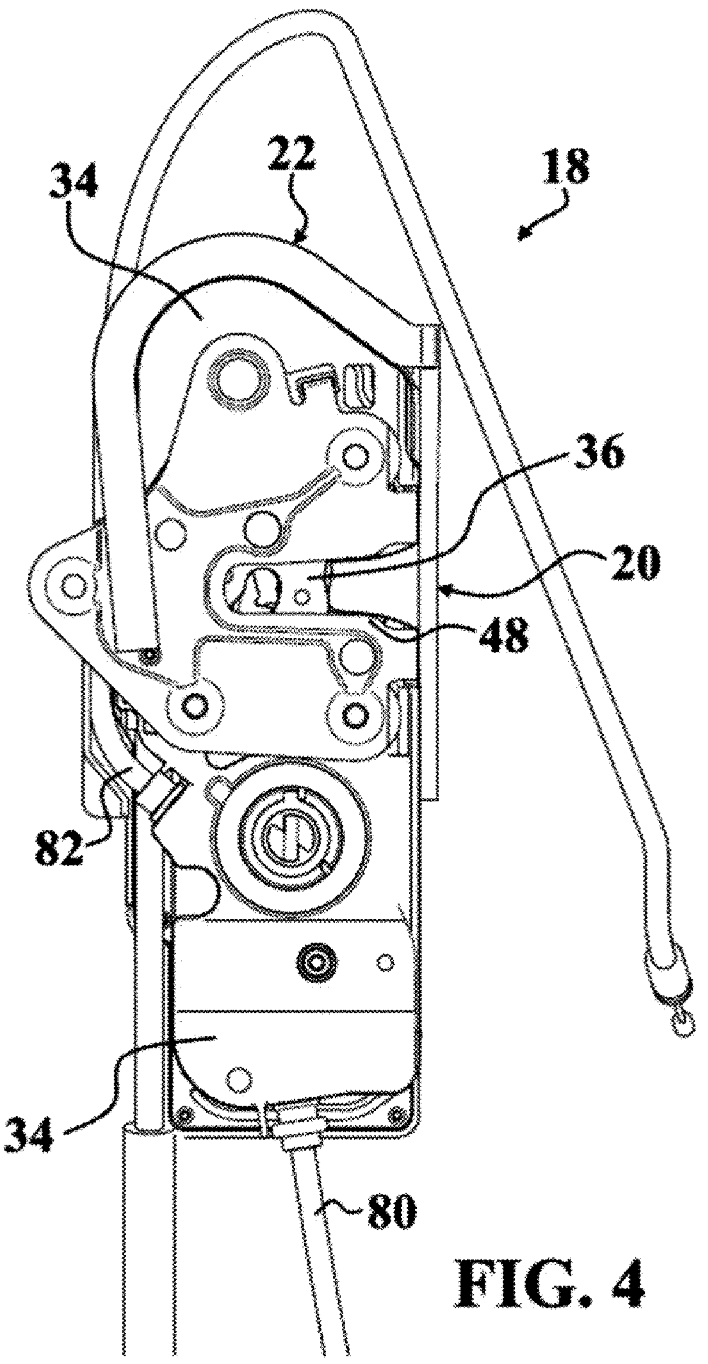
FIG. 4 is a plan view of the closure latch assembly shown in FIG. 2.
Figure 5:
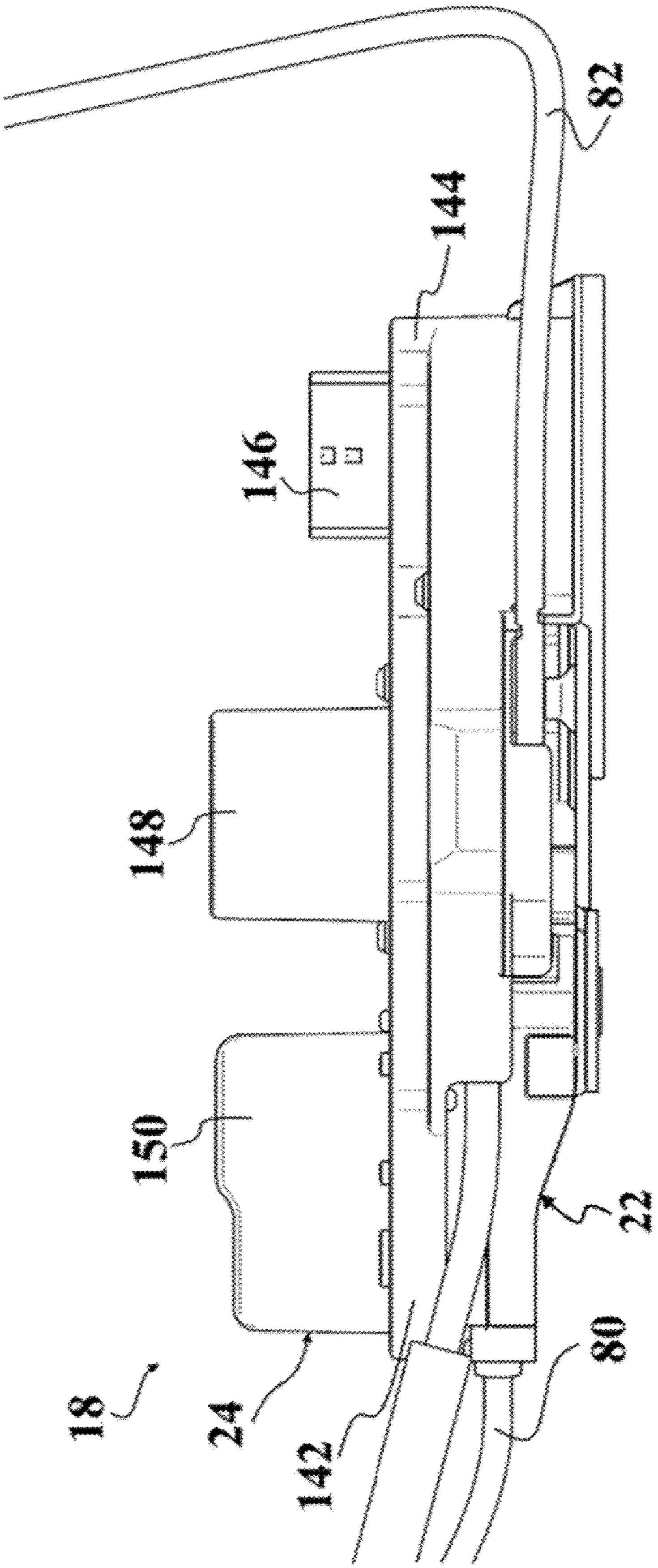
FIG. 5 is a side view of the closure latch assembly shown in FIG. 2.

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression "closure latch assembly" will be used to generally, as an illustrative example, indicate any power-operated latch device adapted for use with a vehicle closure panel to provide a "powered" (i.e. release, cinch, lock/unlock, etc.) feature. Additionally, the expression "closure panel" will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding or pivoting side passenger doors of a motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, a motor vehicle 10 is shown to include a vehicle body 12 defining an opening 14 to an interior passenger compartment. A vehicle closure panel 16 is pivotably mounted to body 12 for movement between an open position (shown), a partially-closed position, and a fully-closed position relative to opening 14. A closure latch assembly 18 is rigidly secured to closure panel 16 adjacent to an edge portion 16A thereof and is releasably engageable with a striker 20 that is fixedly secured to a recessed edge portion 14A of opening 14. As will be detailed, closure latch assembly 18 is generally comprised of a latch module 22, an actuator module 24, and an attachment arrangement 26 connecting actuator module 24 to latch module 22 and providing a sealed interface therebetween. Latch module includes a latch mechanism 32 (FIGS. 6 and 7) operable to engage striker 20 and releasably hold closure panel 16 in one of its partially-closed and fully-closed positions. An outside handle 21 and an inside handle 23 are provided for actuating (i.e. mechanically and/or electrically) closure latch assembly 18 to release striker 20 and permit subsequent movement of closure panel 16 to its open position. An optional lock knob 25 is shown which provides a visual indication of the locked state of closure latch assembly 18 and which may also be operable to mechanically change the locked state of closure latch assembly 18. A weather seal 28 is mounted on edge portion 14A of opening 14 in vehicle body 12 and is adapted to be resiliently compressed upon engagement with a mating sealing surface on closure panel 16 when closure panel 16 is held by closure latch assembly 18 in its fully-closed position so as to provide a sealed interface therebetween which is configured to prevent entry of rain and dirt into the passenger compartment while minimizing audible wind noise. For purpose of clarity and functional association with motor vehicle 10, the closure panel is hereinafter referred to as door 16. FIGS. 2 through 5 illustrate various views of closure latch assembly 18 prior to installation in door 16 and show the general orientation of actuator module 24 relative to latch module 22.

Figure 6:
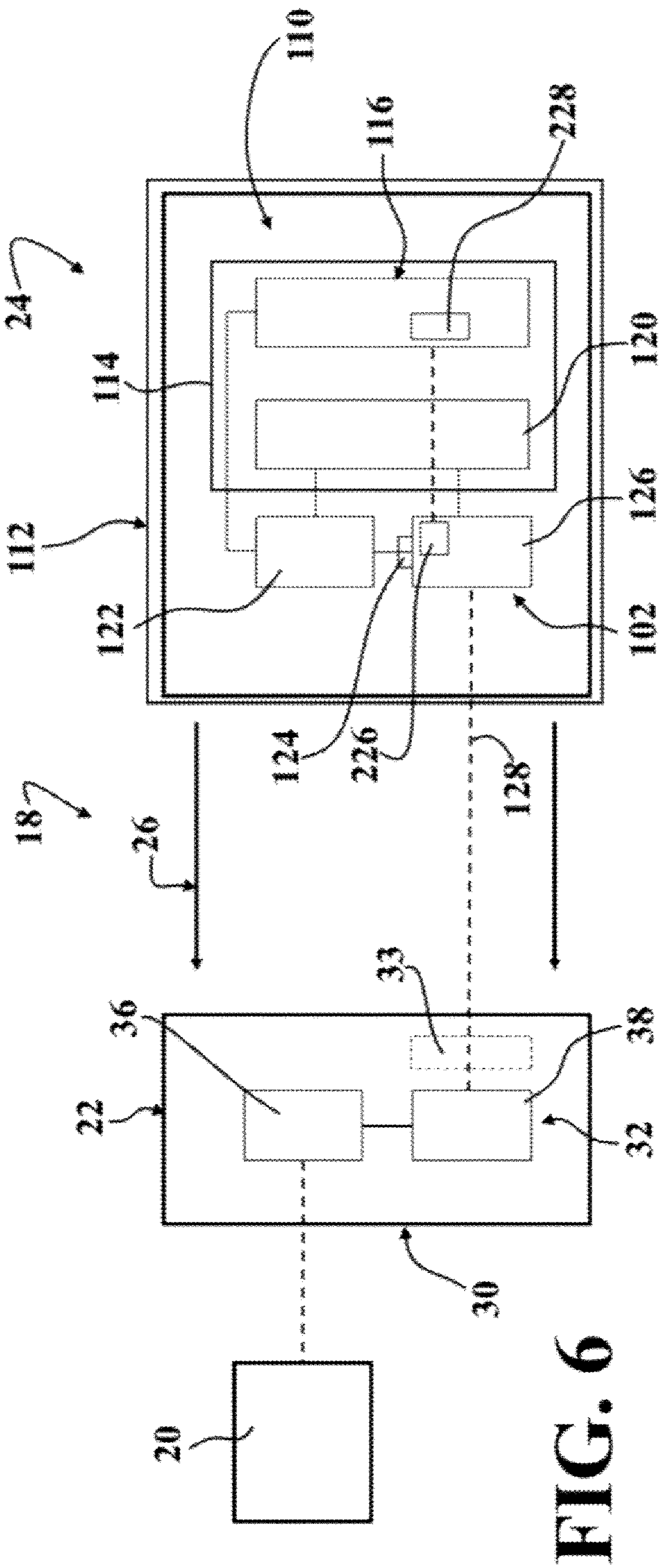
FIG. 6 is a diagrammatical view of the closure latch assembly shown in FIGS. 2-5 which illustrates various components of the latch module and the actuator module.
Figure 7A:
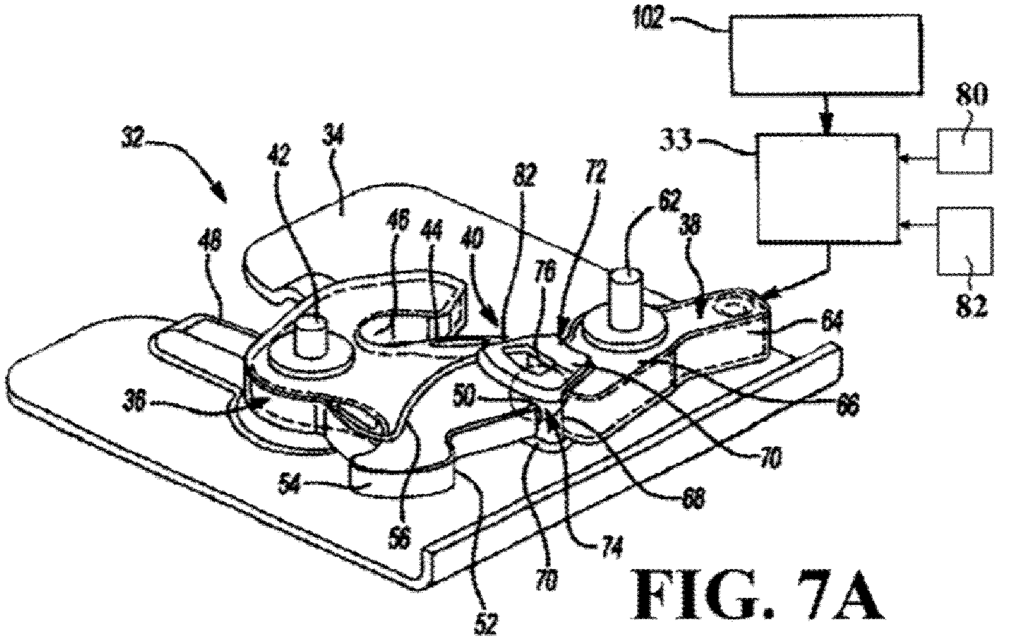
FIGS. 7A through 7D illustrate a non-limiting example embodiment of the latch module.

Referring now to FIG. 6, a diagrammatical version of closure latch assembly 18 illustrates the general orientation of latch module 22, actuator module 24, and attachment arrangement 26. Latch module 22 generally includes a latch housing 30 within which the components of latch mechanism 32 and a latch release mechanism 33 are supported. For purposes of illustration only, a non-limiting version of latch mechanism 32 is shown in FIGS. 7A-7D, generally include a latch frame plate 34, ratchet 36, and a pawl 38 having a roller-type engagement device 40. Ratchet 36 is supported on latch frame plate 34 by a ratchet pivot post 42 for movement between a released or "striker release" position (FIG. 7B), a soft close or "secondary striker capture" position (FIG. 7C), and a hard close or "primary striker capture" position (FIGS. 7A and 7D). Ratchet 36 includes a striker guide channel 44 terminating in a striker retention cavity 46. As seen, latch frame plate 34 includes a fishmouth slot 48 aligned to accept movement of striker 20 relative thereto upon movement of door 16 toward its closed positions. Ratchet 36 includes a primary latch notch 50, a secondary latch notch 52, and an edge surface 54. A raised guide surface 56 is also formed on ratchet 36. Arrow 58 indicates a ratchet biasing member that is arranged to normally bias ratchet 36 toward its striker release position.

Pawl 38 is shown pivotably mounted to latch frame plate 34 about a pawl pivot post 62 and includes a first pawl leg segment 64 and a second pawl leg segment 66 defining a pawl engagement surface 68. Roller-type engagement device 40 is secured to second pawl leg segment 66 of pawl 38 and includes a pair of oppositely-disposed sidewalls 70 defining a cage 72, and a roller, shown as a spherical ball bearing 74, that is retained by cage 72 within aligned roller slots 76 formed in sidewalls 70. Pawl 38 is pivotable between a ratchet releasing position (FIG. 7B) and a ratchet holding position (FIGS. 7A, 7C and 7D). Pawl 38 is normally biased toward its ratchet holding position by a pawl biasing member, indicated by arrow 80.

Figure 7B:
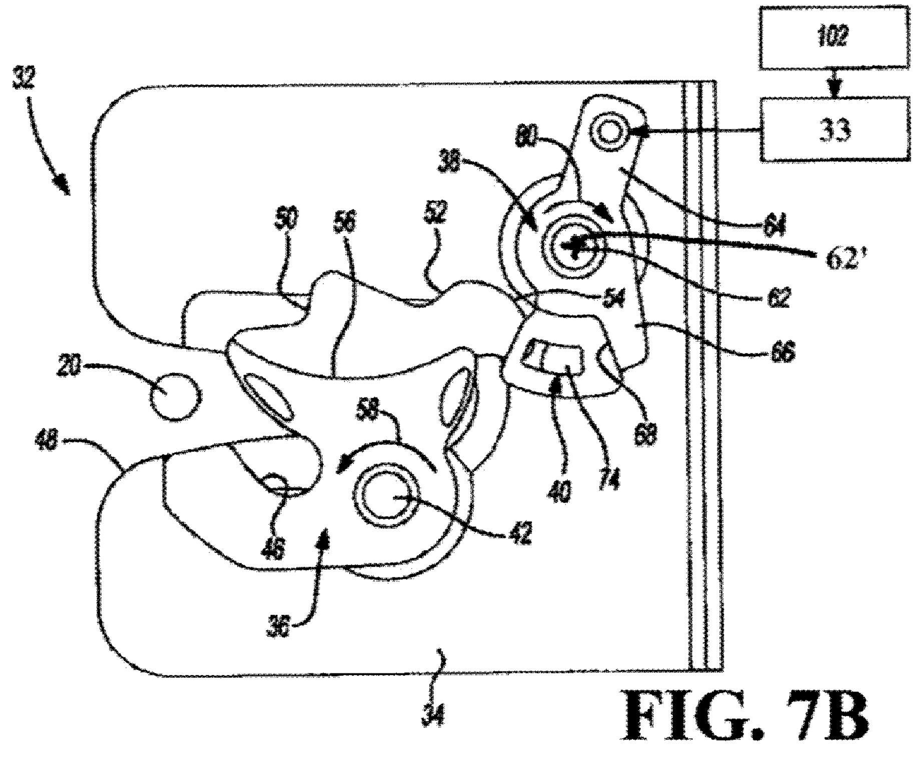
Figure 7C:
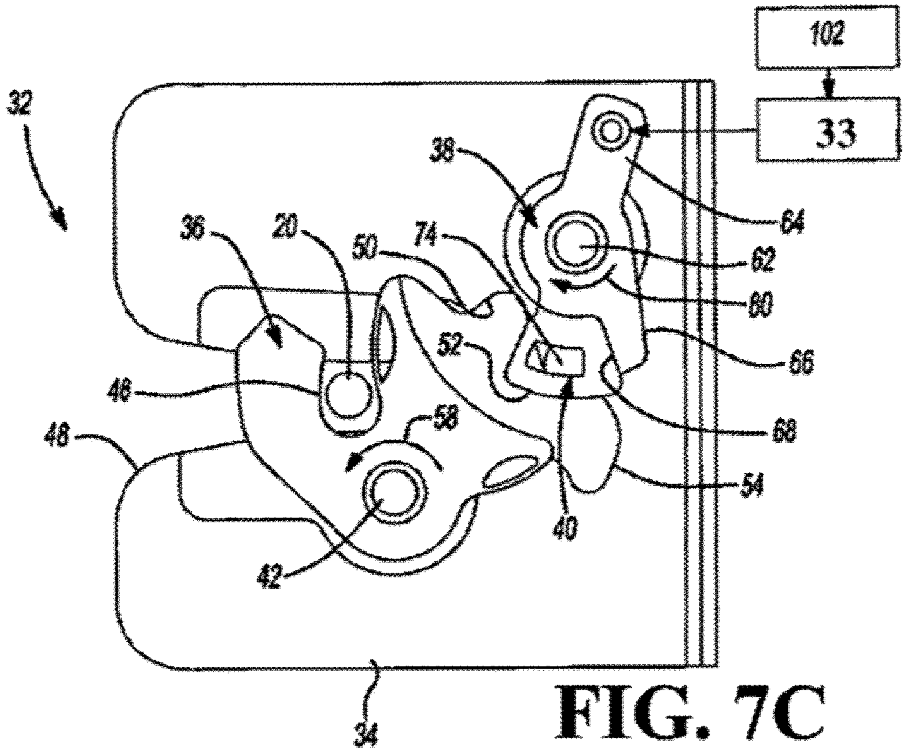
Figure 7D:
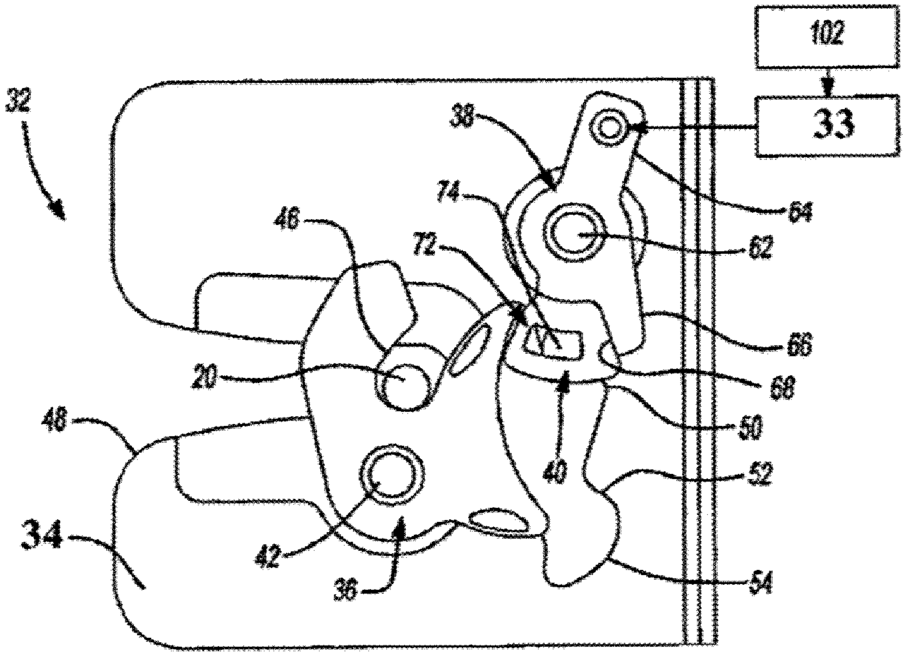

As shown in FIG. 7B, pawl 38 is held in its ratchet releasing position when ratchet 36 is located in its striker release position due to engagement of ball 74 with pawl engagement surface 68 on pawl 38 and with edge surface 54 on ratchet 36, whereby a released operating state for latch mechanism 32 is established. As shown in FIG. 7C, ball 74 is in engagement with pawl engagement surface 68 on pawl 38 and with secondary latch notch 52 on ratchet 36 so as to cause pawl 38, now located in its ratchet holding position, to hold ratchet 36 in its secondary striker capture position. In this orientation, striker 20 is retained between ratchet guide channel 46 and fishmouth slot 48 in latch plate 34 to hold door 16 in a partially-closed position and establish a secondary latched state for latch mechanism 32. Finally, FIGS. 7A and 7D illustrate pawl 38 located in its ratchet holding position with ball 74 in engagement with pawl engagement surface 68 on pawl 38 and with primary latch notch 50 on ratchet 36 such that pawl 38 holds ratchet 36 in its primary striker capture position so as to hold door 16 in its fully-closed position and establish a primary latched operating state for latch mechanism 32.

Latch release mechanism 33 is shown schematically to be connected to first pawl leg segment 64 of pawl 38. Latch release mechanism 33 functions to cause movement of pawl 38 from its ratchet holding position into its ratchet releasing position when it is desired to shift latch mechanism 32 into its released operating state. An inside latch release mechanism (see cable 80 in FIGS. 3-5) connects inside handle 23 to latch release mechanism 33 to permit manual release of latch mechanism 32 from inside the passenger compartment of vehicle 10. Likewise, an outside latch release mechanism (see cable 82 in FIGS. 4-5) connects outside handle 21 to latch release mechanism 33 to permit manual release of latch mechanism 32 from outside of vehicle 10.

In addition, a power release actuator 102, associated with actuator module 24, is shown in FIGS. 7A-7D schematically connected to latch release mechanism 33. Actuation of power release actuator 102 causes latch release mechanism 33 to move pawl 38 from its ratchet holding position into its ratchet releasing position. As will be detailed, power release actuator 102 is an electric motor-driven arrangement forming part of a power release chain. A ratchet switch lever (not shown) is mounted to ratchet 36 and works in cooperation with a ratchet release sensor (not shown) to provide a "door open" signal when ratchet 36 is located in its striker release position and a secondary latched sensor (not shown) to provide a "door ajar" signal when ratchet 36 is located in its secondary striker capture position. As is well known, these sensor signals are used by a latch control system integrated into actuator module 24 to control operation of power release actuator 102.

Referring again to FIG. 6, actuator module 24 is generally shown to include an ECU/actuator assembly 110 and an ECU cover 112, which together are secured to latch housing 30 of latch module 22 via attachment arrangement 26. ECU/actuator assembly 110 generally includes a housing plate 114, power actuator 102, and a control unit 116. As will be described in more detail, power actuator 102 is pre-assembled prior to mounting on housing plate 114 and generally includes a carrier plate 120, an electric motor 122 mounted to carrier plate 120 and having a motor shaft 194 driving a pinion gear 124, a drive gear 126 in constant meshed engagement with pinion gear 124 and having an actuation feature 128 adapted to interact with latch release mechanism 33, and a gear stop bumper 130 mounted to carrier plate 120. As a result of the arrangement discussed herein, the only access port into the sealed ECU/actuator assembly 110 is via the opening provided for the motor shaft 124, which is easily sealed, thereby simply and effectively sealing the electronics and motor housing of the actuator module 24.

In this non-limiting configuration, power actuator 102 interacts with latch module 22 to provide a "power release" function by actuating latch release mechanism 33 to cause pawl 38 to move from its ratchet holding position into its ratchet releasing position. However, power actuator 102 could additionally, or alternatively, be configured to provide one or more other "powered" functions provided by latch module 22 such as, for example, power cinch or power lock/unlock. According to an aspect of the present disclosure, power actuator 102 is associated with actuator module 24 instead of latch module 22. Conventionally, power-operated closure latch assemblies have been configured with the power actuator installed in the latch module such that an ECU module only provided power and control signals to the power actuator. The present disclosure, in contrast, provides at least one power actuator in combination with such an ECU module, thereby defining the term "actuator module" as used herein.

Figure 8:
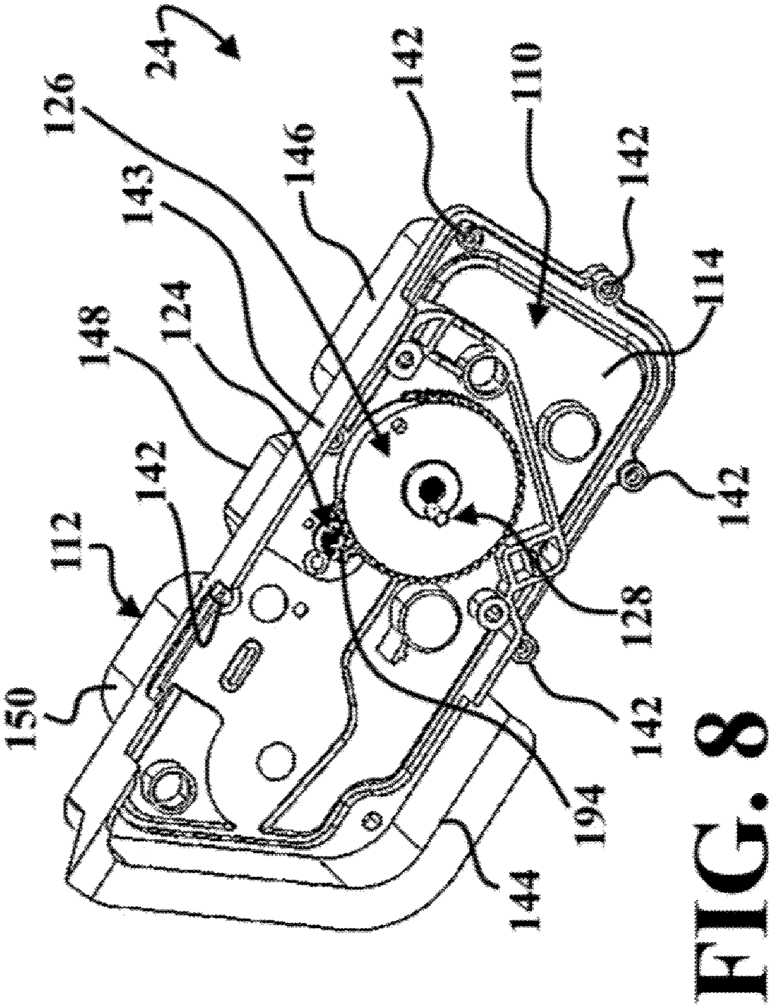
FIGS. 8 and 9 are isometric views of the actuator module constructed according to a first embodiment of the present disclosure and which includes an ECU cover and an ECU/actuator assembly.
Figure 9:
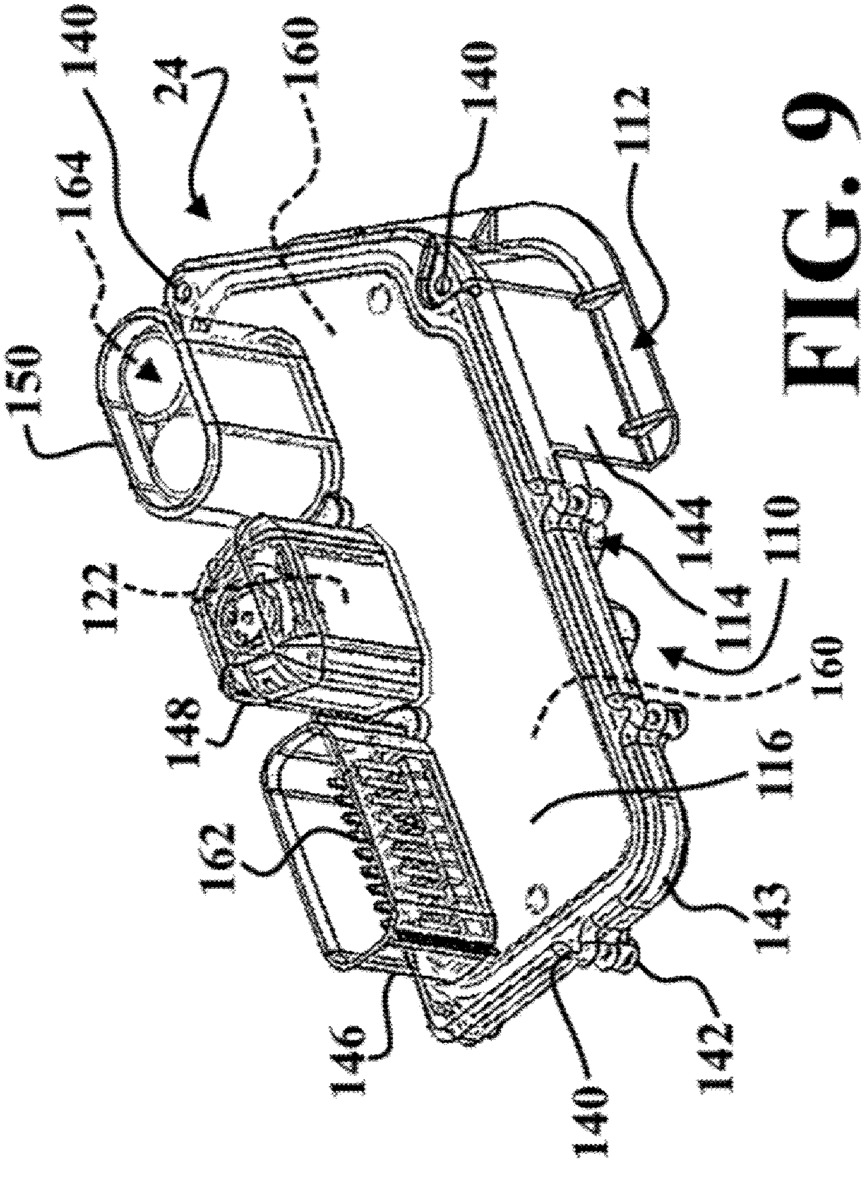
Figure 10:
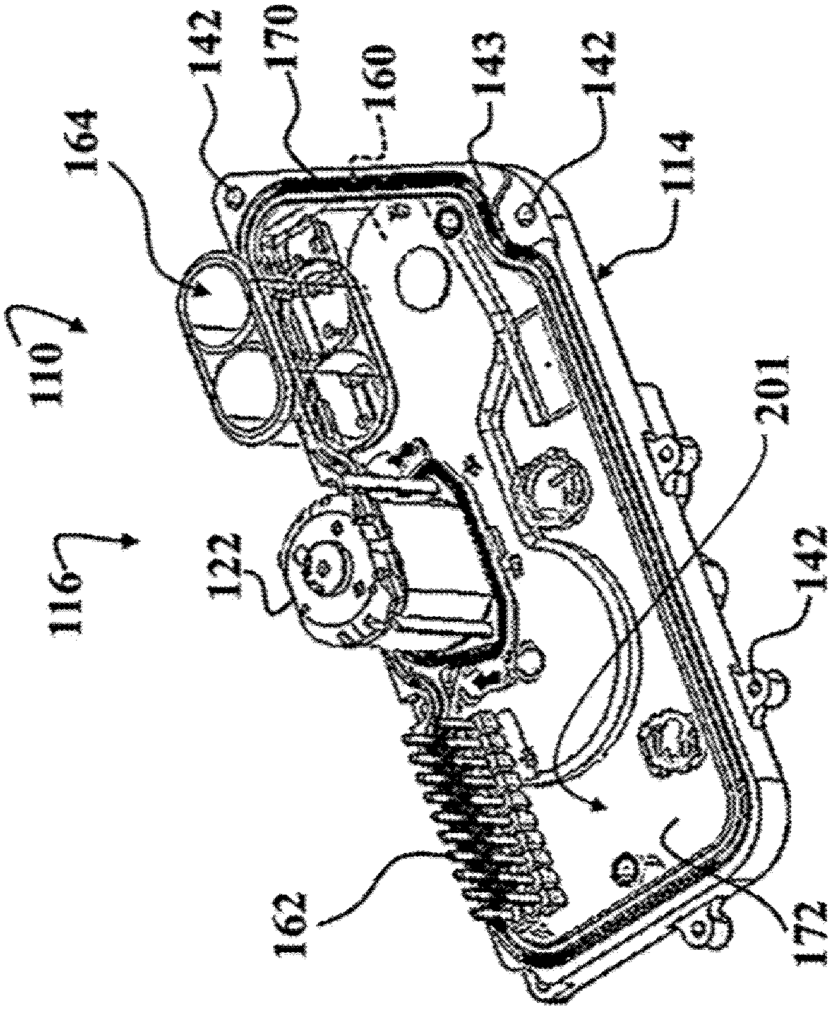
FIGS. 10 and 11 are isometric views of the ECU/actuator assembly associated with the actuator module shown in FIGS. 8 and 9 and which includes a housing plate and a control unit overmolded on the housing plate.
Figure 11:
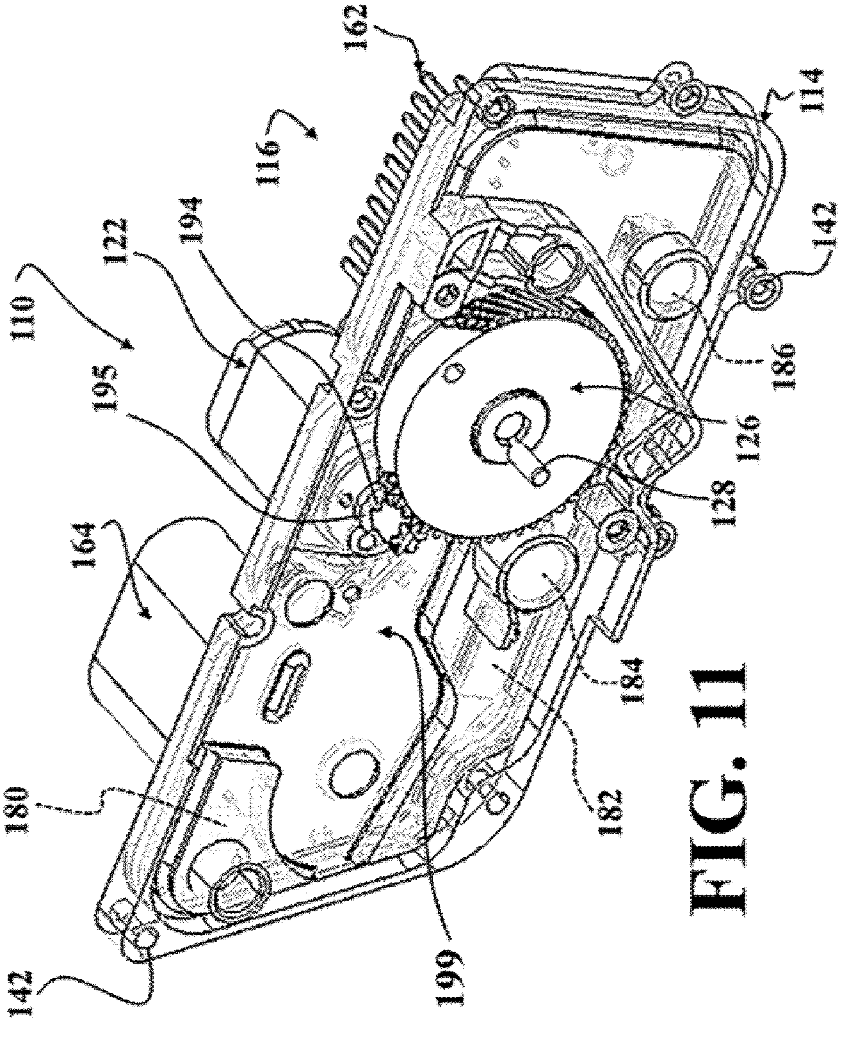

FIGS. 8 and 9 illustrate ECU cover 112 mounted on ECU/actuator assembly 110 with a plurality of mounting apertures 140 formed in ECU cover aligned with a similar plurality of alignment bores 142 formed in housing plate 114 of ECU/actuator assembly 110. Suitable fasteners, such as screws, define attachment arrangement 26 and are installed in aligned pairs of mounting apertures 140 in ECU cover 112 and alignment bores 142 in housing plate 114 to secure actuator module 24 to latch module 22. ECU cover 112 is shown best in FIG. 9 to include a plate segment 143, a peripheral shroud segment 144 extending from plate segment 143, and a plurality of upstanding enclosure segments 146, 148, 150 also extending from plate segment 143. Enclosure segments 146, 148, 150 of ECU cover 112 are configured to enclose distinct components associated with control unit 116. Specifically, plate segment 143 is arranged to enclose a printed circuit board (PCB) 160 which has been encapsulated/over-molded onto a first surface of housing plate 114. Likewise, enclosure segment 146 is a connector housing surrounding a plurality of connector contacts 162 extending from PCB 160 to define an electrical connector. In addition, enclosure segment 148 is a motor housing configured to enclose electric motor 122 which is mounted to carrier plate 120 and which, in turn, is encapsulated, such as by being over-molded on the first surface of housing plate 114. Finally, enclosure segment 150 is a capacitor housing configured to enclose one or more Super Capacitors 164 electrically connected to PCB 160. A peripheral seal 170 surrounds plate segment 143 of housing plate 114 and seals the first surface of housing plate 114 relative to ECU cover 112. FIGS. 10 and 11 illustrate ECU/actuator assembly 110 with ECU cover 112 removed to better illustrate the components. Note that FIG. 10 best illustrates PCB 160 being encapsulated/over-molded onto plate segment 143 of housing plate 114, with reference number 172 identifying this layer of over-mold material.

Figure 12:
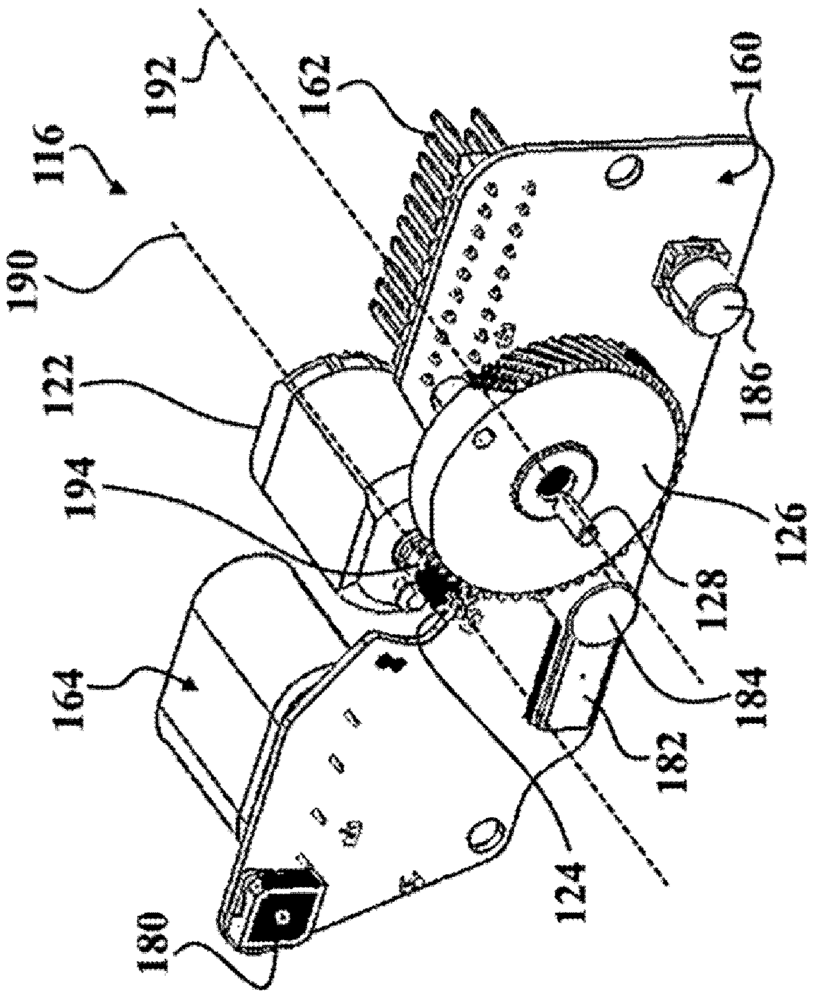
FIGS. 12 and 13 are isometric views of the control unit associated with the ECU/actuator assembly shown in FIGS. 10 and 11 and which includes a printed circuit board (PCB), a pack of super capacitors, and a power actuator.
Figure 13:
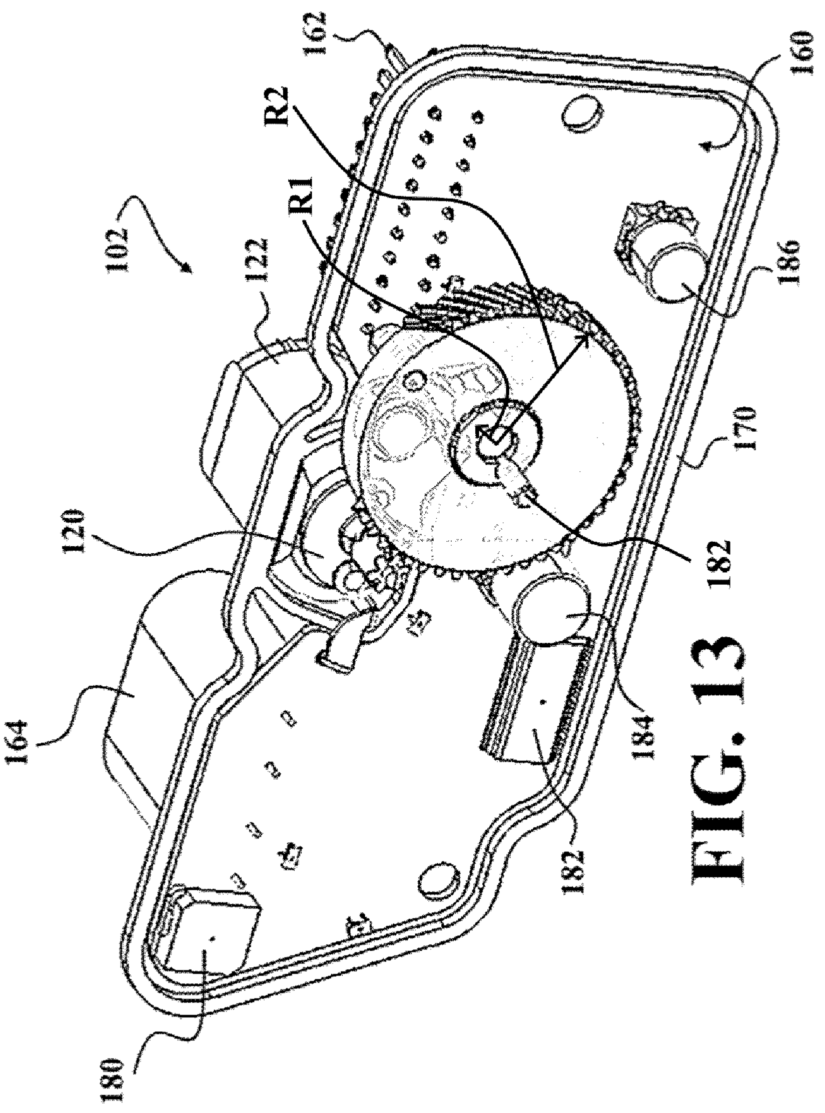

FIGS. 12 and 13 illustrate control unit 116 assembled prior to being overmolded onto the first surface of housing plate 114. In addition to Super Capacitors 164 and connector contacts 162, other electrical components 180, 182, 184 and 186 are shown mounted to an underside surface of PCB 160. These additional components are located in corresponding retention cavities formed in housing plate 114, as shown in phantom in FIGS. 10 and 11. Line 190 indicates a motor axis for electric motor 122 and about which motor shaft 194 and pinion gear 124 rotates. Line 192 indicates a gear axis for drive gear 126 and about which actuation feature 128 rotates. Gear axis 192 is aligned to be generally parallel to motor axis 190. In addition, motor axis 190 is also aligned to be generally parallel to pawl axis 62. This is in stark contrast to conventional arrangements where the electric motor is housed in the latch module and has its motor axis transversely aligned relative to the pawl axis. This improved arrangement allows helical teeth to be used with pinion gear 124 and drive gear 126 instead of a worm gearset, although spur gear teeth can also be used. Note also that shaft 194 of motor 122 extends through an access port 195 extending through housing plate 114. This is the only access port through the sealed PCB 160/housing plate 114 interface which provides a simple and effective manner to seal the electronic components and motor housing.

Figure 15:
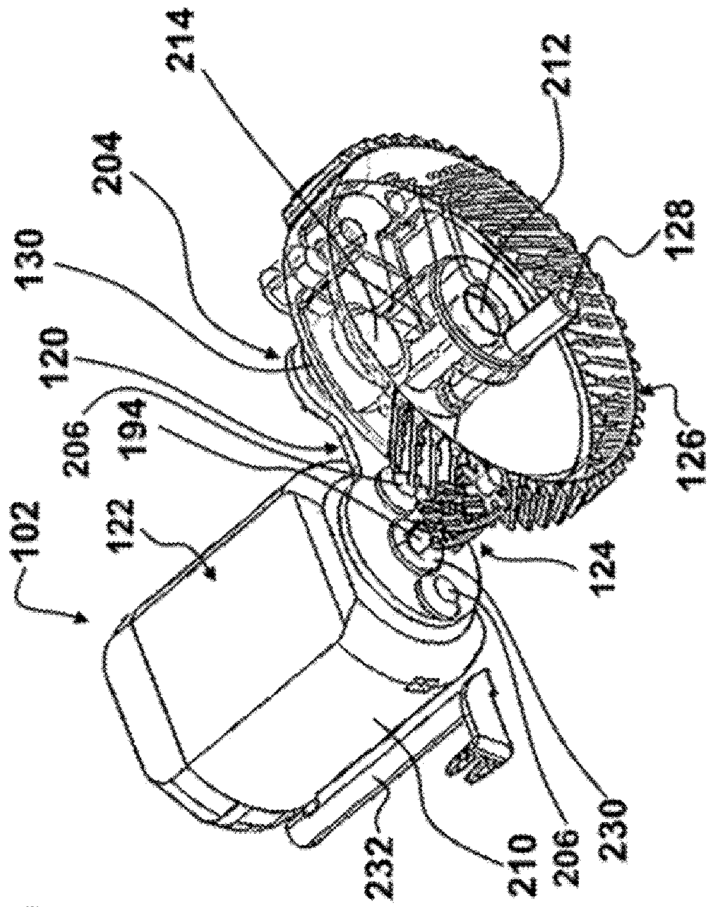
FIGS. 14 and 15 are isometric views of the power actuator associated with the control unit shown in FIGS. 12 and 13 and which includes a carrier plate, an electric motor mounted to the carrier plate and driving a drive pinion, a drive gear rotatably supported by the carrier plate and in meshed engagement with the drive pinion, and a bumper stop mounted to the carrier plate.
Figure 14:
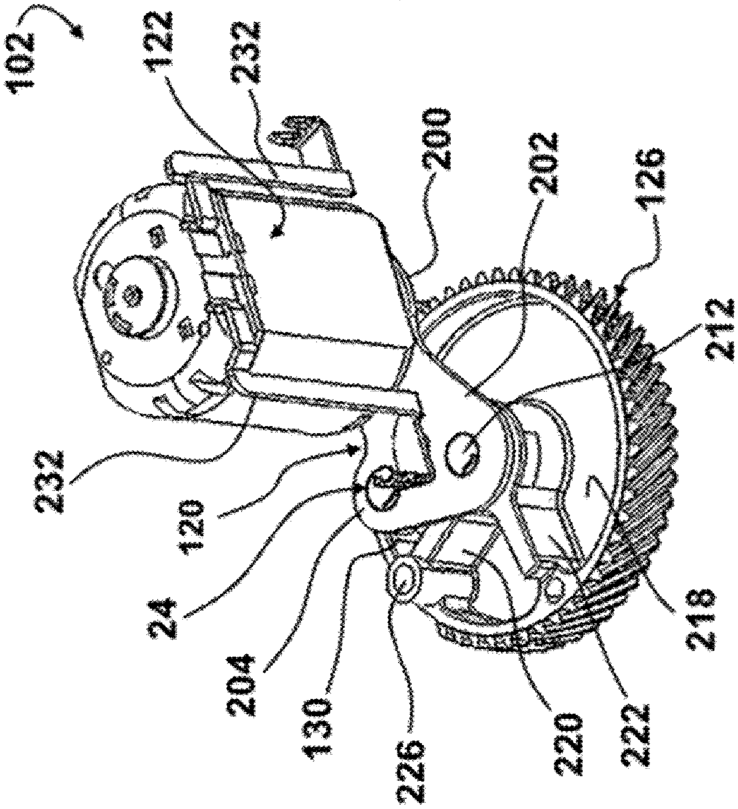

FIGS. 14 and 15 illustrate power actuator 102 pre-assembled as a stand-alone unit prior to mounting to housing plate 114 and prior to overmolded layer 172 enclosing PCB 160. While electric motor 122 is illustrated as being mounted to carrier plate 120 prior to overmolding, pre-assembled power actuator 102 may not include electric motor 122, which can be subsequently assembled with power actuator 102 subsequent to the overmolding step. Carrier plate 120 includes a motor mount segment 200, a gear support segment 202, and a bumper mount segment 204. Alternatively, bumper mount segment 204 may be provided as a pair of bumper mount segments 204 provided on stop lugs 220 and 222 to be engaged by naked rivet 214. A pair of screws 206 are used to rigidly mount a motor housing 210 of motor 122 to motor mount segment 200 of carrier plate 120. Drive gear 126 is rotatably mounted on a pivot rivet 212 extending from gear support segment 202 of carrier plate 120. In addition, gear stop bumper 130 is mounted via a rivet 214 to bumper mount segment 204 of carrier plate 120. Drive gear 126 is shown to define a cavity 218 within which gear stop bumper 130 is located. Stop lugs 220 and 222 formed within cavity 218 define the rotational limits for drive gear 126 due to engagement with gear stop bumper 130 in response to rotation of drive gear 126. The amount of rotation of drive gear 126 required for the power release function can be selected for each application. Furthermore, a magnet 226 associated with a Hall Effect sensor 228 (FIG. 6) is attached to stop lug 220. An O-ring seal 230 seals motor shaft 194 extending through housing plate 114. Motor leads 232 are electrically connected to circuit traces on PCB 160 and are subsequently over-molded via overmold layer 172. The pre-assembly of electric motor 122 and drive gear 126 maintains proper mesh between pinion 124 and drive gear 126 and improves sensor activation (between magnet 226 and Hall Effect sensor 228) due to less variation in alignment during assembly.

Figure 16:
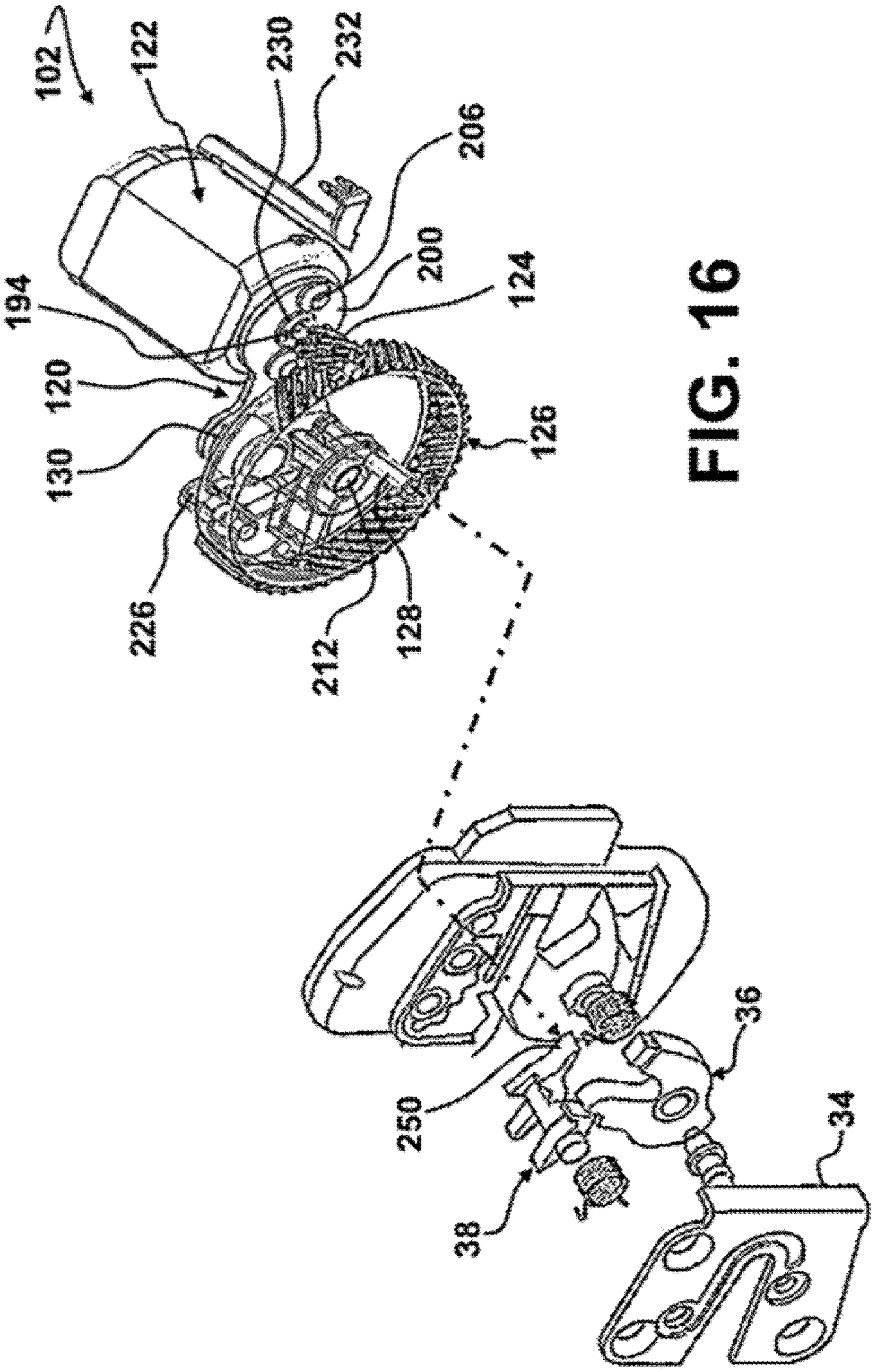
FIG. 16 illustrates an interface and functional relationship between an actuation feature on the drive gear and a release feature on a pawl associated with an exemplary ratchet and pawl latch mechanism within the latch module.

FIG. 16 illustrates actuation feature 128 configured in a non-limiting arrangement as a drive pin which is oriented in relation to a sector arm 250 (or pawl first leg segment 64 of FIGS. 7A-7D) formed on pawl 38 and which acts as latch release mechanism 33. Specifically, rotation of drive gear 126 from a home position to a released position via energization of electric motor 122 in response to a power release command causes drive pin 128 to engage sector arm 250 and drive pawl 38 from its ratchet holding position to its ratchet releasing position. Following power release, electric motor 122 is commanded to rotate drive gear 126 in the opposite direction back to its home position so as to reset latch release mechanism 33 to subsequently allow pawl 38 to move back into its ratchet holding position.

Figure 17:
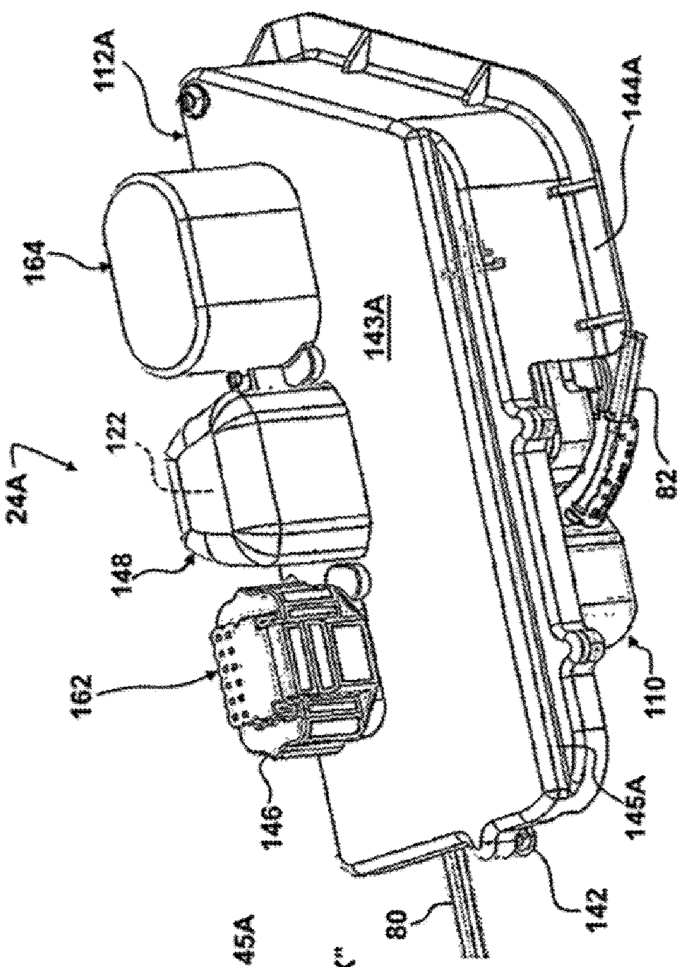
FIGS. 17 and 18 illustrate an actuator module for the closure latch assembly now constructed according to a second embodiment of the present disclosure having a modified ECU cover and seal arrangement to accommodate a maximized glass run channel within the vehicle door.
Figure 18:
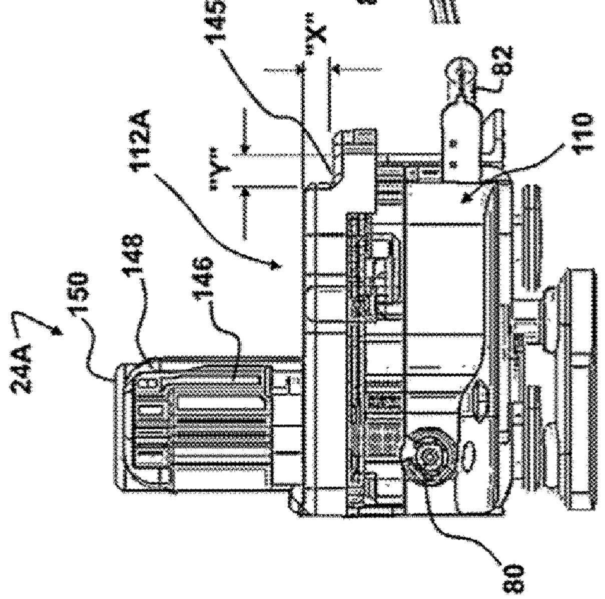

Referring now to FIGS. 17 and 18, a second non-limiting embodiment of an actuator module 24A for use with latch module 22 to define closure latch assembly 18 is shown to generally be configured as a slightly modified version of actuator module 24. In general, actuator module 24A includes ECU/actuator assembly 110 and a modified ECU cover 112A configured to provide a recessed portion 145A between plate segment 143A and peripheral shroud segment 144A. Recessed portion 145A defines an elongated notch with a width dimension "X" and a height dimension "Y", the specific values of which can be selected to address various different applications. One application is when a maximized glass run channel is required within door 16. Housing plate (not shown) and seal (not shown) may require slight modifications as well, but the dimensions and orientation of the electronic components are not changed.

Figure 19:
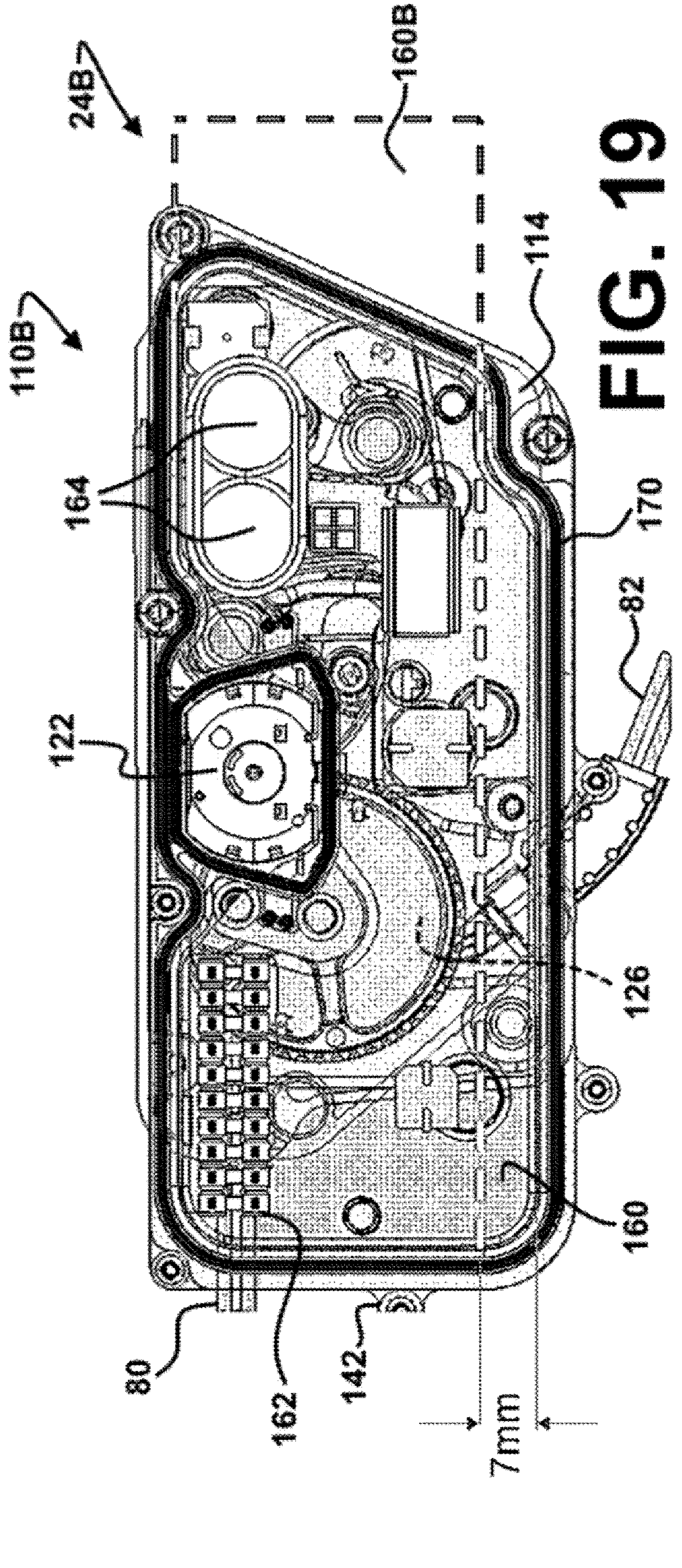
FIG. 19 illustrates an actuator module for the closure latch assembly now constructed according to a third embodiment of the present disclosure having a modified ECU cover and a modified ECU/actuator assembly with the PCB and related housing components revised to accommodate a maximized glass run channel within the vehicle door.

FIG. 19 illustrates a third non-limiting embodiment of an actuator module 24B for use with latch module 22 to define closure latch assembly 18. FIG. 19 illustrates actuator module 24B with an outline of a modified version of ECU/actuator assembly 110B (delineated by dashed lines) overlaid over ECU/actuator assembly 110 with ECU cover 112 removed. ECU/actuator assembly 110B reduces the width of PCB 160B while concomitantly increasing the length of PCB 160B. As part of this, the electronics would be relocated on PCB 160B. Thus, FIG. 19 merely illustrates an alternative configuration for an actuator module 24B providing all the functions previously disclosed in relation to actuator module 24.

Figure 20:
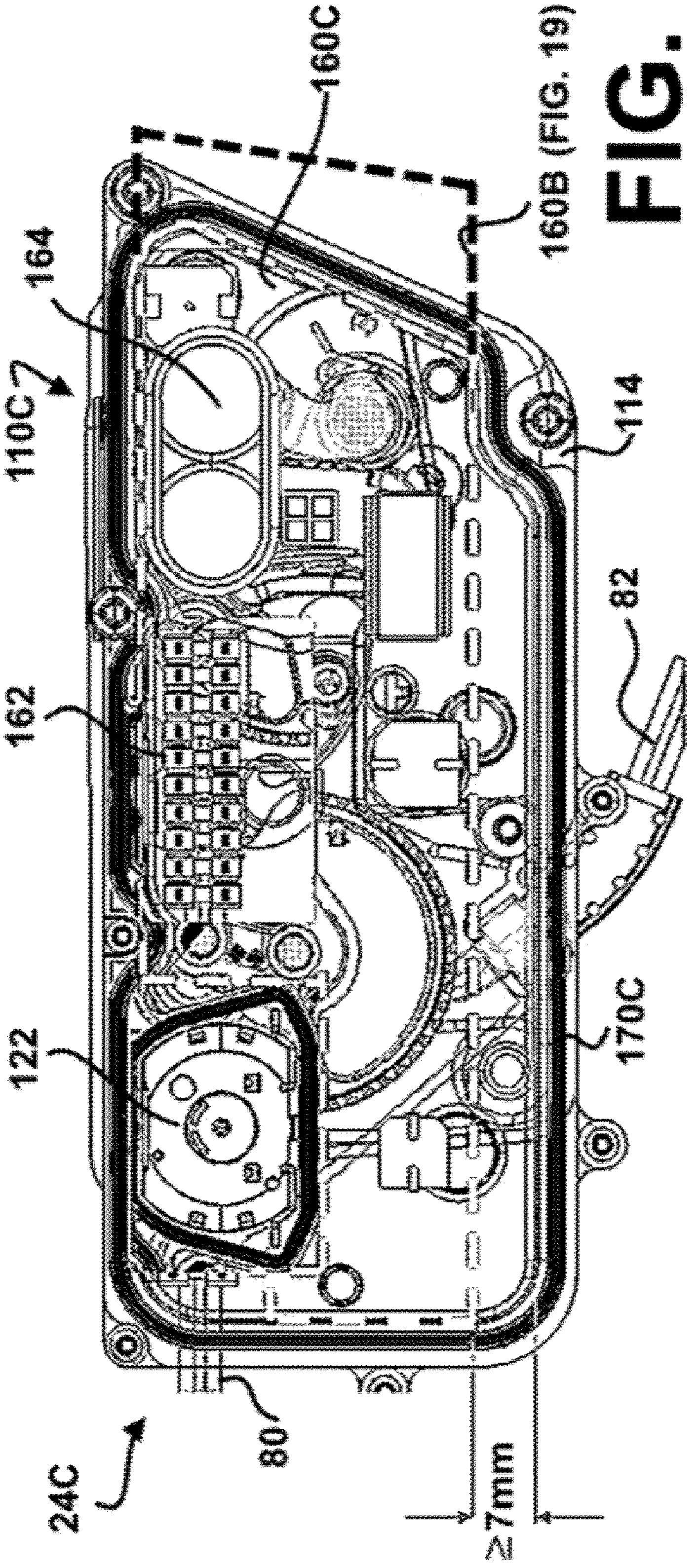
FIG. 20 illustrates an actuator module for the closure latch assembly now constructed according to a fourth embodiment of the present disclosure having a modified ECU cover and ECU/actuator assembly with the PCB and related housing components revised in combination with a rearrangement of the electric motor and the connector to accommodate a maximized glass run channel within the vehicle door.

FIG. 20 illustrates a revised version of actuation module 24C according to a fourth embodiment which is generally similar to actuator module 24B (FIG. 19) with the exception that the location of electric motor 122 and connector 162 have been switched on PCB 160C. This switched orientation permits PCB 160C to have reduced width and length dimensions in comparison to PCB 160B of FIG. 19.

Figure 21B:
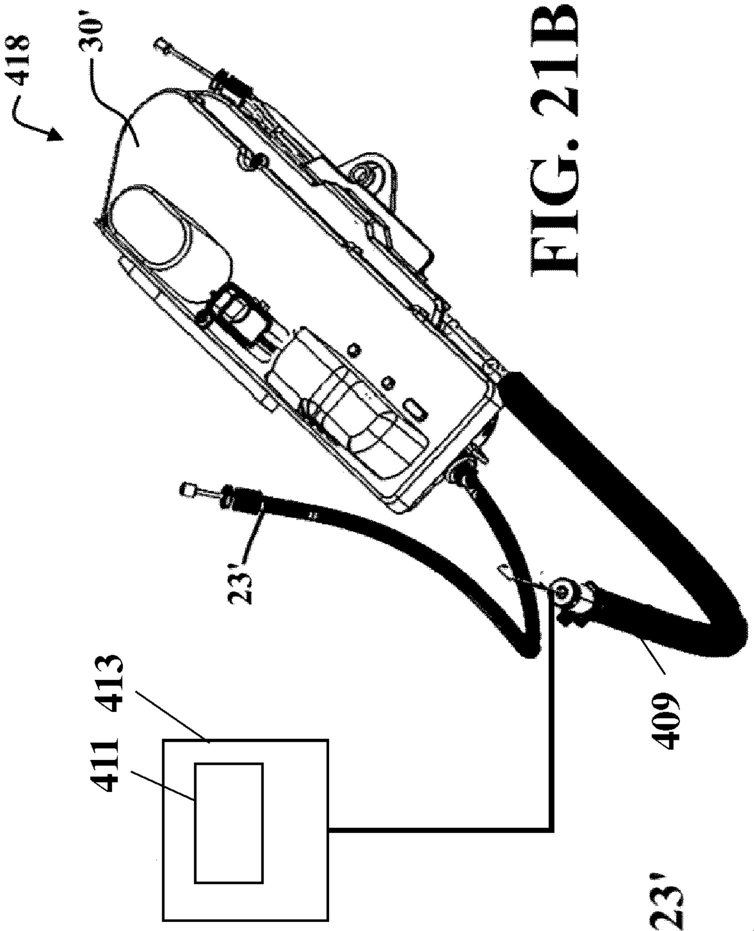
FIGS. 21A and 21B illustrate a closure latch assembly now constructed according to a fifth embodiment of the present disclosure having a modified latch release mechanism operably connecting an actuator module to a latch module of the closure latch assembly.
Figure 21A:
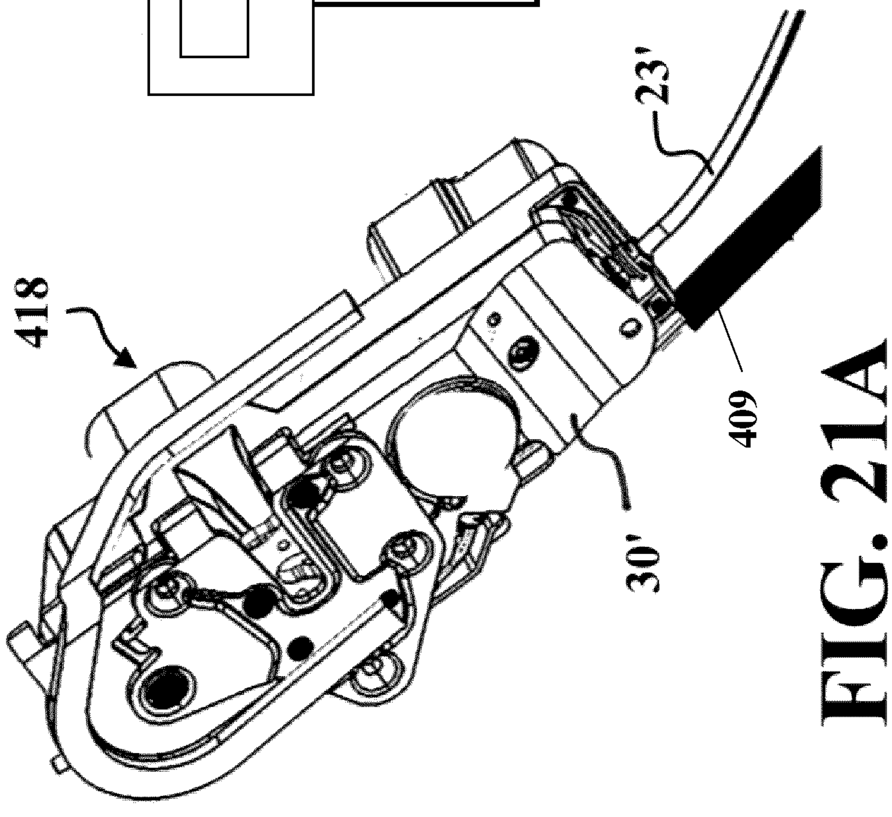
Figure 22:
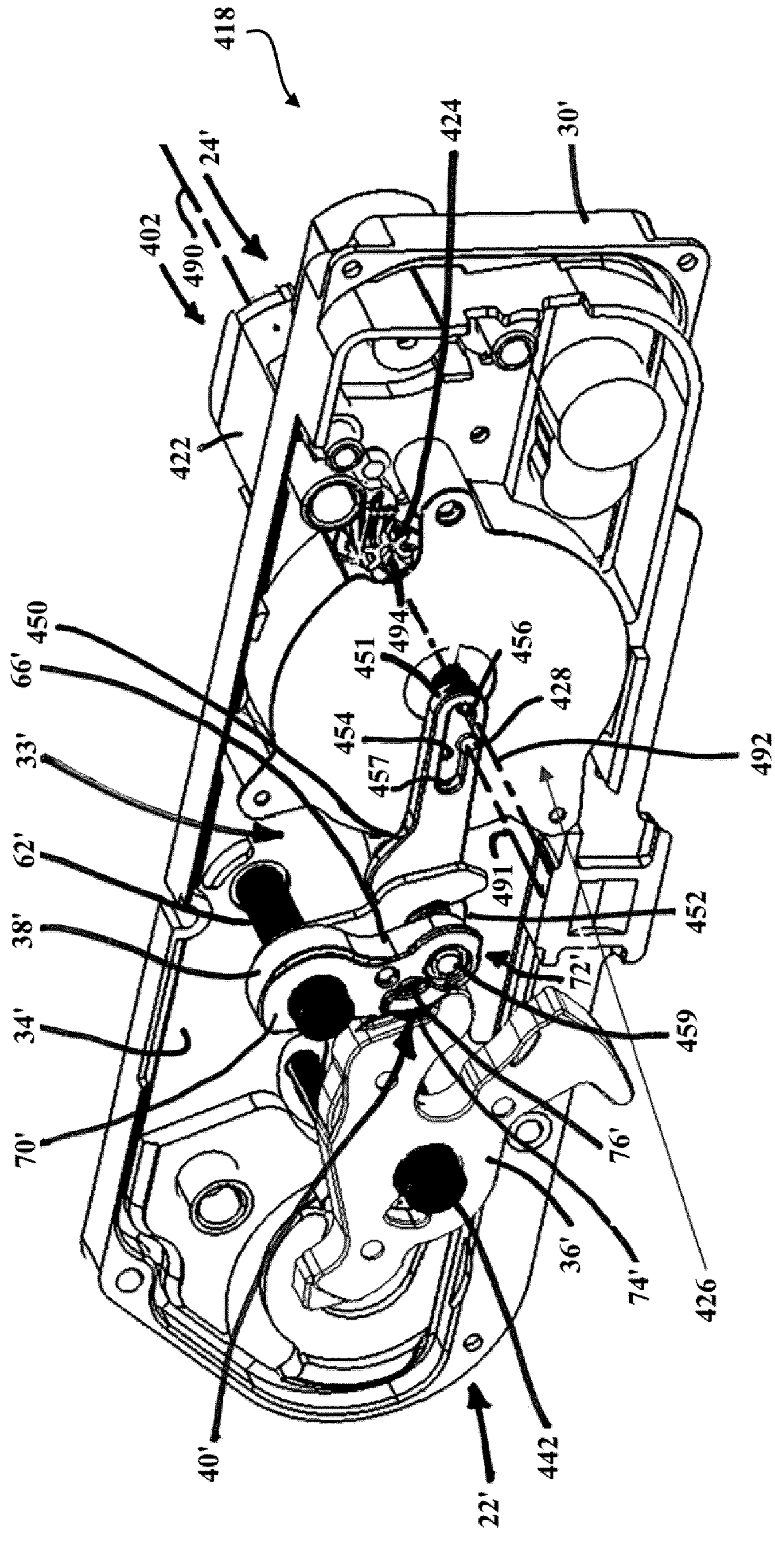
FIG. 22 is a view similar to FIG. 21A with a cover removed from the closure latch assembly.

FIGS. 21A and 21B illustrate a closure latch assembly 418 constructed according to a fifth embodiment of the present disclosure. The closure latch assembly 418, as best shown in FIG. 22, includes a latch release mechanism 33' operably connecting an actuator module 24' to a latch module 22' of the closure latch assembly 418, similarly to that discussed above for closure latch assembly 18, with the notable distinguishing aspects directed primarily to the latch release mechanism 33' being discussed hereafter.

Latch module 22' generally includes a ratchet 36' and a pawl 38' having an engagement device, and illustrated as a roller-type engagement device 40', by way of example and without limitation. Ratchet 36' is supported on a latch frame plate 34' by a ratchet pivot post 442 for movement between a released or “striker release” position, a soft close or “secondary striker capture” position, and a hard close or “primary striker capture” position, such as discussed above for latch module 22.

Figures 24A, 24B, 24C, 24D:
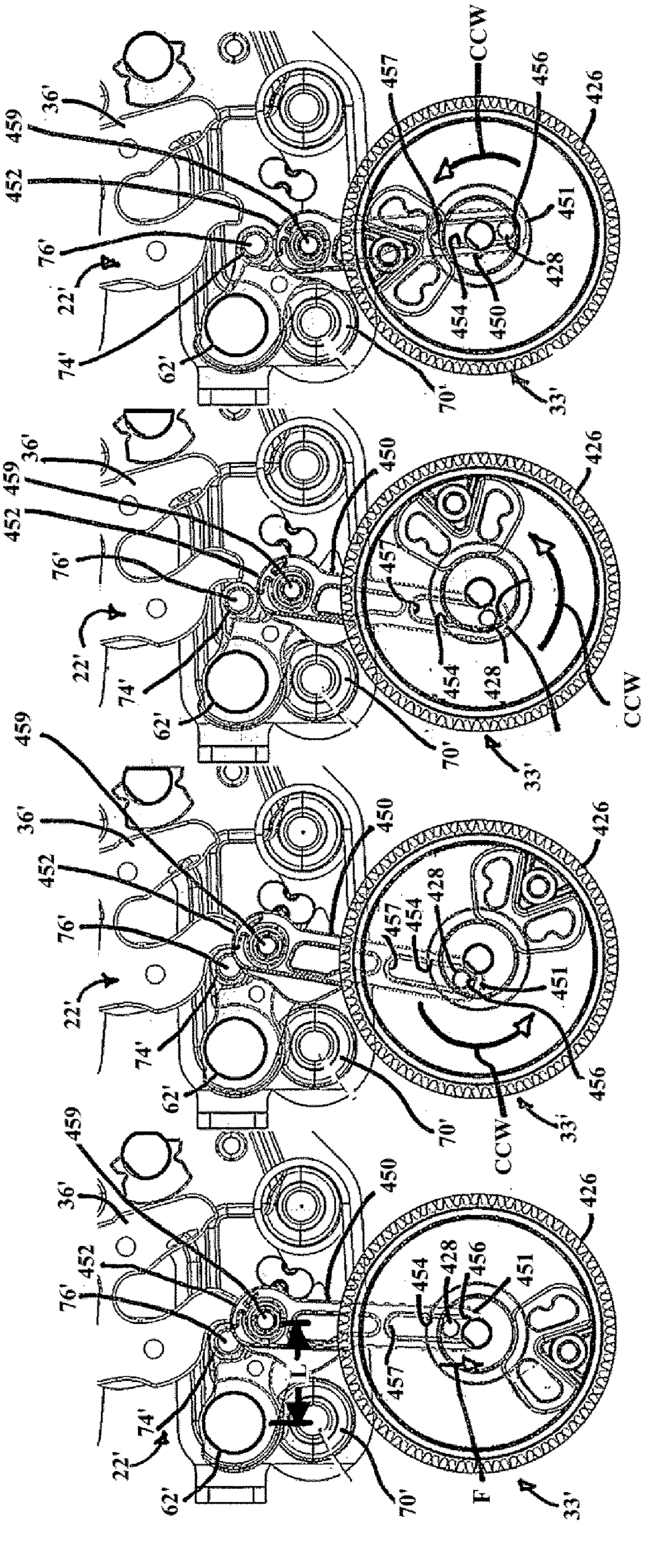
FIG. 24A illustrates various components of the latch module in a fully latched position with the latch release mechanism and various components of the actuator module shown in a latched, rest position.
FIG. 24B illustrates the various components of the latch module of FIG. 24A remaining in the fully latched position with the latch release mechanism and the various components of the actuator module of FIG. 24A being moved in a pre-travel state.
FIG. 24C illustrates the various components of the latch module of FIG. 24B moved toward a latch release position in response to the various components of the actuator module being moved to a latch release point.
FIG. 24D illustrates the various components of the latch module of FIG. 24C moved fully to the latch release position in response to the various components of the actuator module being moved fully to the latch release point.

Pawl 38' is shown pivotably mounted to latch frame plate 34' about a pawl pivot post 62' and includes a leg segment 66' extending away from pawl pivot post 62'. Roller-type engagement device 40' is secured to leg segment 66' of pawl 38' and includes at least one or a pair of oppositely-disposed sidewalls 70' defining a roller carrier 72', and a roller 74' that is rotatably retained, such as by a pin 76' supported by sidewall(s) 70', by way of example and without limitation. Pawl 38' is pivotable between a ratchet releasing position (FIG. 24D) and a ratchet holding position (FIGS. 24A and 24B). Pawl 38' is normally biased toward its ratchet holding position by a pawl biasing member 80'.

Actuator module 24' can be constructed as generally discussed above with regard to actuator module 24 discussed in FIGS. 10-15, and thus, all the details, which will be readily understood by one possessing ordinary skill in the art, are not repeated here. Some of the components include an electric motor 422 having a motor shaft 494 extending along a first axis, also referred to as motor axis 490, and driving a pinion gear 424 fixed to the motor shaft 494 in coaxial centered relation with motor axis 490 for rotation about the motor axis 490. A drive gear 426 is arranged in constant meshed engagement with pinion gear 424 for rotation about a second axis, also referred to as drive gear axis 492, extending in parallel relation with motor axis 490. Drive gear 426 has an actuation feature 428 fixed thereto, with actuation feature 428 being adapted to interact with latch release mechanism 33', and further including a gear stop bumper 430.

In this non-limiting configuration, power actuator 402 interacts with latch module 22' to provide a “power release” function by mechanically actuating latch release mechanism 33' to cause pawl 38' to move from its ratchet holding position into its ratchet releasing position. However, power actuator 402 could additionally, or alternatively, be configured to provide one or more other “powered” functions provided by latch module 22' such as, for example, power cinch or power lock/unlock. However, power actuator 402 could be configured to only provide one function, such as only a power release function. According to an aspect of the present disclosure, power actuator 402 is associated directly with actuator module 24' instead of latch module 22', with actuator module 24' then being associated with latch module 22' via latch release mechanism 33'. Electric motor 422 and drive gear 426 are separated in sealed relation from latch module 22' and latch release mechanism 33' to provide protection thereto against environmental contamination, such as dust and water, and to maintain lubrication on the drive gear 426 and pinion 424.

Figure 27A:
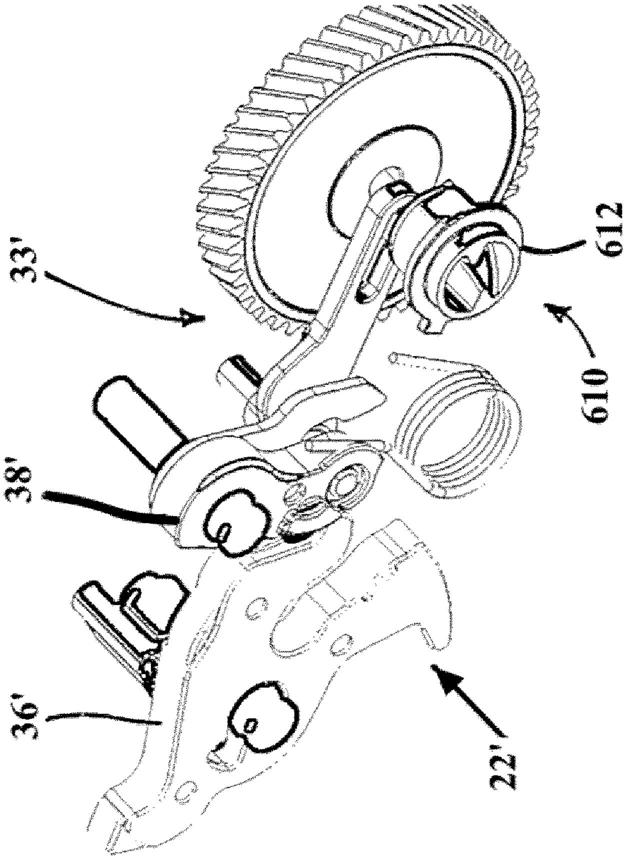
FIG. 27A is a perspective view illustrating a manually actuatable reset device configured in operable communication with the latch module of FIGS. 21A and 21B for returning a pawl from a ratchet releasing position to a ratchet holding position to allow a vehicle closure panel to be moved from an open position to a closed position via selective manual actuation of a manual actuation feature.
Figure 27B:
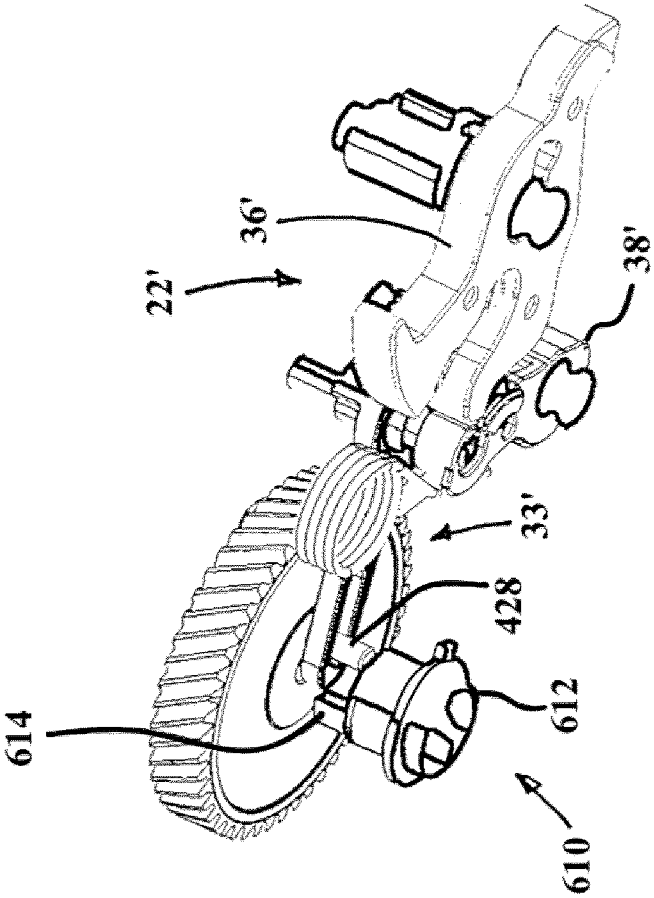
FIG. 27B is another perspective view of the manually actuatable reset device of FIG. 27A.

Actuation feature 428 is configured in a non-limiting arrangement as an elongate drive pin which is oriented in relation to a link arm 450, wherein link arm 450 operably connects pawl 38' with drive pin 428. Link arm 450 and drive pin 428 function together to define latch release mechanism 33'. Actuation feature, also referred to as drive pin 428, as best shown in FIG. 22, extends laterally outwardly from a side face of drive gear 426 along a third axis, also referred to as drive pin axis 491, that is parallel with, and shown as being in immediately adjacent relation with drive gear axis 492. As discussed further, the close proximity of drive pin axis 491 to drive gear axis 492 facilitates smooth, reliable operation of closure latch assembly 418. the close proximity of drive pin axis 491 to drive gear axis 492 is illustrated for example in FIG. 13 showing a smaller radius R1 of the drive pin axis 491 away from the drive gear axis 492 compared to the radius R2 of the outer circumference of the drive gear 426. R1 may be for example less than fifty percent of the Radius R2. R1 may be for example less than twenty five percent of the Radius R2. The close proximity of drive pin axis 491 to drive gear axis 492 may also further limit the range of motion or swing of link arm 450 (as illustrated for example by the change in the link arm 450 position shown in FIGS. 24E and 24F) allowing for either other latch components to occupy the space which would otherwise be required in a configuration where the drive pin 428 is positioned closer to the circumferential extents or outer circumference of the drive gear 426 and further away from the drive gear axis 492 causing a larger swing of the link arm 450, or may allow the housing of the latch module 22' to be reduced in size as a result of not having to accommodate for such a larger swing or motion of the link arm 450 during power release. Still further, the close proximity of the drive pin axis 491 to drive gear axis 492, or in other words the closer radial position or distance of the drive pin axis 491 to drive gear axis 492, than to the outer circumference of the drive gear 426 reduces the moment arm developed between the drive pin 428 and the drive gear axis 492 during the rotation of the drive gear 426, and thus motor 422 does not need to configured to overcome the larger increase in moment arm due to a farther proximity of drive pin axis 491 to the drive gear axis 492 as would be a configuration of the motor 422 where the drive pin 428 is positioned closer to the circumferential extents, or outer circumference, of the drive gear 426 and further away from the drive gear axis 492. Specifically, as shown in FIGS. 24B-24D, rotation of drive gear 426 in a counterclockwise direction CCW from a home position to a released position via energization of electric motor 422 in response to a power release command causes drive pin 428 to move link arm 450 and drive pawl 38' from its ratchet holding position to its ratchet releasing position. Following a power release command, electric motor 422 is commanded to rotate drive gear 426 in the opposite clockwise direction back to its home position so as to reset latch release mechanism 33' to subsequently allow pawl 38' to move back into its ratchet holding position. In accordance with a further aspect of the disclosure, a mechanically actuatable reset device 610, as an example of an override device in addition to the power release motorized based power release chain, (FIG. 27, looking from an opposite direction from FIGS. 24A-24D) can be provided to facilitate rotating drive gear 426 back to its home position so as to reset latch release mechanism 33' of latch module 22' to allow pawl 38' to move back into its ratchet holding position, should, for any reason, pawl 38' be stuck in the ratchet releasing position. Reset device 610 is supported for mechanically actuated rotation via a support housing, such as to a latch housing 30' (FIGS. 21A, 21B, 22). Reset device 610 has an actuation feature 612, such as a knob, lever, handle, or the like, that can be manually grasped by hand and/or accessed via a tool to affect mechanical rotation of the reset device 610, when desired. Actuation feature 612 can be made accessible along the edge portion, also referred to as shut face 16A, of closure panel 16, by way of example and without limitation. Accordingly, when the closure panel 16 is moved to an open position, and if the pawl 38' is prevented from returning from the ratchet release position to the ratchet holding position, whereupon ratchet 36' could be prevented from being maintained in a striker capture position, thereby preventing vehicle closure panel 16 from being closed, such as may occur if motor 422 become inoperable for any reason, by way of example and without limitation, the actuation feature 612 may be mechanically actuated by hand and/or tool via ready access to the shut face 16A to return pawl 38' to the ratchet holding position, thereby allowing closure panel 16 to be moved from the open position to the closed and latched position.

Figure 28B:
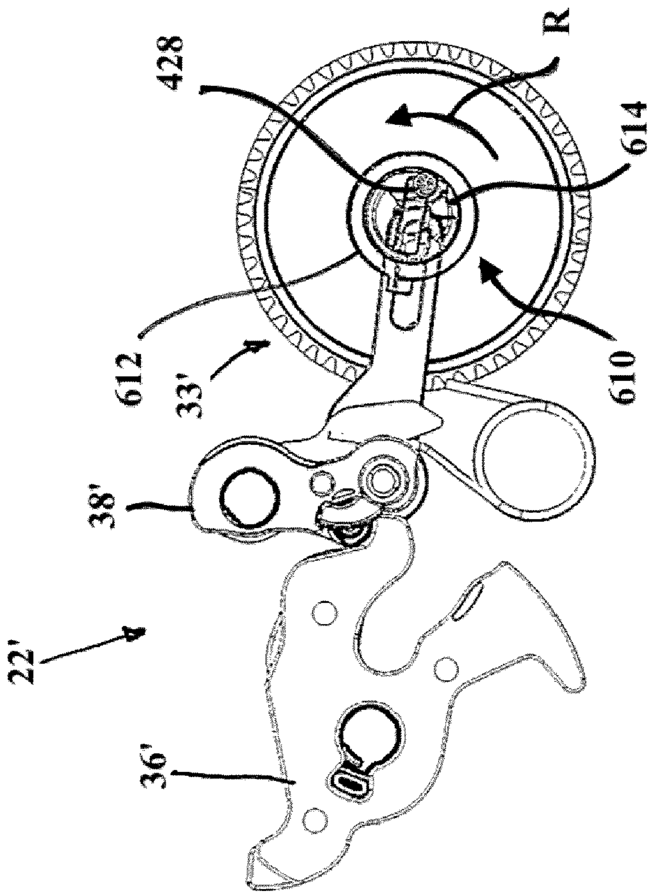
FIG. 28B is a side view of the manually actuatable reset device of FIGS. 27A and 27B showing the reset device being manually actuated to return the pawl to the ratchet holding position.
Figure 28A:
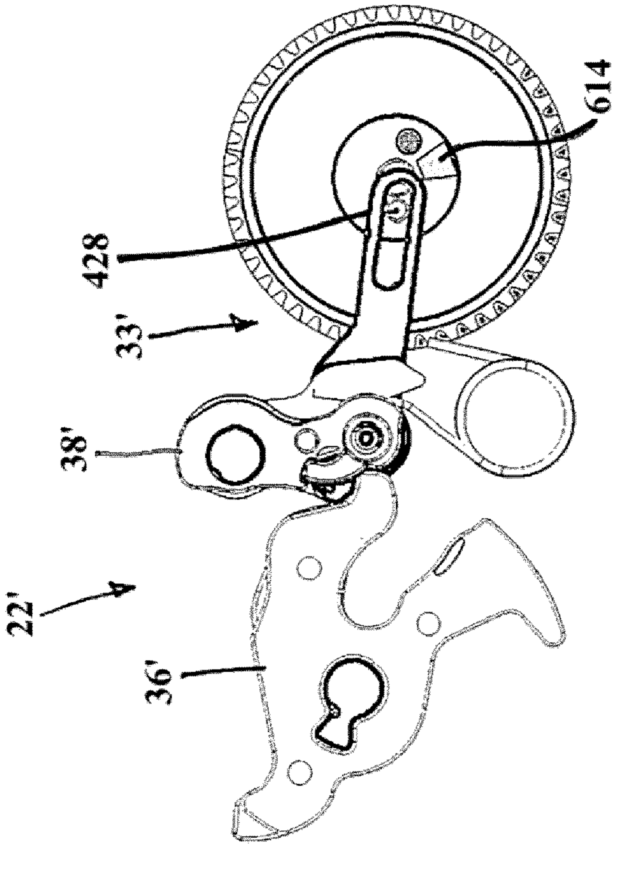
FIG. 28A is a side view schematically illustrating a reset cog of the manually actuatable reset device of FIGS. 27A and 27B showing the reset cog in a rest position.
Figure 28C:
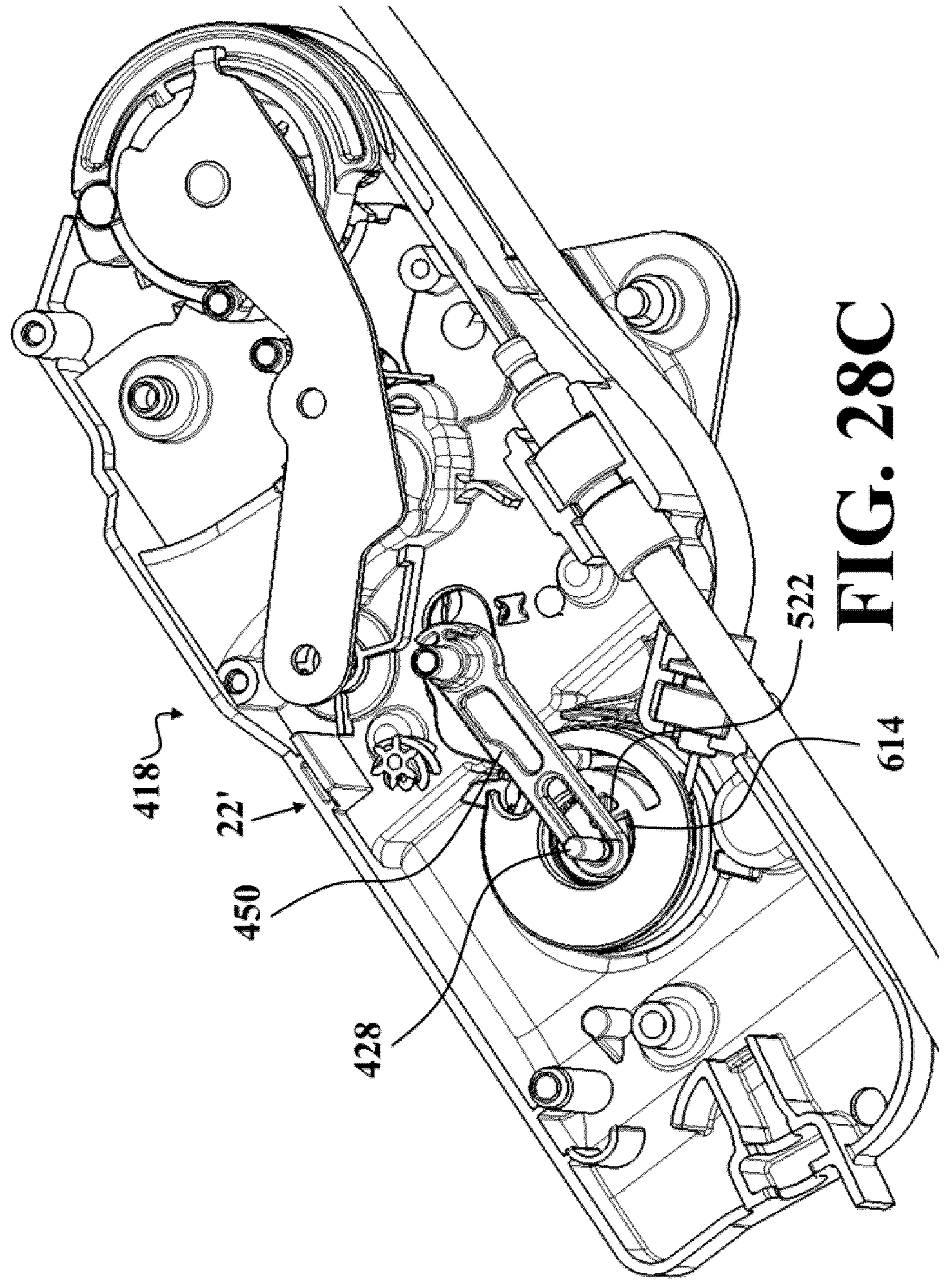
FIG. 28C is a perspective view of an opposite side of the closure latch of FIG. 22 manually actuatable reset device of FIG. 27A showing the reset cog in a rest position.
Figure 28D:
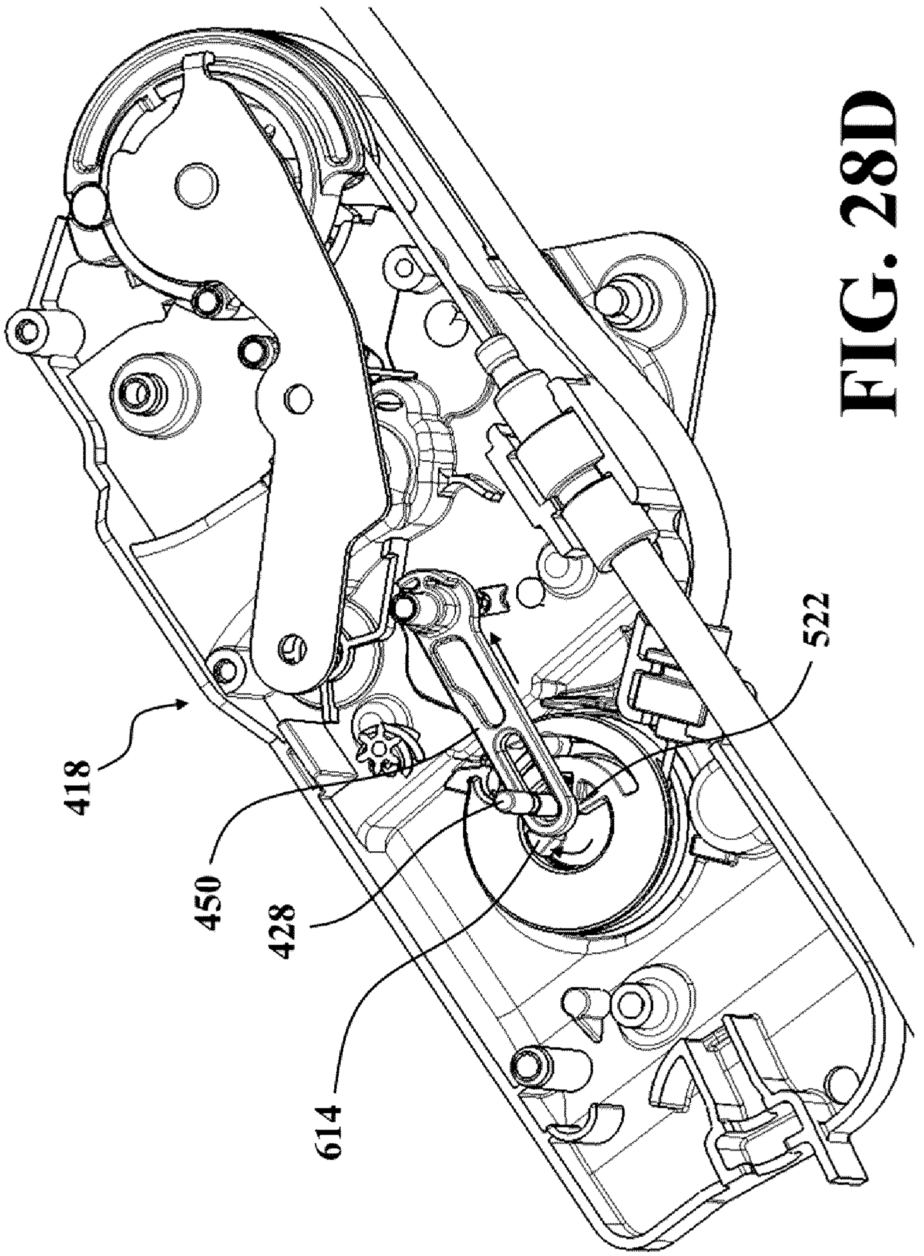
FIG. 28D is a perspective view of an opposite side of the closure latch of FIG. 22 manually actuatable reset device of FIG. 27A showing the reset cog being manually actuated to return the pawl to the ratchet holding position.
Figure 29B:
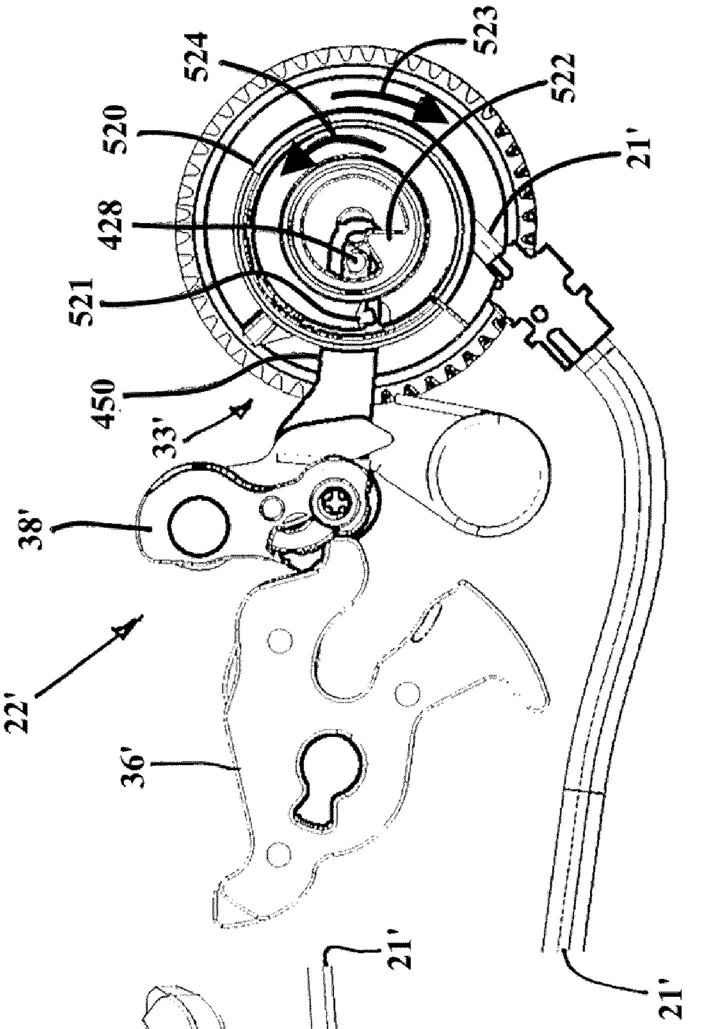
FIG. 29B is a side view of the manual release mechanism of FIG. 29A showing the direction of travel of the manual release mechanism during manual actuation to move the pawl to the ratchet releasing position and the direction of travel of the manual release mechanism back to a rest position upon completing manual actuation of the latch module.
Figure 29A:
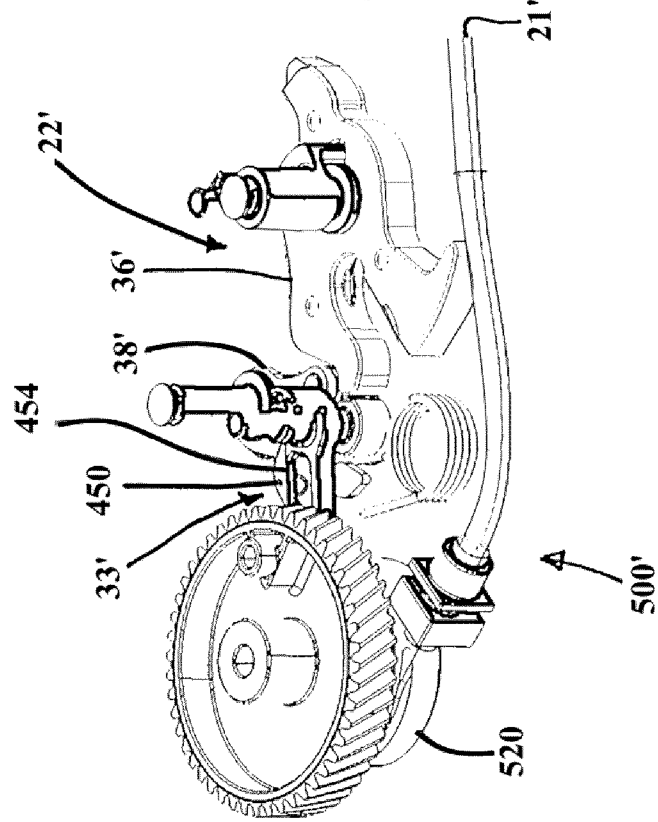
FIG. 29A is a perspective view illustrating a manual release mechanism configured in operable communication with the latch module of FIGS. 21A and 21B for moving a pawl from a ratchet holding position to a ratchet releasing position to allow a vehicle closure panel to be moved from a closed position to an open position via selective manual actuation of a manual actuation feature.
Figure 29C:
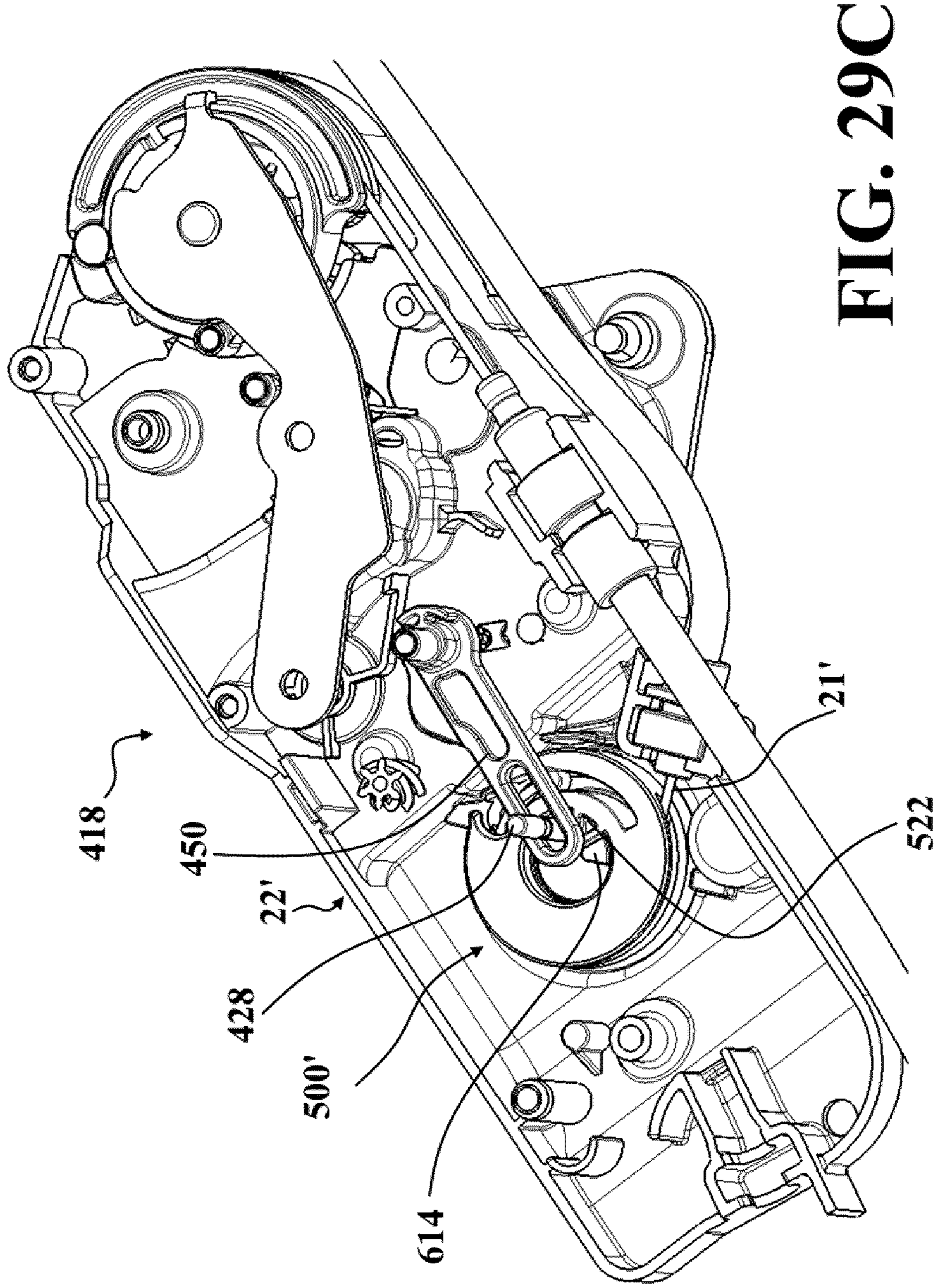
FIG. 29C is a perspective view of an opposite side of the closure latch of FIG. 22 with the manual release mechanism of FIG. 29A showing the manual release mechanism prior to a manual actuation.
Figure 29D:
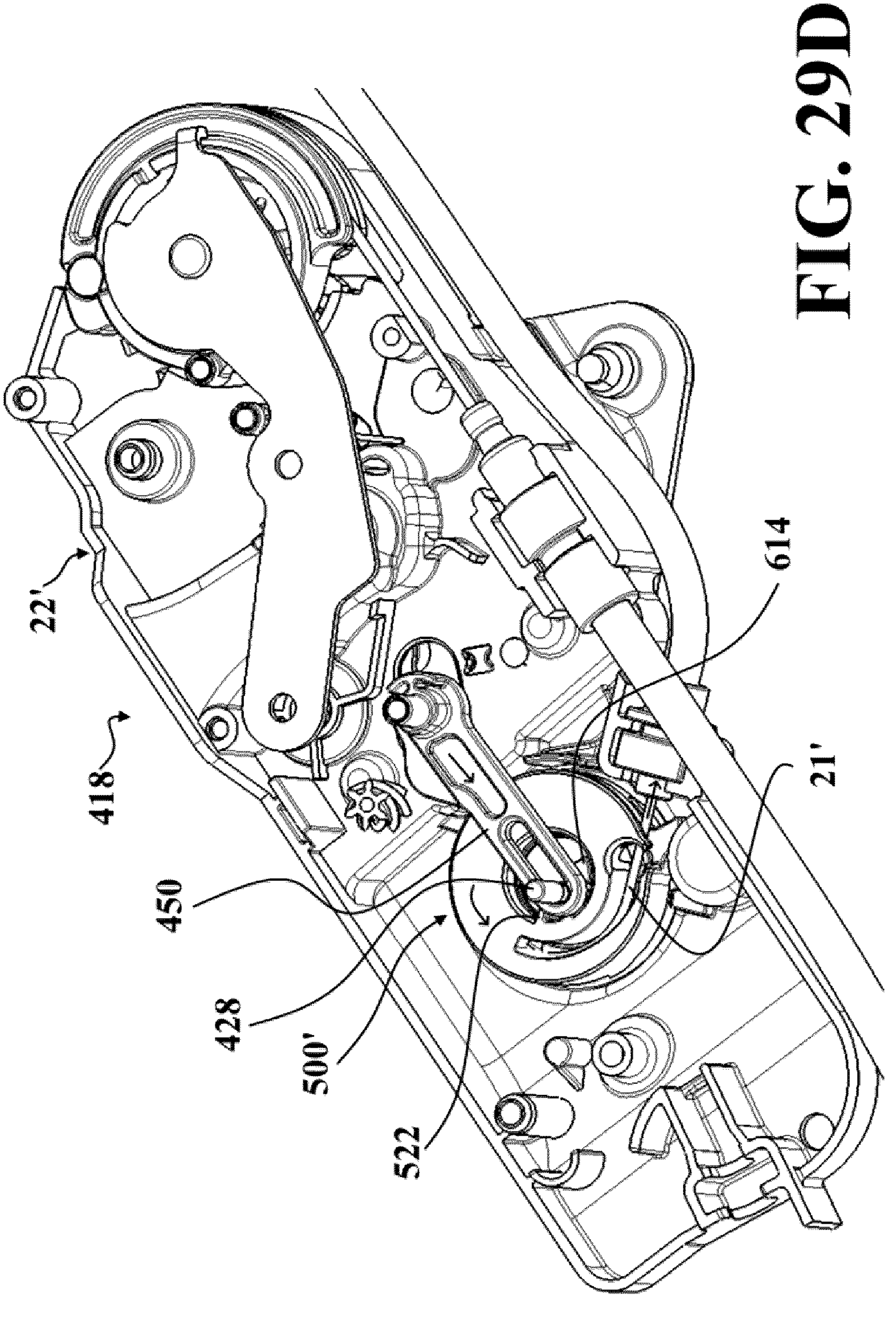
FIG. 29D is a perspective view of an opposite side of the closure latch of FIG. 22 with the manual release mechanism of FIG. 29A showing the manual release mechanism following a manual actuation.

During selective and intentional actuation of reset device 610, as actuation feature 612 is rotated in a reset direction along the direction of arrow R (FIGS. 28B and 28D), a reset cog, also referred to as reset finger or reset tab 614, extending from an end of actuation feature 612 is rotatably moved from a rest position (FIGS. 28A and 28C) and brought into engagement with drive pin 428 to selectively rotate drive gear 426 back to its home position so as to reset latch release mechanism 33' to allow pawl 38' to move back into the ratchet holding position.

Figure 23B:
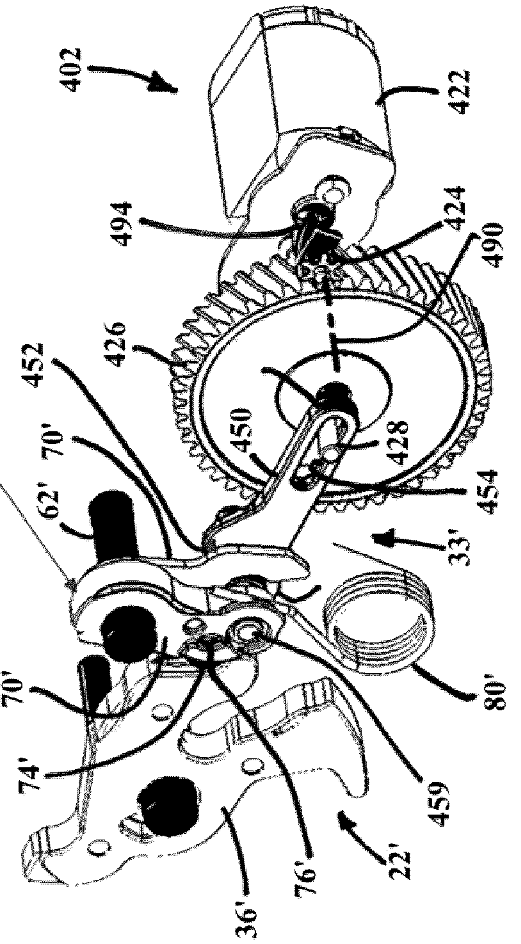
FIGS. 23A and 23B illustrate opposite side perspective views of various components of the latch module and various components of the actuator module of the closure latch assembly of FIGS. 21A and 21B shown in operable communication with one another via the latch release mechanism.
Figure 23A:
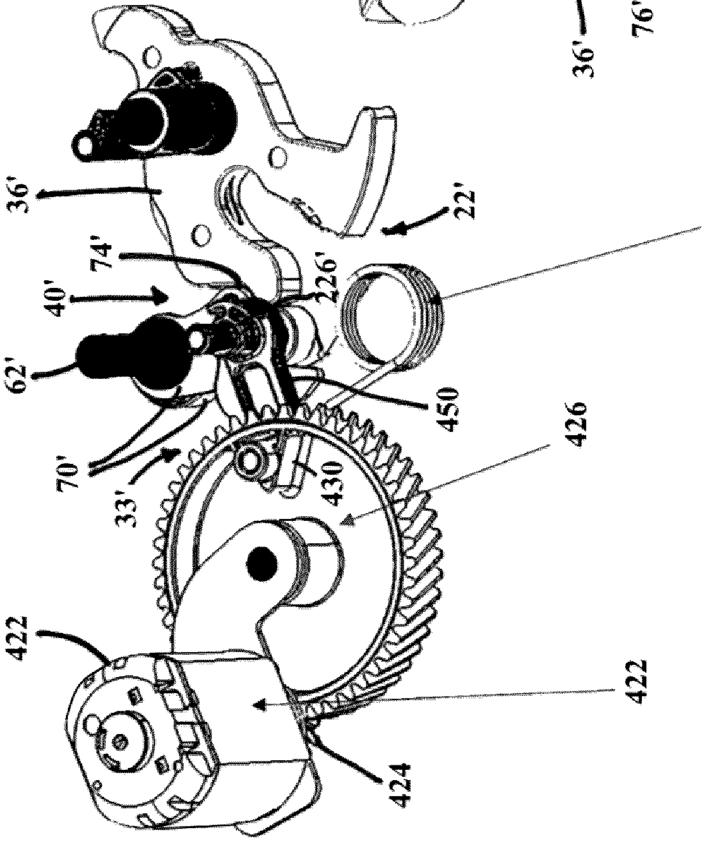

Link arm 450 is shown as directly coupling drive pin 428 to pawl 38' to form a lost motion connection therebetween; however, it is contemplated that by operably connecting pawl 38' with drive pin 428 that addition levers or mechanisms could be incorporated therebetween. Link arm 450 is elongate and extends lengthwise between opposite first and second ends 451, 452. To facilitate forming the lost motion connection between drive gear 426 and pawl 38', link arm 450 has an elongate slot 454 extending lengthwise between opposite first and second drive ends 456, 457 intermediate the opposite first end 451 and second end 452 of link arm 450. Elongate slot 454 is illustratively shown as a linearly extending elongated slot, or a linear slot, and not a curved slot. Drive gear 462 is operably coupled to link arm 450 proximate first end 451 of link arm 450 via drive pin 428 being disposed in slot 454 for sliding movement therealong, wherein the length of slot 454 is greater than the diameter of drive pin 428, thereby creating a lost motion connection, meaning that drive pin 428 can translate within slot 454 until it comes into engagement with one of the ends of slot 454. Pawl 38' is operably coupled to link arm 450 proximate second end 452, such as via a pin 459, by way of example and without limitation. It is to be recognized that pin 459 could be a rivet or otherwise, and be attached to and extend from pawl 38' about which link arm 450 may be allowed to rotate. For example a receptacle such as a bore in the link arm 450 may be configured to receive pin 459 therein and allow rotation of link arm 450 about the pin 459. Alternatively, pin 459 may be attached to and extend from link arm 450 for receipt within a receptacle or bore provided in pawl 38'. As discussed above with regard to FIG. 6, a Hall effect sensor/magnet 226' (FIG. 23A) can be associated with link arm 450, such as via being fixed adjacent second end 452 and/or on pin 459 to facilitate direct position information to a sensor 228 for determination of the precise location of pawl 38', as will be understood by one possessing ordinary skill in the art.

In use, with the roller 74' producing minimal friction against pawl 38', low release effort (force) is required to move pawl 38' relative to ratchet 36', and as a result, the size of motor 422 and magnitude of torque output therefrom can be reduced relative to known powered release actuators. Further yet, as noted above, the proximity of drive pin 428 and axis 491 thereof to rotational axis 492 of drive gear 426 thereof can be minimized, due in part to the reduce torque needed to move and release pawl 38' from ratchet 36'. With drive pin 428 being located near a center rotational axis (drive gear axis 492) of drive gear 426, throughout the rotational movement of drive gear 426 during a latch release operation, as shown in FIGS. 24A-24D, the radial movement of link arm 450 relative to drive gear axis 492 is minimized. Further, at least a portion of the movement of link arm 450 is linear (traversing radially relative to pawl pivot post 62'), thereby pulling on pawl 38' against the bias imparted on pawl 38' by pawl biasing member 80' during a release operation, which results in a smooth and consistent release motion of pawl 38'. Additionally, with the length L (extending between pawl pivot post 62' of pawl 38' and pin 459) of pawl 38' extending generally transversely to the direction of pulling force F imparted by link arm 450 on free end of leg segment 66' of pawl 38', a high torque force is applied to pawl 38' to facilitate ease of release.

Figure 24F:
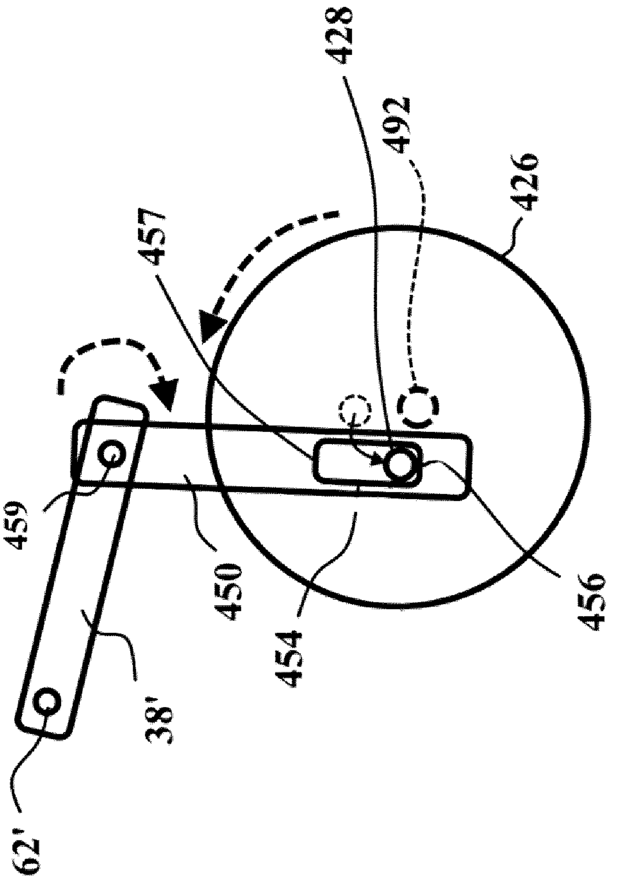
FIG. 24F illustrates the drive pin in a position between the home position and an actuated position having been brought into engagement with the first end of the slot in the link arm.
Figure 24E:
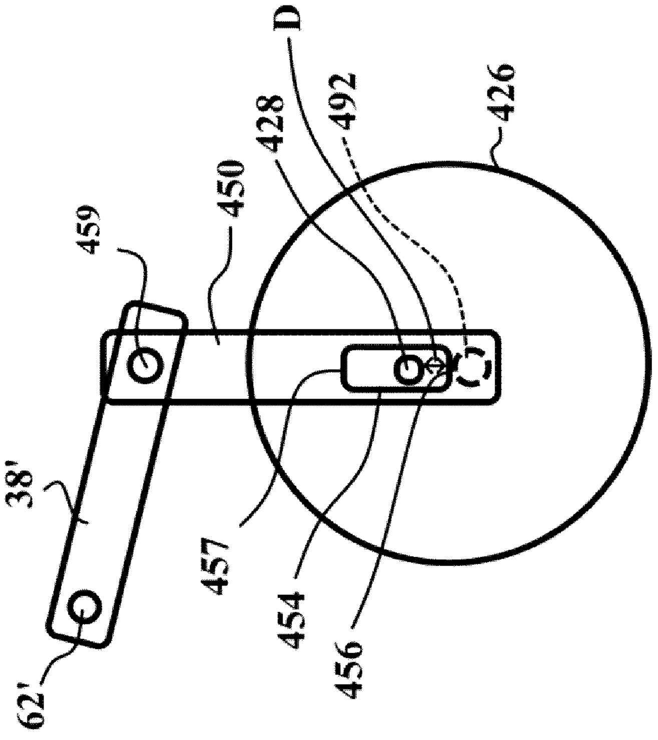
FIG. 24E illustrates the drive pin in a home position displaced from a first end of a slot provided in a link arm.
Figure 35:
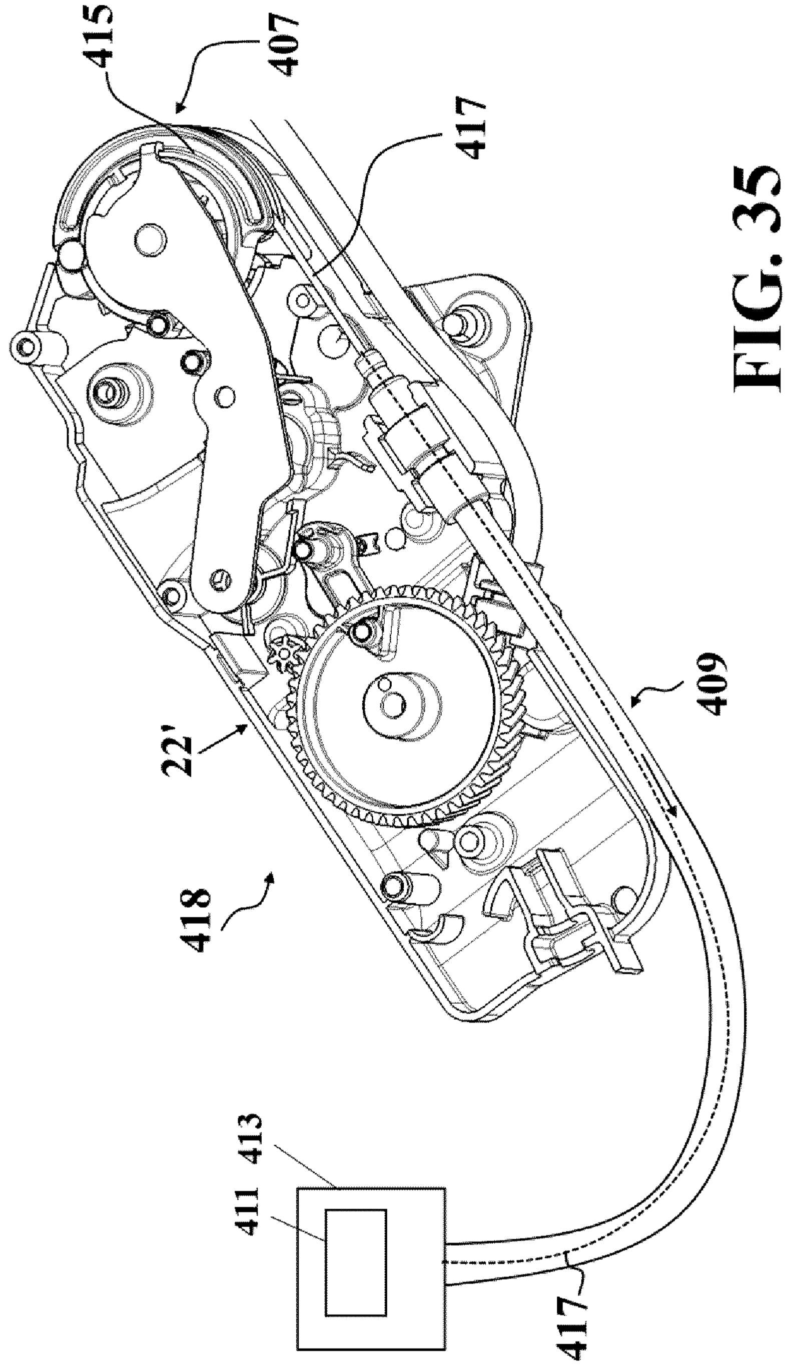
FIG. 35 illustrates a cinch assembly associated with the actuator module of FIG. 20.

Further yet, as discussed above, lost motion is provided between movement of drive gear 426 and movement of pawl 38' due to the travel of drive pin 428 in slot 454 which, in turn, results in enhanced release efficiency and reduced size of motor 422 required due to a buildup of inertia of drive gear 426 and motor 422 prior to initiating movement of pawl 38'. As shown in FIGS. 24A and 24B, upon selectively energizing motor 422 (FIG. 24B) and driving drive gear 426 rotatably about drive gear axis 492, drive pin 428 is allowed to slide freely within slot 454 in lost motion fashion prior to driving link arm 450 as shown in more detail in FIG. 24E which shows the drive pin 428 in its home position and displaced from first end 456 by a distance D and not in contact with first end 456 and in FIG. 24F, or in a disengagement position with the lost motion connection, which shows the drive pin 428 in between the home position and the actuated position just as the drive pin 428 engages with the first drive end 456 in one illustrative example. During such an initial free motion of drive pin 428, drive pin 428 is not yet in contact with the first end 456 providing a safety function by disassociating an initial movement of drive pin 428 caused by a radial movement of the drive gear 426 with the movement of pawl 38' for example caused by any minor unintended motions of drive gear 426, for example due to shock or inertia, or any temporary unintended energizations of motor 422 not during a power release function. Pawl 38' is not moved during this initial pre-travel of the drive pin 428. Furthermore, prior to initial engagement of drive pin 428 against first drive end 456 of slot 454 the inertia of the gear 426 and/or motor 422 is allowed to develop and increase without encountering resistance due to a contact with the first end 456. Such an increase may be a substantial increase in the inertia of the power actuator 402, such as when the motor is still increasing above 20% of its rotational speed before impact of the pin 428 with the first end 456. When drive pin 428 eventually enters into contact with the first end 456 in an intermediary position, or is in an engagement position with the lost motion connection, between the home position and actuated position as shown in FIG. 24F, the drive pin 456 does enter into contact with the first end 456 with a velocity and momentum developed during the prior free play travel and imparts an impulse or jolt to the link arm 450 causing a corresponding impulse or jolt on the pawl 38'. Such an impulse or jolt may assist with overcoming the resting inertia of the pawl 38' and/or with overcoming static friction between the pawl 38' and ratchet 36' or between the roller 74' and the pawl 38' and/or ratchet 36'. Therefore, the release efforts acting to move the pawl 38' via the pin 428 acting on the first end 456 subsequent the intermediary position shown in FIG. 24F is not only the force generated by the motor 422, but also the force due to the momentum of the motor 422 and the gear wheel 426 generated during the initial pre-travel phase. The force of motor 422 during this pre-travel phase is also used to overcome the static inertia of the motor 422 and drive gear 426 prior to acting on the pawl 38', link arm 450 and any other intervening release chain components if provided. Such a configuration is in comparison to a configuration where a power release motor upon energization immediately begins to move a pawl such that the motor has to overcome static inertia of not only its own mass and any connected gear train mass but also simultaneously overcome the static inertia state of the pawl and any intervening release chain components which requires a more powerful motor than the motor 422 described herein. In the configuration of the latch assembly 18, 418 with the roller 74' the lost motion connection allows an increase in momentum in the drive system (e.g. motor 422 and drive gear 426) leading to an impact of the pin 428 against the first end 456 to assist with overcoming the static friction of the roller 74' at the contact point(s) between the roller 74' and the pawl 38' and the ratchet 36' surfaces when the roller 74' is in a non-rolling state to assist with transitioning the roller 74' into a rolling state such that the contact points between the roller 74' and the pawl 38' and the ratchet 36' surfaces experience rolling friction, lower than the static friction. Motor 422 therefore does not have to simultaneously overcome the static friction of the roller 74' and the resting inertia of the motor 422, the drive gear 426, the link arm 450 and pawl 38', but rather the lost motion connection allows the inertia of the resting bodies of the motor 422, the drive gear 426, the link arm 450 and the pawl 38' to be overcome in separated stages of actuation, where the resting inertia of the components upstream the lost motion connection (e.g. the motor 422, the drive gear 426) is overcome during a first release stage prior to coupling of the drive pin 428 with the first end 456 before the resting inertia and the static friction of the components downstream the lost motion connection (e.g. the link arm 450, the pawl 38' and roller 74') is overcome during a second release stage. Therefore motor 422 does not need to overcome simultaneously the inertia and friction of the entire release chain and can therefore be provided with lower power output and a smaller motor size having. When engagement of drive pin 428 against first drive end 456 of slot 454 occurs, the lost motion connection transitions from a disengaged state or position to an engaged state or engaged position such that continued motion of the drive pin 428 causes motion of the link arm 450. And then, during initial engagement of drive pin 428 against first drive end 456 of slot 454, the initial movement of link arm 450 is pivotal about pin 459, and thus, does not pull on pawl 38', which all together allows inertia to further build in motor 422 and drive gear 426. Then, upon initial driving of link arm 450 linearly relative to pawl pin 62', with drive pin 428 engaging and pulling on first drive end 456, the build-up or run-up of inertia, for example rotational inertia via speed increase or acceleration of motor 422 prior to the transition of the lost motion connection from the disengaged state or disengaged position to an engaged state or engaged position, and other rotating components such as the drive gear 426, facilitates moving pawl 38' from its ratchet holding position, against the bias of pawl biasing member 80', toward its ratchet release position. A time delay between the moment the motor 422 is energized and the moment the pawl 38' is caused to move is therefore provided due to the drive pin 428 being displace from the first drive end 456 and not being positioned in a home position where it would be already engaging, or closely in position to engage with the first drive end 456 such that drive pin 428 would immediately pull on first drive end 456 upon energization of the motor 422. In other words, when the drive pin 426 is in its home position, upon energization of the motor 422 the drive pin 426 would freely move within the slot 454 over a predetermined range of travel before entering into contact with end 426. Upon reaching a full travel position (FIG. 24D), drive gear 426 has been driven between about 180-190 degrees, whereat drive pin 428 has been rotated to an over-center position relative to alignment with drive gear axis 492 and pin 459, and thus, pawl biasing member 80' is effectively holding drive gear 426 in its full travel position against gear stop bumper 430, and without requiring motor 422 to be continuously energized in this over-center position to resist link arm 450 under influence of the pawl biasing member 80' from tending to rotate drive gear 426 back towards its position as shown in FIG. 24A. In other words, when the actuation feature 428 is in its actuated position, the link arm 450 is in an over-center position relative to the axis 492 of the drive gear 126, 426. Motor 422 may be next de-energized upon reaching the full travel position and the over-center position of the drive pin 428 and link arm 450 maintains the pawl 38' in its ratchet release position and in tension between the drive pin 428 by the pawl biasing member 80'. Thus, no additional levers or components are needed to provide a full travel position or snow load function, nor is a continuous powering of the motor 422 required, nor is a larger, more robust motor 422 required to withstand stall operating condition to execute full travel position or snow load holding function. To transition out of the full travel position or snow load function, the motor 422 may be powered in an opposite return direction (CW) to cause the pin drive 428 to move the link arm 450 out of the over-center position at which point the pawl biasing member 80' may be allowed to assist the pawl 38' to return towards the ratchet holding position and the link arm 450 allowed to correspondingly move back towards its position shown in FIG. 24A. During the powering of the motor 422 in the return direction, the motor 422 may in a configuration not act to move any other components other than the gear wheel 426 and link arm 450 as described herein, and for example the output power of the motor 422 is not used to cinch the ratchet 36' to cause the ratchet 36' to move a striker retained by the ratchet 36' to the primary latching position. The power output from a motor for performing a cinch function compared to a power release function may be larger, therefor requiring a larger motor for performing both a cinch and power release operation. A cinching function associated with the closure latch assembly 418 of the present disclosure is rather powered by a separate actuator or motor 411 other than the motor 422 not located within the housing of the closure latch assembly 418, but remote and separate from the housing closure latch assembly 418 provided in a distinctly mounted housing 413 and as interconnected by a cinching cable 409 connected between the cinch actuator 411 and a cinch mechanism 407 (see FIG. 35) mounted within the housing of the closure latch assembly 418, the cinch mechanism 407 being in operable connection with the ratchet 36' for moving the ratchet 36' towards a primary closed position as part of a cinching operation. Cinch mechanism 407 illustratively includes a cam 415 for engaging an inner cable 417 moveable e.g. pulled by actuator 411 for imparting a rotation of the cam 415, where the rotation of the cam 415 acts to move a interface device such as a lug (not shown) projecting through and aperture in the latch module 22' to access the opposite face of the latch module 22' where it may interact directly or indirectly with the ratchet 36' for moving the ratchet 36' in response to activation of the actuator 411. As a result motor 422 can be configured having a lower power output and being smaller reducing the dimensions of the latch assembly 418, and a larger dedicated motor 411 positioned remote from and distinct (e.g. capable of being handled as separate components) is provided.

Figure 26:
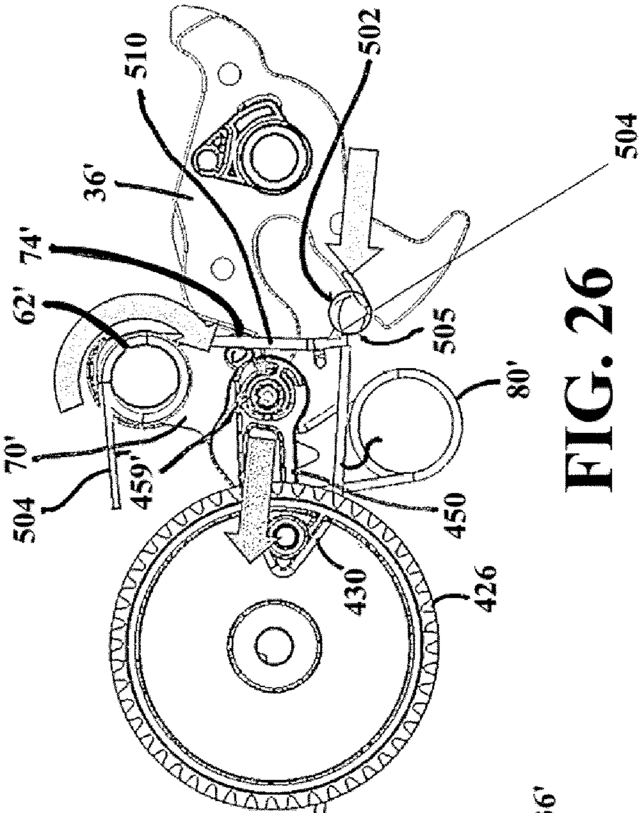
FIG. 26 is a side view of FIG. 25.
Figure 25:
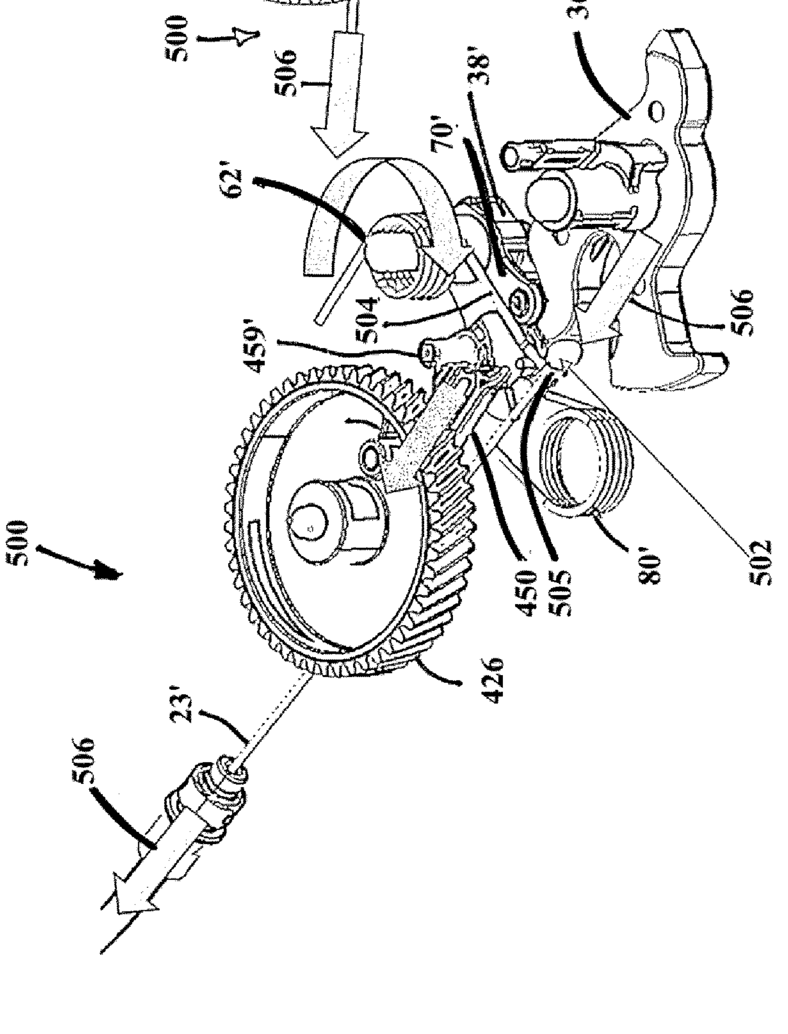
FIG. 25 is a perspective view illustrating a manually actuatable inside release cable configured in operable communication with the latch module of FIGS. 21A and 21B for actuating the latch module to move from the latched position to the latch release position via selective manual actuation of an inside closure panel handle.

FIGS. 25 and 26 illustrate a manual release mechanism 500 of closure latch assembly 418. Manual release mechanism 500 is shown, by way of example and without limitation, as being operable via manual actuation of an inside release cable 23' operably coupled to inside release handle 23, though it is contemplated herein that the same type of manual release mechanism can be couple to another manual release lever/handle, such as outside handle 21, as will be fully understood by one possessing ordinary skill in the art. Inside release cable 23' is shown extending to an attachment end having a connector, such as a ferrule 502. Ferrule 502 is coupled to a release member, shown as a spring member, such as a torsion spring 504, by way of example and without limitation. Torsion spring 504 is disposed about pawl pivot post 62', with one end 505 of torsion spring 504 being wrapped to capture ferrule 502 in abutting relation therewith during actuation of inside release handle 23 and pulling of release cable 23' along the direction of arrow 506 and an opposite end 507 of torsion spring being fixed, such as to latch housing 30'. During manual actuation, an arm portion 510 of torsion spring 504 adjacent end 505 is flexed to confront a release member 459' fixed to pawl 38', such as an extension of pin 459, by way of example and without limitation, thereby causing link arm 450 to be moved linearly away from pawl pivot post 62' to cause pawl 38' to move from its ratchet holding position to its ratchet release position. During movement of link arm 450 in the course of manual actuation, link arm 450 moves in lost motion relation relative to drive gear 426 as a result of drive pin 428 being permitted to slide freely in slot 454 prior to engaging drive end 456 of slot 454. Accordingly, manual actuation of closure latch assembly 418 does not backdrive motor 422, thereby facilitating the ease of manual actuation, while avoiding damage to motor 422. Then, upon manually moving pawl 38' to its ratchet release position, torsion spring 504 bias and resiliency functions to return release cable 23' and pawl 38' to their respective rest positions. Accordingly, not only does torsion spring 504 perform its biasing function on the return of release cable 23' to its home position, as shown in FIG. 26, but it also functions as a release lever for manual action of closure latch assembly 418.

FIGS. 29A to 29D illustrate another manual release mechanism 500' of closure latch assembly 418. Manual release mechanism 500' is shown, by way of example and without limitation, as another example of an override device and as being operable via manual actuation of an outside key cylinder release cable 21' operably coupled to an outside key cylinder, such as on outside handle 21, by way of example and without limitation. Accordingly, manual actuation of latch module 22' of closure latch assembly 418 to open the vehicle closure panel 16 can be affected from outside the motor vehicle, which may prove beneficial should powered actuation closure latch assembly 418 be unavailable or inoperable for any reason.

Outside key cylinder release cable 21' is shown having an end 521 fixed to an actuation pulley 520, such as via direct attachment thereto via any suitable fixation mechanism. Actuation pulley 520 is supported, by way of example and without limitation, for rotation about drive gear axis 492. Actuation pulley 520 has an actuation member 522 fixed thereto, wherein actuation member 522 is arranged for engagement with drive pin 428, such as an end region of drive pin 428 extending through slot 454 and beyond link arm 450 of latch release mechanism 33', by way of example and without limitation, during selective and intentional manual actuation of manual release mechanism 500'. During rotating actuation of actuation pulley 520, actuation pulley 520 rotates about drive gear axis 492 in the direction or arrow 523 and actuation member 522, shown as a radially inwardly extending projection, engages and drives drive pin 428 and causes drive pin 428 to move link arm 450 of latch release mechanism 33' and move pawl 38' to the ratchet release position, as discussed above for powered actuation in FIGS. 24A through 24D. Accordingly, ratchet 36' is permitted to move to the striker release position, whereupon vehicle closure panel 16 can be opened. Then, upon completing actuation of closure latch assembly 418, actuation pulley 520 can be automatically returned to its rest, non-actuated position, such as via a spring member shown schematically by arrow 524.

Figure 37:
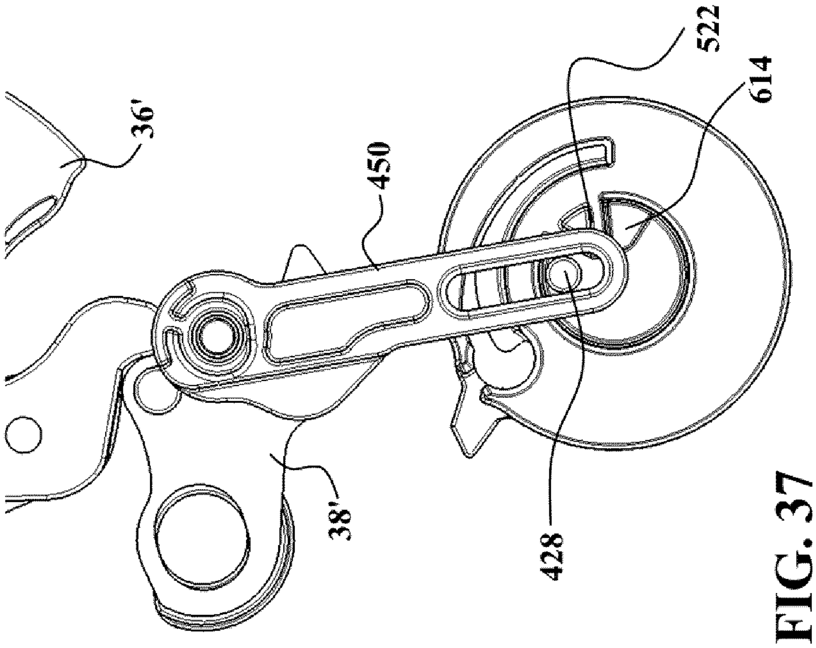
FIG. 37 is an assembled state of the manually actuatable reset device of FIG. 27A and manual release mechanism of FIG. 29A each for acting on the drive pin when actuated in opposing directions.
Figure 36:
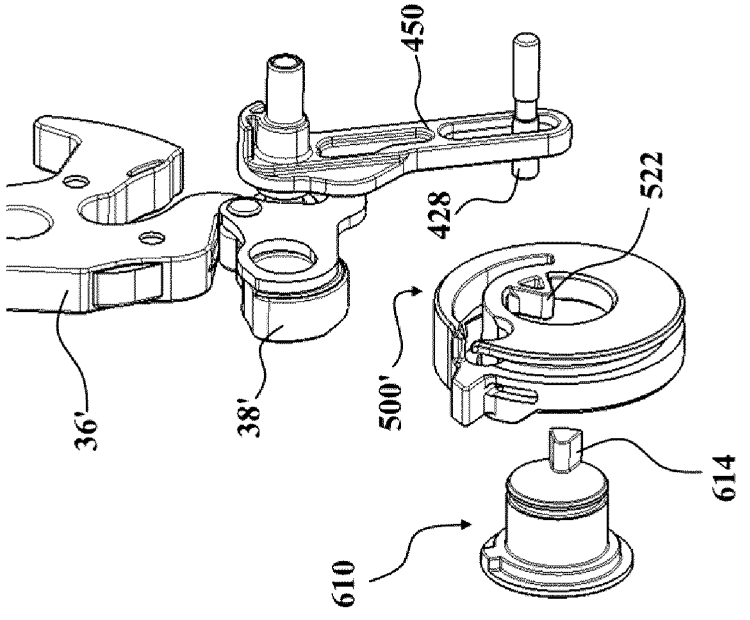
FIG. 36 in an exploded dissembled state of the manually actuatable reset device of FIG. 27A and manual release mechanism of FIG. 29A.

Illustrated herein are two examples of override devices as reset device 610 and as manual release mechanism 500', shown in FIG. 36 in an exploded dissembled state relative to one another and in an illustrated nested assembled state seen in FIG. 37. Override devices operate by engaging the pin drive 428 to move the pin drive 428 either towards or away from the home position, or towards or away from its actuated position, or away from any other position of the pin drive 428. Multiple, or a single override device may operate by engaging the pin drive 428, for example by engaging a separate portion of pin drive 428. For example, over devices may engage separate portions of the pin drive 428 along distinct portions of the pin drive's 428 longitudinal extent, to thereby provide a singular interface point of the power release chain accessible for actuation by one or more override devices which may act on the pin drive 428 within different planes e.g. at distinct portions of the pin drive's 428 longitudinal length, or on opposite sides of the pin drive's 428 within the same plane for moving the pin drive 418 in different and opposite directions, as shown in FIG. 37. The override devices 610, 500' are illustrated as a rotationally actuatable devices, and for example centered for rotation about a common axis such as drive pin axis 491, but other configurations such as levers having pivot axis different than the drive pin axis 491 may be provided. The close proximity of drive pin axis 491 to drive gear axis 492 as discussed herein further may provide for a smaller range of actuation of the override device due to the smaller range of travel of the pin drive 428 as compared to a father proximity of drive pin axis 491 to drive gear axis 492 such that the assembly size of the override device can be reduced allowing for the latch module 22' to be more compact.

Figure 30:
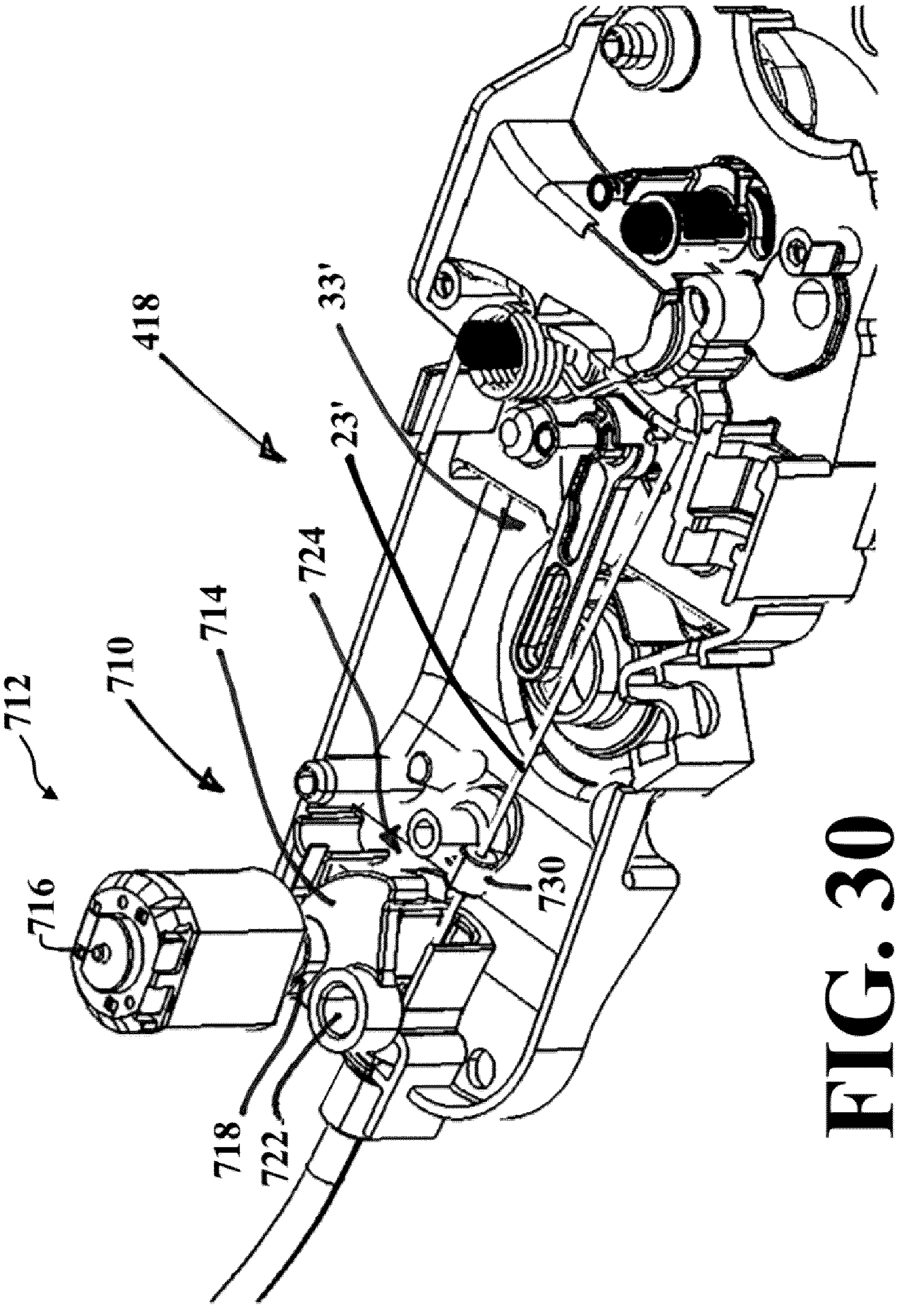
FIG. 30 is a perspective view illustrating a release lock device of the latch module of FIGS. 21A and 21B for preventing manual actuation of a pawl of the latch module via a release cable from a ratchet holding position to a ratchet releasing position to prevent unwanted movement of a vehicle closure panel from a closed position to an open position.
Figure 31B:
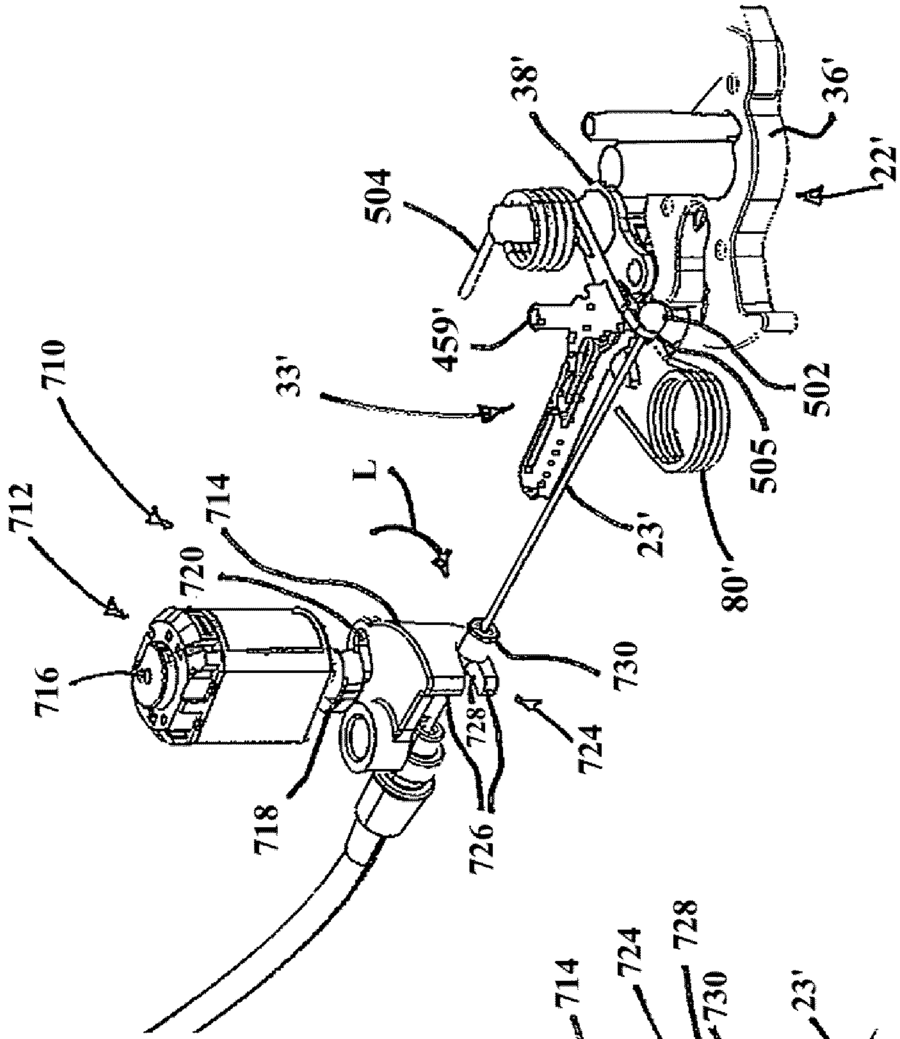
FIG. 31B is a perspective view of the release lock device of FIG. 30 showing the release lock device in a locked position.
Figure 31A:
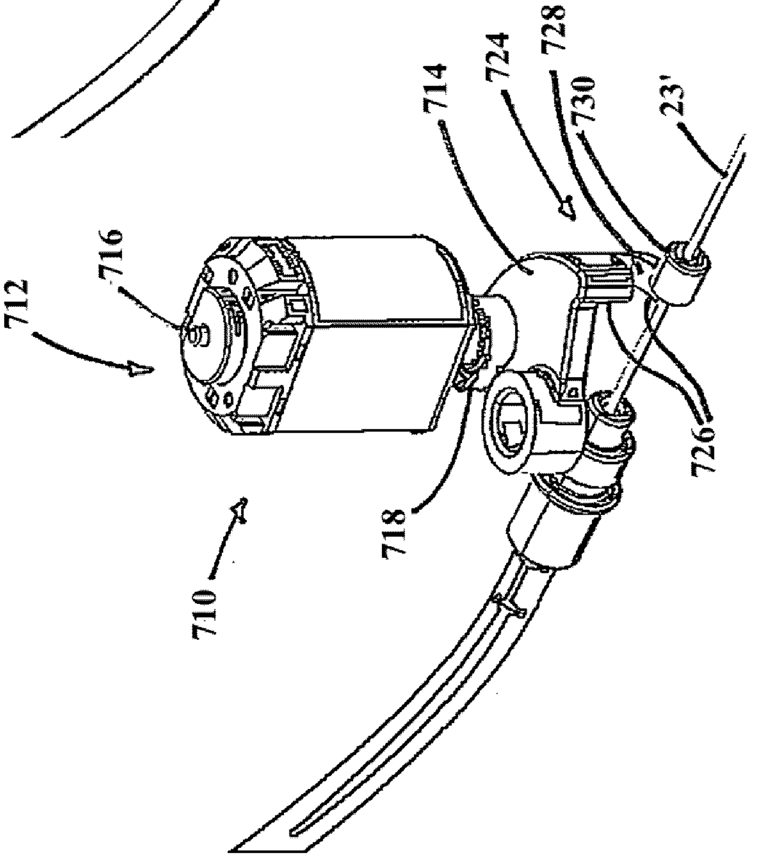
FIG. 31A is a perspective view of the release lock device of FIG. 30 showing the release lock device in an unlocked position.

In accordance with a further aspect of the disclosure, a release lock device 710 (FIG. 30) can be provided to prevent unwanted movement of pawl 38' of latch module 22' from the ratchet holding position, thereby keeping ratchet 36' in the ratchet holding position and ensuring closure latch assembly 418 is maintained in the latched position. Release lock device 710 is shown having a selectively actuatable electric motor 712 operable to move a lock member, also referred to as blocking cam or blocking member 714 between a blocking position, also referred to as locked position (FIG. 31B), and an unlocked position (FIGS. 30 and 31A). Electric motor 712 has a motor shaft 716 fixed to a drive member, such as a gear or drive cam 718, wherein drive cam 718 is disposed for engagement with a driven member, such as a cam slot 720 in blocking member 714. As such, when electric motor 712 is selectively and intentionally actuated, drive cam 718 rotatably moves blocking member 714 between the locked and unlocked positions, as desired.

Blocking member 714 is shown supported on a pivot post 722 for pivotal movement between the locked and unlocked positions. Blocking member 714 has a blocking portion formed by a bifurcated end region 724. Bifurcated end region 724 provides a pair of fingers 726 spaced from one another by a central slot 728. As blocking member 714 is pivoted to its locked position (FIG. 30B), release cable 23', as discussed above, is received within central slot 728, with fingers 726 being disposed on opposite sides of release cable 23' in a close clearance fit therewith. As such, with release cable 23' being received in and extending through central slot 728, a stop feature, shown as a ferrule 730, by way of example and without limitation, fixed to release cable 23' in close proximity to fingers 726 is brought into engagement with fingers 726, thereby preventing further translation of release cable 23', which in turn prevents closure latch assembly 418 from being unlatched. Of course, when desired, electric motor 712 can be selectively and intentionally actuated to return blocking member 714 to the unlocked position, whereupon ferrule 730 is no longer blocked from translating with release cable 23' past blocking member 714, which is laterally spaced from release cable 23', thereby allowing closure latch assembly 418 to be unlatched.

Figure 32:
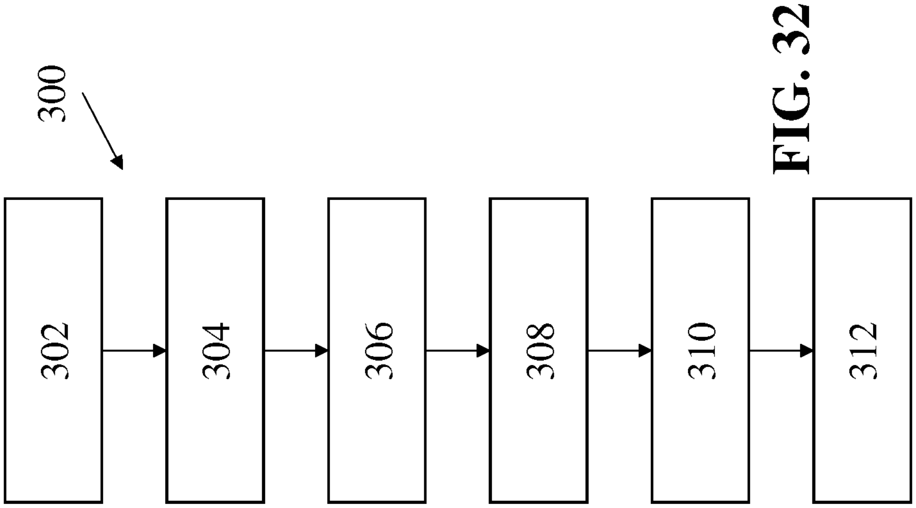
FIG. 32 illustrates a method for assembling the actuator module.

FIG. 32 is a block diagram of a simplified method for manufacturing and assembling actuator modules 24, 24A, 24B, 24C. In general, method 300 includes a series of steps and/or processes comprising: 302—pre-assembling power actuator 102; 304—assembling and installing electronic components onto PCB 160; 306—assembling power actuator 102 and built-up PCB 160 to define control unit 116; 308—mounting control unit 116 on housing plate 114; 310—overmolding a layer of protective insulating material onto PCB 160 to enclose PCB 160 relative to housing plate 114 to define ECU/actuator assembly 110; and 312—mounting ECU cover 112 on ECU/actuator assembly 110 to define the actuator module 24, 24A, 24B, 24C, 24'.

Figure 33:
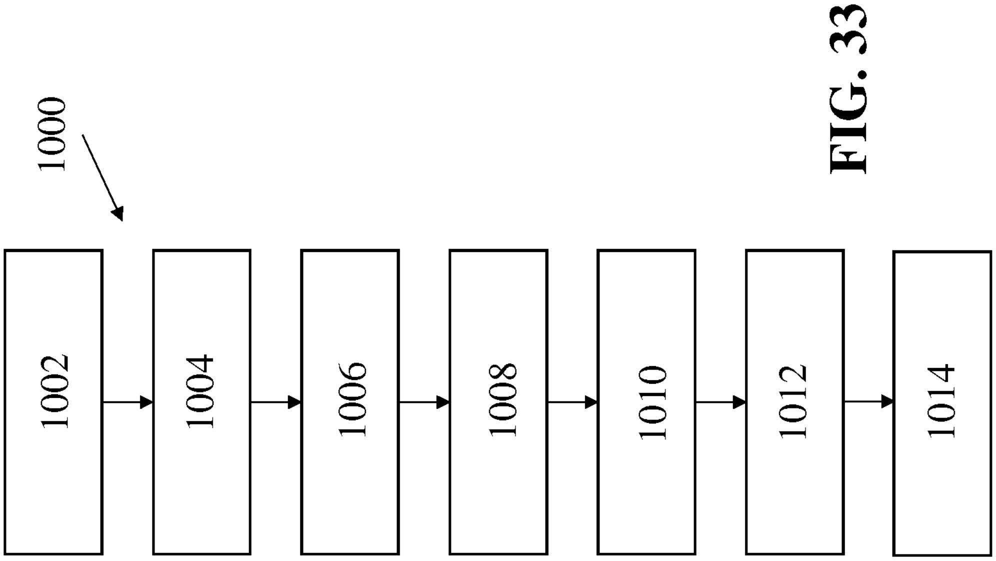
FIG. 33 illustrates a method of assembling an actuator module, in accordance with an illustrative embodiment.

Now referring to FIG. 33, there is provided in accordance with an illustrative embodiment, a method 1000 of manufacturing an actuator module 24, 24A, 24B, 24C, 24'. The actuator module includes a power actuator 102, 402 for shifting states of a latch module 22, 22' including a mechanism operable in a first state and in a second state. The power actuator includes a carrier plate 120, an electric motor 122, 422 securable to the carrier plate, the electric motor including a motor shaft driving a drive pinion. The power actuator further includes a drive gear rotatably mounted to the carrier plate and meshed with the drive pinion. The method 1000 includes the step 1002 of overmolding the carrier plate to a housing plate comprising a first side and a second side, and the step 1004 of forming a port 195 in the housing plate for receiving the motor shaft 194, 494 therethrough extending from the first side to the second side. The method 1000 may further include the step 1006 of sealing the port. The method 1000 may further include the step 1008 of securing the electric motor to the carrier plate on the first side of the housing plate, the step 1010 of positioning a control unit 116 for controlling actuation of the power actuator on the first side of the housing plate, and the step 1012 of connecting the control unit to the electric motor. The method 1000 may further include the step 1014 of aligning a hall sensor 228 of the control unit with a magnet provided on the drive gear.

Figure 34:
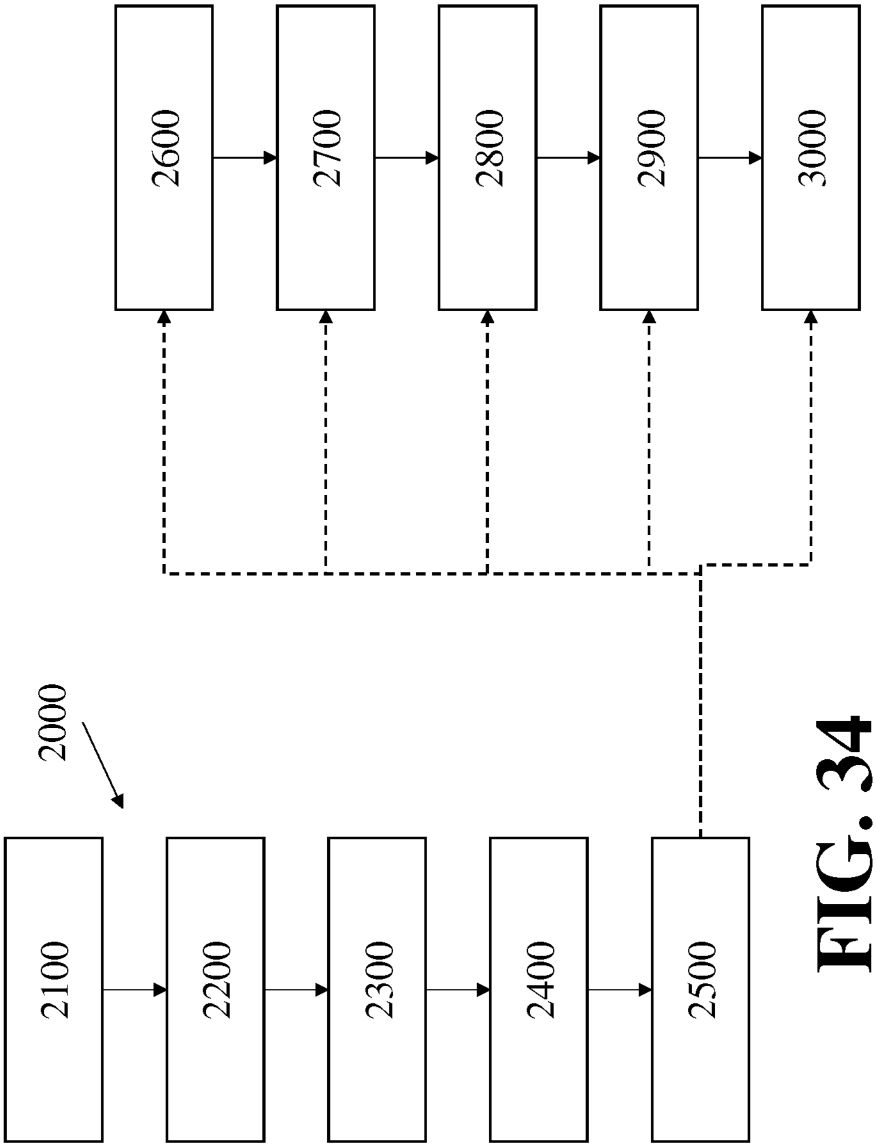
FIG. 34 illustrates a method of manufacturing a closure latch assembly.

In accordance with another aspect of the disclosure, as shown in FIG. 34, another method 2000 of manufacturing a closure latch assembly 18, 418 includes: a step 2100 of supporting a ratchet 36, 36' in a housing for movement between a striker capture position and a striker release position; a step 2200 of supporting a pawl 38, 38' in the housing for movement between a ratchet holding position, whereat the ratchet 36, 36' is in the striker capture position, and a ratchet releasing position, whereat the ratchet 36, 36' is biased toward the striker release position, and biasing the pawl 38, 38' toward the striker release position; a step 2300 of disposing a drive gear 126, 426 having an actuation feature 128, 428 fixed thereto in the housing; a step 2400 of operably coupling a power actuator 102, 402 to the drive gear 126, 426, with the power actuator 102, 402 being configured to be energized to move the drive gear 126, 426 between a home position, whereat the pawl 38, 38' is in the ratchet holding position, and a fully actuated position, whereat the pawl 38, 38' is in the ratchet releasing position; and a step 2500 of operably coupling the actuation feature 128, 428 to the pawl 38, 38' with a latch release mechanism 33, 33' such that rotation of the drive gear 126, 426 in response to energization of the power actuator 102, 402 causes the latch release mechanism 33, 33' to move the pawl 38, 38' between the ratchet holding position and the ratchet releasing position.

The method 2000 can further include a step 2600 of configuring the latch release mechanism 33' to provide a lost motion connection between the actuation feature 128, 428 and the pawl 38, 38'.

The method 2000 can further include a step 2700 of providing the latch release mechanism 33' including a link arm 450 having a slot 454 extending between a first drive end 456 and a second drive end 457 and providing the actuation feature 428 including a drive pin 428 configured for sliding movement between the first drive end 456 and the second drive end 457.

The method 2000 can further include a step 2800 of configuring the drive pin 428 to move from the second drive end 457 toward the first drive end 456 upon energization of the power actuator 402 and causing the pawl 38' to initiate movement from the ratchet holding position toward the ratchet releasing position upon the drive pin 428 engaging the first drive end 456.

The method 2000 can further include a step 2900 of operably coupling a release cable 23' to the pawl 38' and configuring the release cable 23' for manual actuation, whereupon the lost motion connection prevents the power actuator 402 from being backdriven.

The method 2000 can further include a step 3000 of coupling the release cable 23' to a spring member 504 and configuring the spring member 504 to engage a release member 459' during manual actuation to move the pawl 38' from the ratchet holding position to the ratchet releasing position.

Thus, the present disclosure provides a stand-along integrated ECU and power actuator arrangement, referred to as the ECU/actuator assembly, for use in an actuator module configured to be mounted to an independent latch module. Accordingly, this actuator module can be used with different latch modules and/or different versions of the same latch module. The actuator module of the present disclosure now includes the power actuator, removed from the latch module, to integrate the electronics and electrically-actuated devices into a common assembly. Advantages of the present disclosure include: the ability to test, debug and calibrate the actuator module independently from the latch module; increase the precision of gear position detection by providing a pre-assembled power actuator reducing stack-up tolerance between the meshed gears and the between the gear position sensor components; and fixing the motor, drive gear and bumper to a common structural component isolated from the latch housing of the latch module reducing noise and transmitted vibration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly, comprising:

a ratchet and a pawl, said ratchet being moveable between a striker capture position and a striker release position, said pawl being moveable between a ratchet holding position, whereat said ratchet is maintained in said striker capture position, and a ratchet release position, whereat said ratchet is biased toward said striker release position;

a power actuator operably coupled to a drive gear, said drive gear having an actuation feature fixed thereto; and a latch release mechanism pivotally coupled to said actuation feature and pivotally coupled to said pawl, wherein rotation of said drive gear via energization of said power actuator causes said latch release mechanism to move said pawl from said ratchet holding position to said ratchet release position.

2. The closure latch assembly of claim 1, wherein said latch release mechanism includes a link arm pivotally coupling said pawl to said actuation feature, said power actuator being configured to rotate said drive gear in a lost motion connection with said pawl to move said pawl from said ratchet holding position to said ratchet release position.

3. The closure latch assembly of claim 2, wherein said lost motion connection is between said actuation feature and said link arm.

4. The closure latch assembly of claim 3, wherein said link arm has a slot extending between a first drive end and a second drive end, and said actuation feature is disposed in said slot for sliding movement between said first drive end and said second drive end.

5. The closure latch assembly of claim 4, wherein the slot is a linear slot and the actuation feature extends from a face of the drive gear at a radial position closer to an axis of the drive gear than to the outer circumference of the drive gear.

6. The closure latch assembly of claim 4, wherein the lost motion connection allows the actuation feature to move within said slot from a home position towards an actuated position before engaging said first end.

7. The closure latch assembly of claim 2, wherein when the actuation feature is in an actuated position, the link arm is in an over-center position relative to the axis of the drive gear.

8. The closure latch assembly of claim 2, wherein said actuation feature is a pin fixed to said drive gear, and wherein said link arm directly couples said pawl to said pin.

9. The closure latch assembly of claim 2, further including an override device configured for actuation to engage said actuation feature and operably move said actuation feature.

10. The closure latch assembly of claim 1, further including a release cable configured for manual actuation operably coupled to said pawl, and a spring member attached to said release cable, said spring member being configured for engagement with a release member coupled to said pawl during manual actuation to move the pawl from the ratchet holding position to the ratchet releasing position.

11. The closure latch assembly of claim 1, further including a reset device configured for manual actuation to engage said actuation feature and operably move said pawl from said ratchet releasing position to said ratchet holding position.

12. The closure latch assembly of claim 11, wherein said reset device has a manual actuation feature configured to be accessible for manual actuation on a shut face of the closure panel of the motor vehicle.

13. The closure latch assembly of claim 12, wherein said manual actuation feature is configured to engage said actuation feature to move said pawl from said ratchet release position to said ratchet holding position.

14. The closure latch assembly of claim 10, further including a release lock device configured to be selectively moved to a locked position to prevent movement of said release cable to prevent said pawl from moving to the ratchet release position and to be selectively moved to an unlocked position to allow movement of said release cable to allow said pawl to move to said ratchet release position.

15. The closure latch assembly of claim 14, wherein said release lock device has a bifurcated end region forming a slot between a pair of fingers, said release cable being received in said slot and said fingers blocking movement of a ferrule fixed to said release cable when said release lock device is in said locked position.

16. The closure latch assembly of claim 1, further including a manual release mechanism operably coupled to said actuation feature and operable via manual actuation of a release cable to open the vehicle closure panel from outside the motor vehicle.

17. The closure latch assembly of claim 16, wherein said manual release mechanism has an actuation pulley fixed to said release cable, said actuation pulley being supported for rotation about a drive gear axis of said drive gear between a non-actuated position and an actuated position and having an actuation member fixed thereto, wherein said actuation member is arranged for engagement with said actuation feature to move said pawl to the ratchet release position when said actuation pulley is moved to said actuated position.

18. The closure latch assembly of claim 1, wherein a roller is provided between the ratchet and the pawl.

19. A method of controlling an actuatable mechanism of a closure latch assembly, the closure latch assembly having a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position, and wherein the pawl is biased towards the ratchet holding position, comprising:

providing a power actuator configured to be energized to move an actuation feature between a home position and a fully actuated position;

pivotally coupling the actuatable mechanism to the actuation feature using a lost motion connection;

pivotally coupling the actuatable mechanism to the pawl;

energizing the power actuator to move the actuator feature to an engagement position with the lost motion connection for actuating the actuatable mechanism to cause the pawl to move to the ratchet release position to cause release of the closure latch assembly; and energizing the power actuator to move the actuator feature to a disengagement position with lost motion connection for allowing freeplay between the actuation feature and the lost motion connection.

20. A closure latch assembly, comprising:

a ratchet and a pawl, said ratchet being moveable between a striker capture position and a striker release position, said pawl being moveable between a ratchet holding position, whereat said ratchet is maintained in said striker capture position, and a ratchet release position, whereat said ratchet is biased toward said striker release position, and wherein said pawl is biased towards said ratchet holding position;

a power actuator operably coupled to the pawl using a link pivotally coupled to the pawl, the link having a lost motion connection when in an engagement position with the lost motion position and operably decoupled from the pawl when in a disengagement position;

wherein the lost motion connection allows the inertia of the power actuator to substantially increase before the lost motion connection transitions from the disengagement position to the engagement position to cause said pawl to move to the ratchet release position.

* * * * *